(12) United States Patent
Huerta et al.

(10) Patent No.: US 9,373,885 B2
(45) Date of Patent: Jun. 21, 2016

(54) RADIO SYSTEM FOR HIGH-SPEED WIRELESS COMMUNICATION

(71) Applicant: Ubiquiti Networks, Inc., San Jose, CA (US)

(72) Inventors: Gerardo Huerta, San Jose, CA (US); Jude Lee, San Jose, CA (US); John R. Sanford, Escondido, CA (US); Gonzalo P. Jabbaz, Cupertino, CA (US); Hsin-Ming Chen, Taipei (TW); Robert Pera, San Jose, CA (US)

(73) Assignee: Ubiquiti Networks, Inc., San Jose, CA (US)

( * ) Notice: Subject to any disclaimer, the term of this patent is extended or adjusted under 35 U.S.C. 154(b) by 0 days.

(21) Appl. No.: 14/170,361

(22) Filed: Jan. 31, 2014

(65) Prior Publication Data
US 2014/0225803 A1  Aug. 14, 2014

Related U.S. Application Data

(60) Provisional application No. 61/874,907, filed on Sep. 6, 2013, provisional application No. 61/888,428, filed on Oct. 8, 2013, provisional application No. 61/920,416, filed on Dec. 23, 2013.

(51) Int. Cl.
*A61B 18/18* (2006.01)
*H01Q 1/42* (2006.01)
(Continued)

(52) U.S. Cl.
CPC . *H01Q 1/42* (2013.01); *H01Q 3/08* (2013.01); *H01Q 9/0428* (2013.01); *H01Q 21/0087* (2013.01); *H01Q 21/065* (2013.01); *H04B 1/3816* (2013.01); *Y10T 29/49018* (2015.01)

(58) Field of Classification Search
CPC ... H01Q 21/0087; H01Q 1/42; H01Q 9/0407; H01Q 1/12
USPC ............ 343/776, 872, 700 MS, 891
See application file for complete search history.

(56) References Cited

U.S. PATENT DOCUMENTS 3,155,975 A  11/1964  Chatelain
3,633,208 A   1/1972  Ajioka
(Continued)

FOREIGN PATENT DOCUMENTS

GB      2313957 A     12/1997
JP    2002299940 A    10/2002
(Continued)

OTHER PUBLICATIONS

Ashtaiwi et al.; Utilizing IEEE 802.11n to enhance QoS support in wireless mesh networks; (LCN 2008) 33rd IEEE Conf. on Loacal Computer Networks; pp. 689-696; Oct. 14-17, 2008.
(Continued)

*Primary Examiner* — Peguy Jean Pierre
(74) *Attorney, Agent, or Firm* — Shay Glenn LLP

(57) ABSTRACT

Indoor/outdoor broadband wireless combined radio/antennas configured to include an integrated adjustable mount allowing mounting to a pole or stand and adjustment of the angle of the device (e.g., the altitude) by a lockable ball joint. The device may include a compact array antenna having a high gain configured to operate in, for example, the 5.15 to 5.85 GHz band and/or the 2.40-2.48 GHz band. The antenna emitters may be arranged in a separate plane from a plane containing the antenna feed connecting the emitting elements and also from a ground plane. The antenna array may be contained within a protective weatherproof housing along with the radio control circuitry. The antenna may be manufactured by a simple stamping/forming process. The apparatuses may be configured for low impedance mismatch and may have a high gain relative to a very small and compact overall shape.

18 Claims, 63 Drawing Sheets

(51) Int. Cl.
  *H01Q 21/00* (2006.01)
  *H04B 1/3816* (2015.01)
  *H01Q 3/08* (2006.01)
  *H01Q 9/04* (2006.01)
  *H01Q 21/06* (2006.01)

(56) References Cited

U.S. PATENT DOCUMENTS

| | | |
|---|---|---|
| 3,696,433 A | 10/1972 | Killion et al. |
| 3,739,392 A | 6/1973 | Ross et al. |
| 3,825,874 A | 7/1974 | Peverill |
| 4,613,868 A | 9/1986 | Weiss |
| 4,658,262 A | 4/1987 | Duhamel |
| 4,757,324 A | 7/1988 | Dhanjal |
| 4,758,842 A | 7/1988 | Linhardt et al. |
| 4,973,953 A | 11/1990 | Shimokawa et al. |
| 4,992,866 A | 2/1991 | Morgan |
| 5,131,006 A | 7/1992 | Kamerman et al. |
| 5,151,920 A | 9/1992 | Haagh et al. |
| 5,191,349 A | 3/1993 | Dinsmore et al. |
| 5,295,154 A | 3/1994 | Meier et al. |
| 5,303,413 A | 4/1994 | Braegas |
| 5,307,515 A | 4/1994 | Kuo et al. |
| 5,339,455 A | 8/1994 | Vogt et al. |
| 5,406,260 A | 4/1995 | Cummings et al. |
| 5,416,797 A | 5/1995 | Gilhousen et al. |
| 5,422,887 A | 6/1995 | Diepstraten et al. |
| 5,428,636 A | 6/1995 | Meier |
| 5,503,566 A | 4/1996 | Wang |
| 5,504,746 A | 4/1996 | Meier |
| 5,510,975 A | 4/1996 | Ziegler |
| 5,523,768 A | 6/1996 | Hemmie et al. |
| 5,546,397 A | 8/1996 | Mahany |
| 5,564,093 A | 10/1996 | Matsumoto |
| 5,608,413 A | 3/1997 | Macdonald |
| 5,621,662 A | 4/1997 | Humphries et al. |
| 5,661,494 A | 8/1997 | Bondyopadhyay |
| 5,666,126 A | 9/1997 | Lange |
| 5,706,428 A | 1/1998 | Boer et al. |
| 5,734,350 A | 3/1998 | Deming et al. |
| 5,740,366 A | 4/1998 | Mahany et al. |
| 5,758,296 A | 5/1998 | Nakamura |
| 5,782,656 A | 7/1998 | Zell et al. |
| 5,805,111 A | 9/1998 | Brettner et al. |
| 5,844,893 A | 12/1998 | Gollnick et al. |
| 5,872,594 A | 2/1999 | Thompson |
| 5,936,542 A | 8/1999 | Kleinrock et al. |
| 5,936,584 A | 8/1999 | Lawrence et al. |
| 5,940,771 A | 8/1999 | Gollnick et al. |
| 6,036,539 A | 3/2000 | Rigby et al. |
| 6,045,402 A | 4/2000 | Embo et al. |
| 6,067,053 A | 5/2000 | Runyon et al. |
| 6,113,431 A | 9/2000 | Wong |
| 6,124,830 A | 9/2000 | Yuanzhu |
| 6,127,987 A | 10/2000 | Maruyama et al. |
| 6,130,892 A | 10/2000 | Short et al. |
| 6,192,282 B1 | 2/2001 | Smith et al. |
| 6,194,992 B1 | 2/2001 | Short et al. |
| 6,206,724 B1 | 3/2001 | Leung |
| 6,208,310 B1 | 3/2001 | Suleiman et al. |
| 6,219,005 B1 | 4/2001 | Szafranek |
| 6,252,559 B1 | 6/2001 | Donn |
| 6,275,922 B1 | 8/2001 | Bertsch |
| 6,313,798 B1 | 11/2001 | Bancroft et al. |
| 6,320,553 B1 | 11/2001 | Ergene |
| 6,326,922 B1 | 12/2001 | Hegendoerfer |
| 6,334,057 B1 | 12/2001 | Malmgren et al. |
| 6,337,990 B1 | 1/2002 | Koshino |
| 6,359,647 B1 | 3/2002 | Sengupta et al. |
| 6,362,783 B1 | 3/2002 | Sugiura et al. |
| 6,374,311 B1 | 4/2002 | Mahany et al. |
| 6,386,913 B1 | 5/2002 | Mohammad et al. |
| 6,386,914 B1 | 5/2002 | Collins et al. |
| 6,411,258 B1 | 6/2002 | Ho |
| 6,425,783 B1 | 7/2002 | Touboul |
| 6,429,827 B1 | 8/2002 | Hsueh et al. |
| 6,462,710 B1 | 10/2002 | Carson et al. |
| 6,501,377 B2 | 12/2002 | Ebata et al. |
| 6,524,119 B2 | 2/2003 | Kato et al. |
| 6,529,234 B2 | 3/2003 | Urisaka et al. |
| 6,535,793 B2 | 3/2003 | Allard |
| 6,563,786 B1 | 5/2003 | Van Nee |
| 6,567,482 B1 | 5/2003 | Popovic |
| 6,593,892 B2 | 7/2003 | Honda et al. |
| 6,597,393 B2 | 7/2003 | Kato et al. |
| 6,618,017 B1 | 9/2003 | Ryken et al. |
| 6,636,894 B1 | 10/2003 | Short et al. |
| 6,643,496 B1 | 11/2003 | Shimoyama et al. |
| 6,665,004 B1 | 12/2003 | Paff |
| 6,665,536 B1 | 12/2003 | Mahany |
| 6,679,728 B1 | 1/2004 | Huang et al. |
| 6,697,415 B1 | 2/2004 | Mahany |
| 6,714,559 B1 | 3/2004 | Meier |
| 6,738,582 B1 | 5/2004 | Moshe et al. |
| 6,759,957 B2 | 7/2004 | Murakami et al. |
| 6,789,110 B1 | 9/2004 | Short et al. |
| 6,795,852 B1 | 9/2004 | Kleinrock et al. |
| 6,808,414 B2 | 10/2004 | Spiegel et al. |
| 6,810,426 B2 | 10/2004 | Mysore et al. |
| 6,844,862 B1 | 1/2005 | Cencich et al. |
| 6,845,297 B2 | 1/2005 | Allard |
| 6,857,009 B1 | 2/2005 | Ferreria et al. |
| 6,865,169 B1 | 3/2005 | Quayle et al. |
| 6,868,399 B1 | 3/2005 | Short et al. |
| 6,945,817 B2 | 9/2005 | Miyazaki et al. |
| 6,954,859 B1 | 10/2005 | Simerly et al. |
| 6,968,173 B2 | 11/2005 | Cowley |
| 6,970,680 B1 | 11/2005 | Tomoe |
| 6,970,751 B2 | 11/2005 | Gonzales et al. |
| 6,977,585 B2 | 12/2005 | Falk et al. |
| 6,997,753 B2 | 2/2006 | Broomall et al. |
| 7,020,082 B2 | 3/2006 | Bhagavath et al. |
| 7,084,822 B2 * | 8/2006 | Downs et al. ................. 343/731 |
| 7,086,898 B2 | 8/2006 | Johnsen et al. |
| 7,088,727 B1 | 8/2006 | Short et al. |
| 7,095,321 B2 | 8/2006 | Primm et al. |
| 7,117,043 B1 | 10/2006 | Frederick et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,252,555 B2 | 8/2007 | Moessinger |
| 7,254,191 B2 | 8/2007 | Sugar et al. |
| 7,286,095 B2 | 10/2007 | Parsche et al. |
| 7,295,812 B2 | 11/2007 | Haapoja et al. |
| 7,319,477 B2 | 1/2008 | Katz |
| 7,353,114 B1 | 4/2008 | Rohlf et al. |
| 7,386,002 B2 | 6/2008 | Meier |
| 7,413,474 B2 | 8/2008 | Liu et al. |
| 7,430,442 B2 | 9/2008 | He et al. |
| 7,457,646 B2 | 11/2008 | Mahany et al. |
| 7,483,984 B1 | 1/2009 | Jonker et al. |
| 7,526,539 B1 | 4/2009 | Hsu |
| 7,555,658 B2 | 6/2009 | Vahid et al. |
| 7,584,020 B2 | 9/2009 | Bruemmer et al. |
| 7,587,260 B2 | 9/2009 | Bruemmer et al. |
| 7,636,559 B2 | 12/2009 | Magnusen et al. |
| 7,668,621 B2 | 2/2010 | Bruemmer |
| 7,683,940 B2 | 3/2010 | Fleming |
| 7,696,940 B1 | 4/2010 | MacDonald |
| 7,710,940 B2 | 5/2010 | Van Der Wal et al. |
| 7,715,800 B2 | 5/2010 | Sinha |
| 7,733,835 B2 | 6/2010 | Sammour et al. |
| 7,739,383 B1 | 6/2010 | Short et al. |
| 7,752,334 B2 | 7/2010 | Paunikar et al. |
| 7,783,390 B2 | 8/2010 | Miller |
| 7,791,466 B2 | 9/2010 | Agarwalla et al. |
| 7,801,644 B2 | 9/2010 | Bruemmer et al. |
| 7,826,426 B1 | 11/2010 | Bharghavan et al. |
| 7,839,926 B1 | 11/2010 | Metzger et al. |
| 7,848,263 B2 | 12/2010 | Chhabra |
| 7,864,117 B2 * | 1/2011 | Aurinsalo et al. ..... 343/700 MS |
| 7,865,252 B2 | 1/2011 | Clayton |
| 7,934,952 B2 | 5/2011 | Pera |

(56) References Cited

U.S. PATENT DOCUMENTS

| | | |
|---|---|---|
| 7,974,738 B2 | 7/2011 | Bruemmer et al. |
| 8,013,732 B2 | 9/2011 | Petite et al. |
| 8,031,650 B2 | 10/2011 | Petite et al. |
| 8,042,048 B2 | 10/2011 | Wilson et al. |
| 8,060,582 B2 | 11/2011 | Bliss et al. |
| 8,073,564 B2 | 12/2011 | Bruemmer et al. |
| 8,077,113 B2 | 12/2011 | Syed et al. |
| 8,154,398 B2 | 4/2012 | Rolf et al. |
| 8,165,041 B2 | 4/2012 | Wang et al. |
| 8,184,061 B2 | 5/2012 | Sanford |
| 8,184,064 B2 | 5/2012 | Sanford |
| 8,190,708 B1 | 5/2012 | Short et al. |
| 8,219,059 B2 | 7/2012 | Pera et al. |
| 8,270,767 B2 | 9/2012 | Park |
| 8,306,634 B2 | 11/2012 | Nguyen et al. |
| 8,310,335 B2 | 11/2012 | Sivakkolundhu |
| 8,335,272 B2 | 12/2012 | Roberts |
| 8,350,697 B2 | 1/2013 | Trundle et al. |
| 8,364,105 B2 * | 1/2013 | McKay et al. ............ 455/129 |
| 8,385,869 B2 | 2/2013 | Feenaghty et al. |
| 8,390,684 B2 | 3/2013 | Piran et al. |
| 8,400,997 B2 | 3/2013 | Pera et al. |
| 8,421,700 B2 | 4/2013 | Sanford |
| 8,421,704 B2 | 4/2013 | Sanford |
| 8,429,435 B1 | 4/2013 | Clayton et al. |
| 8,466,847 B2 | 6/2013 | Pera et al. |
| 8,467,759 B2 | 6/2013 | Pera et al. |
| 8,478,450 B2 | 7/2013 | Lu et al. |
| 8,483,188 B2 | 7/2013 | Walton et al. |
| 8,489,065 B2 | 7/2013 | Green et al. |
| 8,493,279 B2 | 7/2013 | Pera et al. |
| 8,619,136 B2 | 12/2013 | Howarter et al. |
| 8,698,687 B2 | 4/2014 | Pera et al. |
| 8,730,110 B2 * | 5/2014 | Rao ............................ 343/702 |
| 8,736,503 B2 | 5/2014 | Zaghloul et al. |
| 8,761,142 B2 | 6/2014 | Dayanandan et al. |
| 8,818,457 B2 * | 8/2014 | Besoli et al. ............ 455/562.1 |
| 8,868,014 B2 * | 10/2014 | Krivokapic .......... H01Q 9/0421 455/120 |
| 8,890,766 B2 * | 11/2014 | Huynh ....................... 343/878 |
| 2001/0046258 A1 | 11/2001 | Wise et al. |
| 2002/0015393 A1 | 2/2002 | Pan et al. |
| 2002/0105475 A1 | 8/2002 | Overton et al. |
| 2002/0113744 A1 | 8/2002 | Strickland |
| 2002/0142780 A1 | 10/2002 | Airy et al. |
| 2002/0187760 A1 | 12/2002 | Krishmar Junker et al. |
| 2003/0032398 A1 | 2/2003 | Harris |
| 2003/0098812 A1 | 5/2003 | Ying et al. |
| 2003/0169522 A1 | 9/2003 | Schofield et al. |
| 2003/0189516 A1 | 10/2003 | Olson |
| 2003/0198200 A1 | 10/2003 | Diener et al. |
| 2003/0207669 A1 | 11/2003 | Kroeger |
| 2003/0217136 A1 | 11/2003 | Cho et al. |
| 2003/0224801 A1 | 12/2003 | Lovberg et al. |
| 2003/0233660 A1 | 12/2003 | Slemmer et al. |
| 2004/0133913 A1 | 7/2004 | Benveniste |
| 2004/0151126 A1 | 8/2004 | Matsubara |
| 2004/0209521 A1 | 10/2004 | Cooper et al. |
| 2004/0233107 A1 | 11/2004 | Popov et al. |
| 2004/0242274 A1 | 12/2004 | Corbett et al. |
| 2005/0048835 A1 | 3/2005 | Clark |
| 2005/0048971 A1 | 3/2005 | Findikli et al. |
| 2005/0057700 A1 | 3/2005 | Lim et al. |
| 2005/0136880 A1 | 6/2005 | Subasic et al. |
| 2006/0050677 A1 | 3/2006 | Schafer |
| 2006/0057986 A1 | 3/2006 | Wakui et al. |
| 2006/0079230 A1 | 4/2006 | Russell |
| 2006/0090923 A1 | 5/2006 | Fetterolf et al. |
| 2006/0110170 A1 | 5/2006 | Wang |
| 2006/0116170 A1 | 6/2006 | Brahmbhatt et al. |
| 2006/0128371 A1 | 6/2006 | Dillon et al. |
| 2006/0253205 A1 | 11/2006 | Gardiner |
| 2006/0258315 A1 | 11/2006 | Fein et al. |
| 2006/0281433 A1 | 12/2006 | Yang et al. |
| 2007/0042732 A1 | 2/2007 | Kang et al. |
| 2007/0053362 A1 | 3/2007 | Garg |
| 2007/0057860 A1 | 3/2007 | Jaffer et al. |
| 2007/0075909 A1 | 4/2007 | Flynn et al. |
| 2007/0086424 A1 | 4/2007 | Calcev et al. |
| 2007/0099660 A1 | 5/2007 | Bhesania et al. |
| 2007/0188615 A1 | 8/2007 | Beniyama et al. |
| 2007/0205847 A1 | 9/2007 | Kushta et al. |
| 2007/0238419 A1 | 10/2007 | Dubois et al. |
| 2007/0274249 A1 | 11/2007 | Hulbert et al. |
| 2007/0282944 A1 | 12/2007 | Odaka et al. |
| 2008/0009967 A1 | 1/2008 | Bruemmer |
| 2008/0036657 A1 | 2/2008 | Oomuro |
| 2008/0048927 A1 | 2/2008 | Hoshi |
| 2008/0049625 A1 | 2/2008 | Edwards et al. |
| 2008/0051053 A1 | 2/2008 | Fedan |
| 2008/0056125 A1 | 3/2008 | Kneckt et al. |
| 2008/0080553 A1 | 4/2008 | Hasty et al. |
| 2008/0113552 A1 | 5/2008 | Casperson et al. |
| 2008/0125129 A1 | 5/2008 | Lee |
| 2008/0136713 A1 | 6/2008 | Fu et al. |
| 2008/0151801 A1 | 6/2008 | Mizuta |
| 2008/0159239 A1 | 7/2008 | Odlyzko et al. |
| 2008/0162048 A1 | 7/2008 | Yang et al. |
| 2008/0165731 A1 | 7/2008 | Zellner |
| 2008/0165735 A1 | 7/2008 | Chen et al. |
| 2008/0175265 A1 | 7/2008 | Yonge et al. |
| 2008/0192644 A1 | 8/2008 | Utsunomiya et al. |
| 2008/0211929 A1 | 9/2008 | Uchihara |
| 2008/0212612 A1 | 9/2008 | Singh et al. |
| 2008/0219198 A1 | 9/2008 | Honkasalo et al. |
| 2008/0224938 A1 | 9/2008 | Udagawa et al. |
| 2008/0231538 A1 | 9/2008 | Inoue et al. |
| 2008/0240107 A1 | 10/2008 | Parekh et al. |
| 2008/0291873 A1 | 11/2008 | Benveniste |
| 2008/0309535 A1 | 12/2008 | Le Guillou |
| 2009/0003374 A1 | 1/2009 | Morrissey et al. |
| 2009/0070477 A1 | 3/2009 | Baum et al. |
| 2009/0096689 A1 | 4/2009 | Krajicek |
| 2009/0157844 A1 | 6/2009 | Fionda et al. |
| 2009/0174622 A1 | 7/2009 | Kanou |
| 2009/0191751 A1 | 7/2009 | Barsigian et al. |
| 2009/0195467 A1 | 8/2009 | Vassilakis et al. |
| 2009/0196173 A1 | 8/2009 | Wang et al. |
| 2009/0234499 A1 | 9/2009 | Nielsen et al. |
| 2009/0237314 A1 | 9/2009 | Lalezari |
| 2009/0240791 A1 | 9/2009 | Sakurai et al. |
| 2009/0245227 A1 | 10/2009 | Chin et al. |
| 2009/0252127 A1 | 10/2009 | Rangarajan et al. |
| 2009/0257239 A1 | 10/2009 | Burton |
| 2009/0307255 A1 | 12/2009 | Park |
| 2009/0310721 A1 | 12/2009 | Redfern et al. |
| 2010/0007561 A1 | 1/2010 | Bucca et al. |
| 2010/0013729 A1 | 1/2010 | Harel et al. |
| 2010/0023865 A1 | 1/2010 | Fulker et al. |
| 2010/0039979 A1 | 2/2010 | Takase et al. |
| 2010/0053022 A1 | 3/2010 | Mak et al. |
| 2010/0097473 A1 | 4/2010 | Park et al. |
| 2010/0115415 A1 | 5/2010 | Hickey |
| 2010/0152897 A1 | 6/2010 | Muller |
| 2010/0177012 A1 | 7/2010 | Morrow |
| 2010/0218004 A1 | 8/2010 | Cousy |
| 2010/0232324 A1 | 9/2010 | Radunovic et al. |
| 2010/0232400 A1 | 9/2010 | Patil et al. |
| 2010/0280635 A1 | 11/2010 | Cohn et al. |
| 2010/0280637 A1 | 11/2010 | Cohn et al. |
| 2010/0295736 A1 | 11/2010 | Su |
| 2010/0298957 A1 | 11/2010 | Sanchez Rocha et al. |
| 2010/0306320 A1 | 12/2010 | Leppanen et al. |
| 2011/0013601 A1 | 1/2011 | Cerasa et al. |
| 2011/0053536 A1 | 3/2011 | Friedmann |
| 2011/0058036 A1 | 3/2011 | Metzger et al. |
| 2011/0090129 A1 | 4/2011 | Weily et al. |
| 2011/0090812 A1 | 4/2011 | Aoyama |
| 2011/0115816 A1 | 5/2011 | Brackney |
| 2011/0150401 A1 | 6/2011 | Furuyama |
| 2011/0164700 A1 | 7/2011 | Porat et al. |
| 2011/0185011 A1 | 7/2011 | Shuman et al. |
| 2011/0211559 A1 | 9/2011 | Lim et al. |
| 2011/0211628 A1 | 9/2011 | Hammarwall et al. |

(56) References Cited

U.S. PATENT DOCUMENTS

| | | |
|---|---|---|
| 2011/0258678 A1 | 10/2011 | Cowling et al. |
| 2011/0260934 A1 | 10/2011 | Ilno et al. |
| 2011/0294342 A1 | 12/2011 | DeBock et al. |
| 2012/0019418 A1 | 1/2012 | Wong et al. |
| 2012/0096271 A1 | 4/2012 | Ramarathinam et al. |
| 2012/0109719 A1 | 5/2012 | Parmar et al. |
| 2012/0127977 A1 | 5/2012 | Copeland et al. |
| 2012/0130513 A1 | 5/2012 | Hao et al. |
| 2012/0158161 A1 | 6/2012 | Cohn et al. |
| 2012/0176608 A1 | 7/2012 | McCown |
| 2012/0188892 A1 | 7/2012 | Demilie et al. |
| 2012/0210147 A1 | 8/2012 | Musti et al. |
| 2012/0213086 A1 | 8/2012 | Matsuura |
| 2012/0226366 A1 | 9/2012 | Lee et al. |
| 2012/0257862 A1 | 10/2012 | Deel et al. |
| 2012/0281000 A1 | 11/2012 | Woodings |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0035774 A1 | 2/2013 | Warren et al. |
| 2013/0051286 A1 | 2/2013 | Schultz et al. |
| 2013/0051441 A1 | 2/2013 | Cho et al. |
| 2013/0067564 A1 | 3/2013 | Fok Ah Cheun et al. |
| 2013/0077606 A1 | 3/2013 | Wu et al. |
| 2013/0107869 A1 | 5/2013 | Abraham et al. |
| 2013/0129091 A1 | 5/2013 | Kang et al. |
| 2013/0154894 A1 | 6/2013 | Caimi et al. |
| 2013/0201069 A1 | 8/2013 | Sanford |
| 2013/0201075 A1 | 8/2013 | Sanford |
| 2013/0201316 A1 | 8/2013 | Binder et al. |
| 2013/0252567 A1 | 9/2013 | Pera et al. |
| 2013/0271337 A1 | 10/2013 | Lee et al. |
| 2013/0333005 A1 | 12/2013 | Kim et al. |
| 2014/0005809 A1 | 1/2014 | Frei et al. |
| 2014/0005810 A1 | 1/2014 | Frei et al. |
| 2014/0005851 A1 | 1/2014 | Frei et al. |
| 2014/0006506 A1 | 1/2014 | Frei et al. |
| 2014/0006552 A1 | 1/2014 | Frei et al. |
| 2014/0006605 A1 | 1/2014 | Frei et al. |
| 2014/0006660 A1 | 1/2014 | Frei et al. |
| 2014/0022918 A1 | 1/2014 | Guo et al. |
| 2014/0036805 A1 | 2/2014 | Sadek et al. |
| 2014/0112311 A1 | 4/2014 | Dayanandan et al. |
| 2014/0115354 A1 | 4/2014 | Jabbaz et al. |
| 2014/0118203 A1 | 5/2014 | Sanford |
| 2014/0122298 A1 | 5/2014 | Oyer |
| 2014/0140228 A1 | 5/2014 | Dayanandan et al. |
| 2014/0140232 A1 | 5/2014 | Dayanandan et al. |
| 2014/0143374 A1 | 5/2014 | Huang et al. |
| 2014/0146764 A1 | 5/2014 | Kim et al. |
| 2014/0225788 A1 | 8/2014 | Schulz et al. |
| 2014/0245160 A1 | 8/2014 | Bauer et al. |
| 2014/0274177 A1 | 9/2014 | Carbajal |
| 2014/0329522 A1 | 11/2014 | Dayanandan et al. |
| 2015/0156645 A1 | 6/2015 | Ponnuswamy et al. |
| 2015/0163753 A1 | 6/2015 | Valliappan et al. |
| 2016/0014613 A1 | 1/2016 | Ponnampalam et al. |

FOREIGN PATENT DOCUMENTS

| | | |
|---|---|---|
| JP | 2007074193 A | 3/2007 |
| KR | 20020095556 | 12/2002 |
| KR | 10-2008-0079357 | 9/2008 |
| KR | 10-2013-0141939 | 12/2013 |
| WO | WO98/40990 A1 | 9/1998 |
| WO | WO99/34477 A1 | 7/1999 |
| WO | WO01/31855 A2 | 5/2001 |
| WO | WO01/31886 A2 | 5/2001 |
| WO | WO01/86877 A2 | 11/2001 |
| WO | WO03/023987 A1 | 3/2003 |
| WO | WO2006/044783 A2 | 4/2006 |
| WO | WO2008/042804 A2 | 4/2008 |
| WO | WO2009/146342 A1 | 12/2009 |
| WO | WO2010/049113 A1 | 5/2010 |
| WO | WO2011/005710 A2 | 1/2011 |

OTHER PUBLICATIONS

Cisco; Cisco NX-OS Software: Business-Critical Cross-Platform Data Center OS (white paper); retrieved from the internet on Jul. 9, 2014 (http://www.cisco.com/c/en/us/products/collateral/switches/nexus-7000-series-switches/white_paper_c11-622511.pdf); 14 pgs.; © 2010.

El-Basioni et al.; Smart home design using wireless sensor network and biometric technologies; International Journal of Application or Innovation in Engineering & Management; 2(3); pp. 413-429; Mar. 2013.

Hajlaoui et al.; A frame aggregation scheduler for QoS-sensitive applications in IEEE802.11n WLANs; (ICCIT) Int. Conf. on Communications and Information Tech.; pp. 221-226; Jun. 26-28, 2012.

Iijima et al.; NETCONF over WebSocket; 82nd IETF Meeting, Taipei, Taiwan; retrived from the internet (http://www.ietf.org/proceedings/82/slides/netconf-1.pdf); 9 pgs.; Nov. 13-18, 2011.

Lewis, F. L.; Chapter 2: Wireless Sensor Networks; in Smart Environments: Technologies, Protocols, and Applications (eds Cook and Das); John Wiley & Sons, Inc.; Hoboken, NJ, USA; Sep. 2004 (pre-publication copy, 18 pgs.).

Liang et al.; Design and implementation of wireless smart-home sensor network based on ZigBee protocol; IEEE; International Conf. on Communications; Circuits and systems, ICCCAS 2008; May 25-27, 2008.

Nakajima et al.; A simple and efficient selective repeat scheme for high throughput WLAN; IEEE802.11n; IEEEVTS Vehicular Tech. Conf. Proc.; pp. 1302-1306; Apr. 22-25, 2007.

Netvox; Intelligent home automation system (Product Catalog); 123 pgs.; retrieved from the internet on Jul. 8, 2014 (http://www.netvox.com.tw/download/Netvox%20Catalog(English%20Version)%2020131129.pdf).

Open Networking Foundation; OpenFlow management and configuration protocol (OF-Config 1.1); retrieved from the internet: (www.opennetworking.org/images/stories/downloads/sdn-resources/onf-specifications/openflow-config/of-config-1.1pdf); 117 pgs.; Jun. 25, 2012.

Zhang et al.; Prediction-based link-layer dynamic fragmentation and aggregation for wireless mesh networks; 2008 ISECS int. Colloquium on Computing, Communication, Control, and Management; vol. 2; pp. 582-586; Aug. 3-4, 2008.

Sanford et al.; U.S. Appl. No. 14/486,992 entitled "Dual receiver/transmitter radio devices with choke," filed Sep. 15, 2014.

Lascari et al.; U.S. Appl. No. 14/511,823 entitled "Wireless radio system optimization by persistent spectrum analysis," filed Oct. 10, 2014.

Internet Engineering Task Force (IETF); The WebSocket Protocol; 72 pgs.; Dec. 2011; retrieved from the internet on Mar. 6, 2014 from https://tools.ietf.org/html/rfc6455.

Kishk et al.; Conical dielectric resonator antennas for wide-band applications; IEEE Trans.; vol. AP-50; Issue 4; pp. 469-474; Apr. 2002.

Liu et al.; Design of antenna radome composed of metamaterials for high gain; Antenna and Propogation Society Symposium; IEEE; pp. 19-22; Jul. 9-14, 2006.

Marcincak, Martin; AirGrid M5; 3 pgs.; Jan. 27, 2010; retrieved from the internet: http://www.youtube.com/watch?v=L4Z99Uzz-Bc (this web address was available to applicant(s) at least as of Jan. 27, 2010).

Rosenberg et al.; Session Traversal Utilities for NAT (STUN); 52 pgs.; Oct. 2008; retrieved from the internet on Mar. 6, 2014 from http://tools.ietf.org/search/rfc5389.

Russell et al.; The Bayeux Specification; 25 pgs.; 2007; retrieved from the internet on Mar. 6, 2014 from http://svn.cometd.org/trunk/bayeux/bayeux.html.

Streakwave Wireless; Ubiquiti Nanobridge m Series Product Overview; 2 pgs.; Jan. 12, 2012; retrieved from the internet: http//www.youtube.com/watch?v=DF_hx6iDIAM (this web address was available to applicant(s) at least as of Jan. 12, 2012).

(56) References Cited

OTHER PUBLICATIONS

Ubiquiti Networks; AirGrid M Datasheet; © 2011-2013; pp. 1-10; Jun. 21, 2013; retrieved from the internet (http://dl.ubnt.com/datasheets/airgridm/agmhp_datasheet_web.pdf).

Ubiquiti Networks; Nanobridge M Quick Start Guide; 20 pgs.; Mar. 27, 2012; retrieved from the internet (http://dl.ubnt.com/guides/nanobridge/nanobridge_M_QSG.pdf).

Schulz et al.; U.S. Appl. No. 13/843,205 entitled "Radio System for Long-Range High-Speed Wireless Communication," filed Mar. 15, 2013.

Sanford, John; U.S. Appl. No. 14/170,203 entitled "Stacked Array Antennas for High-Speed Wireless Communication," filed Jan. 31, 2014.

Sanford, John; U.S. Appl. No. 14/170,258 entitled "Transmission and Reception of High-Speed Wireless Communication Using a Stacked Array Antenna," filed Jan. 31, 2014.

Huerta et al.; U.S. Appl. No. 14/170,307 entitled "Adjustable-Tilt Housing With Flattened Dome Shape, Array Antenna, and Bracket Mount," filed Jan. 31, 2014.

Sanford et al.; U.S. Appl. No. 14/170,441 entitled "Dual Receiver/Transmitter Radio Devices With Choke," filed Jan. 31, 2014.

Schulz et al.; U.S. Appl. No. 14/170,467 entitled "Agile Duplexing Wireless Radio Devices," filed Jan. 31, 2014.

Sanford, John; U.S. Appl. No. 14/170,507 entitled "Coaxial Rf Dual-Polarized Waveguide Filter and Method," filed Jan. 31, 2014.

Schulz et al.; U.S. Appl. No. 14/170,528 entitled "Operation of Radio Devices for Long-Range Highspeed Wireless Communication," filed Jan. 31, 2014.

Chien et al.; U.S. Appl. No. 14/197,896 entitled "Hybrid fiber optic and power over ethernet," filed Mar. 5, 2014.

Hardy et al.; U.S. Appl. No. 14/639,909 entitled "Cloud device identification and authentication," filed Mar. 5, 2015.

Pera et al.; U.S. Appl. No. 14/639,892 entitled "Power receptacle wireless access point devices for networked living and work spaces," filed Mar. 5, 2015.

Pera et al.; U.S. Appl. No. 14/639,905 entitled "Wall-mounted interactive sensing and audio-visual devices for networked living and work spaces," filed Mar. 5, 2015.

Dayanandan et al.; U.S. Appl. No. 14/659,397 entitled "Methods of operating an access point using a plurality of directional beams," filed Mar. 16, 2015.

Sanford et al.; U.S. Appl. No. 14/659,424 entitled "Array antennas having a plurality of directional beams," filed Mar. 16, 2015.

Sanford; U.S. Appl. No. 14/659,445 entitled "Compact radio frequency lenses," filed Mar. 16, 2015.

Sanford et al.; U.S. Appl. No. 14/676,600 entitled "Antenna assembly," filed Apr. 1, 2015.

ETSI; Reconfigurable radio systems(RRS) functional architecture (FA) for the managemennt and control of reconfigurable radio systems; ETSI TR 102 682 V1.1.1; 45 pages; retrieved from the internet (http://portal.etsi.org/webapp/WorkProgram/Report_WorkItem.asp?WKI_ID=28797); © Jul. 17, 2009.

Dayanandan at al.; U.S. Appl. No. 14/753,952 entitled "Methods and apparatuses for graphically indicating station efficiency and pseudo-dynamic error vector magnitude information for a network of wireless stations," filed Jun. 29, 2015.

Hardy et al.; U.S. Appl. No. 14/918,381 entitled "Cloud device identification and authentication," filed Oct. 20, 2015.

Dayanandan et al.; U.S. Appl. No. 14/918,320 entitled "Methods and apparatuses for graphically indicating station efficiency and pseudo-dynamic error vector magnitude information for a network of wireless stations," filed Oct. 20, 2015.

Dayanandan et al.; U.S. Appl. No. 14/938,674 entitled "Methods and tools for persistent spectrum analysis of an operating radio frequency band," filed Nov. 11, 2015.

\* cited by examiner

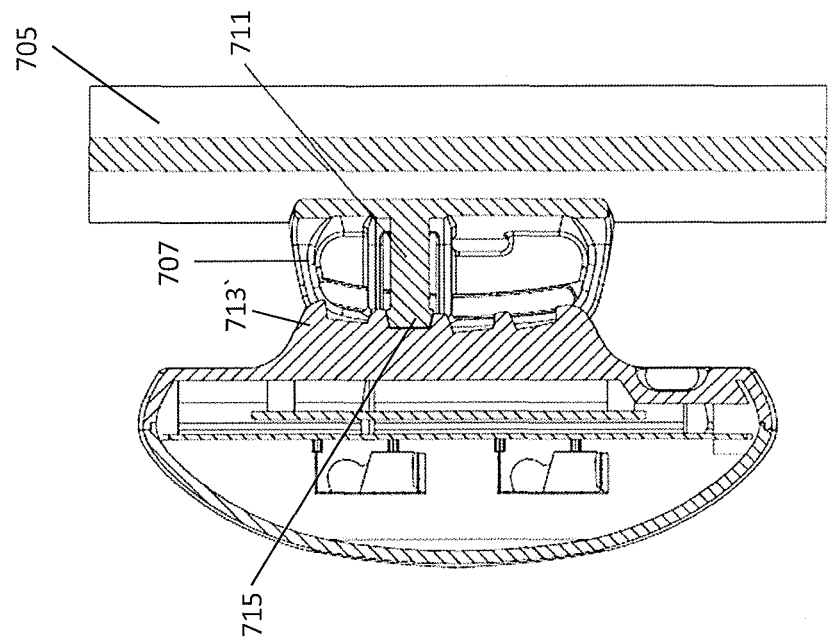
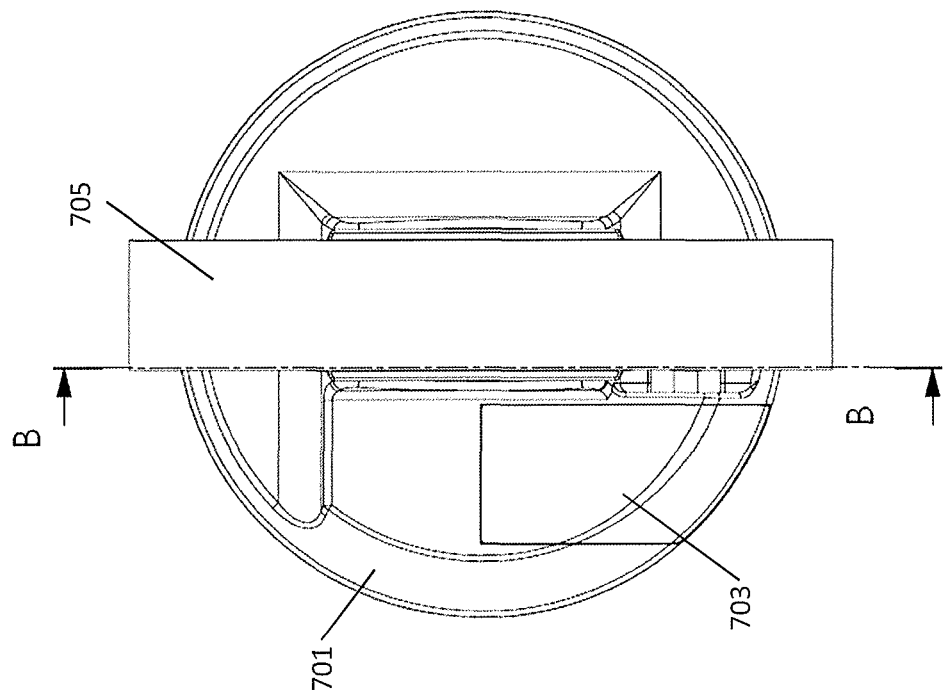
FIG. 7B
FIG. 7A

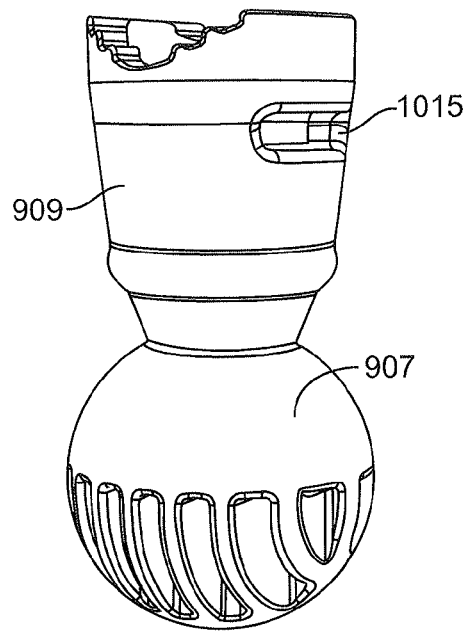
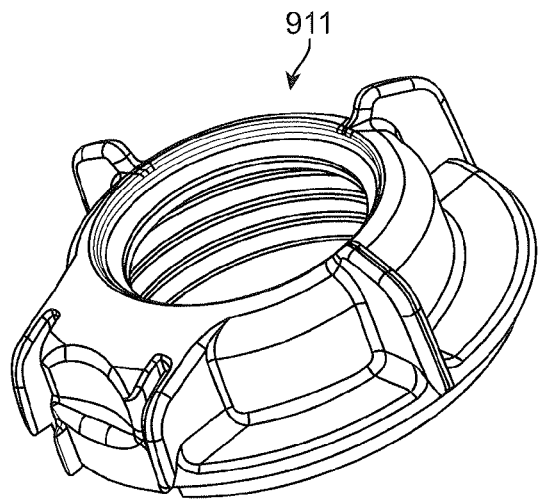
FIG. 10A
FIG. 10B
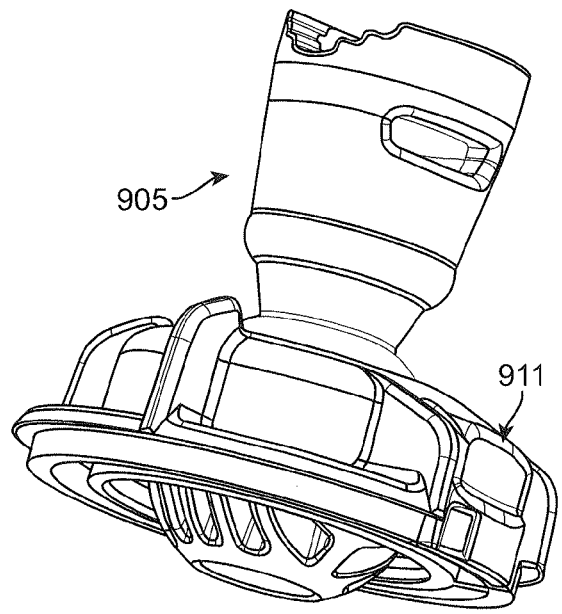
FIG. 10C

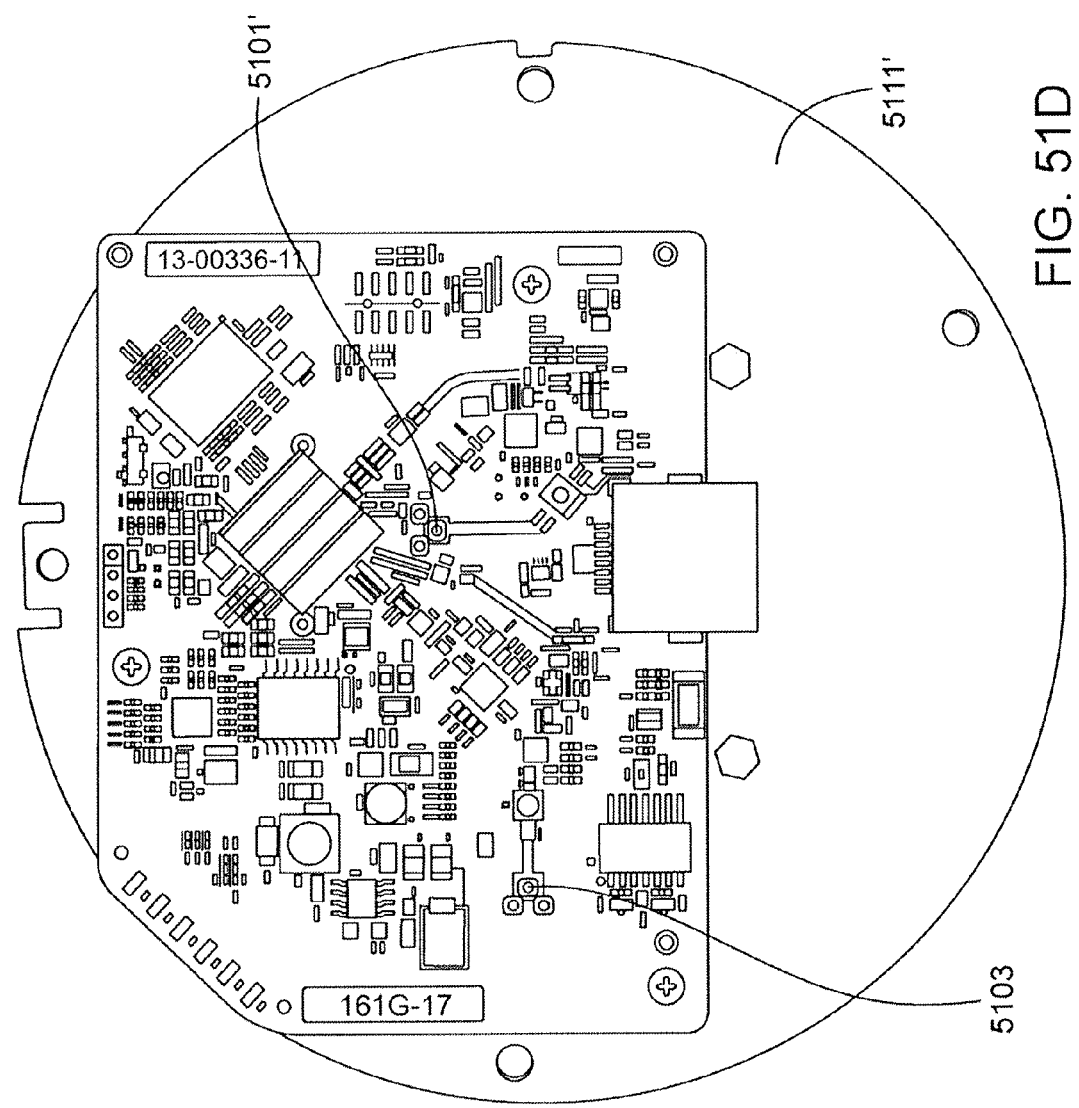

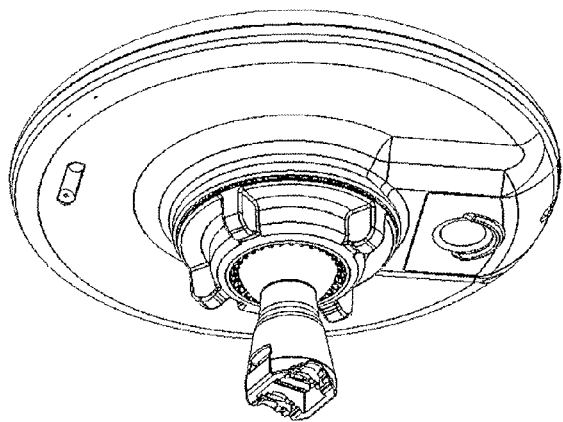 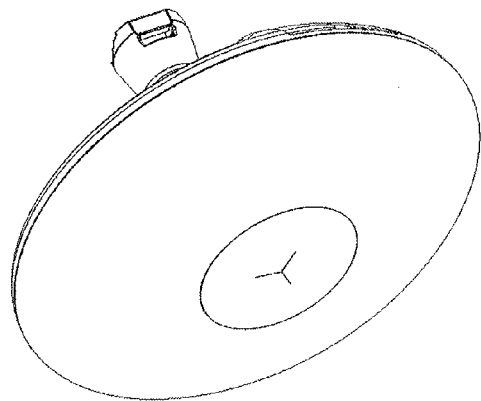
FIG. 63A  FIG. 63B
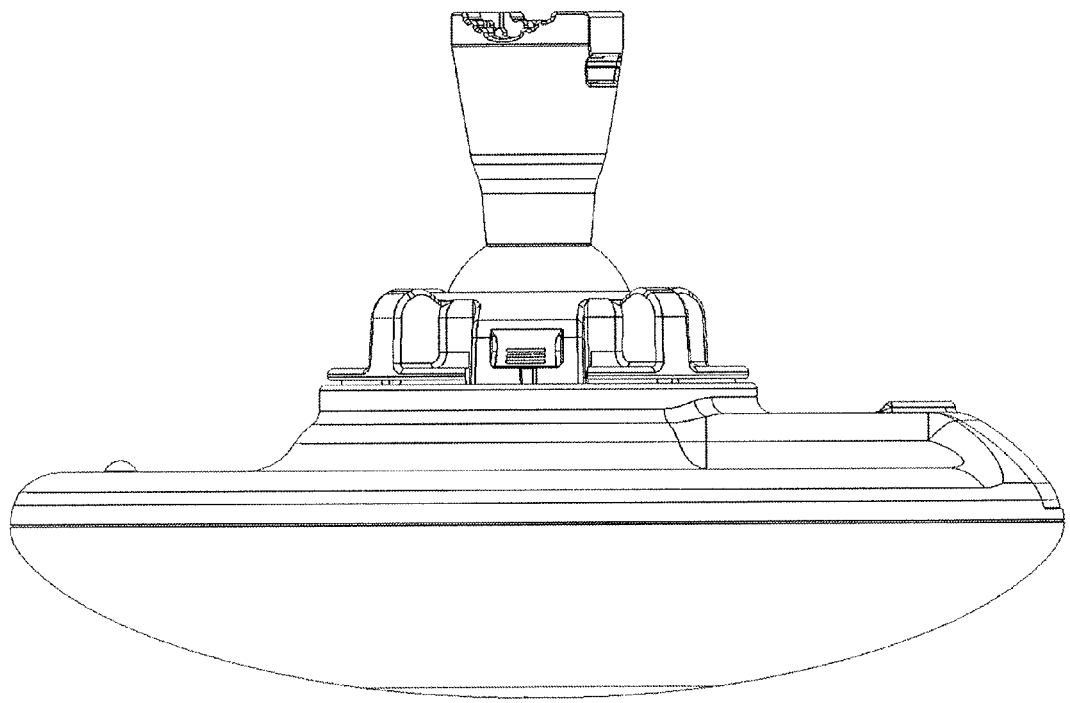
FIG. 63C

RADIO SYSTEM FOR HIGH-SPEED WIRELESS COMMUNICATION

CROSS REFERENCE TO RELATED APPLICATIONS

This patent application claims priority to: U.S. Provisional Patent Application No. 61/874,907 titled "RADIO SYSTEM FOR HIGH-SPEED WIRELESS COMMUNICATION", filed on Sep. 6, 2013; U.S. Provisional Patent Application No. 61/888,428, titled "RADIO SYSTEM FOR HIGH-SPEED WIRELESS COMMUNICATION", filed on Oct. 8, 2013; and U.S. Provisional Patent Application No. 61/920,416, titled "RADIO SYSTEM FOR HIGH-SPEED WIRELESS COMMUNICATION", filed on Dec. 23, 2013, each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The apparatuses (devices and systems) and methods of making and using them described herein relate generally to wireless radio and antenna devices that are configured to form part of a broadband wireless system for use as part of a system for accessing the internet, even in relatively remote regions. The wireless transmission stations described herein may be configured for indoor, outdoor, or indoor and outdoor use.

BACKGROUND

Bundled media services (e.g., combination packages of television, telephone, and broadband internet services) have been successfully offered to households with wired connections to service provider networks. Households in areas without such wired connections (e.g., customer in regions that cannot be reached via conventional communication media, such as optical cables, copper cables, and/or other fixed wire-based technologies) may rely on fixed wireless services for some of these services (e.g., broadband access). Fixed wireless services can be made more attractive to customers by effectively leverage existing customer premises equipment (CPE).

In particular, there is a growing need to develop systems to deliver broadband to remote and under-served regions, for which traditional broadband (e.g., wired or cabled delivery) is not available or possible. To date, delivering high performance networking in underserved and underpenetrated regions has been challenging because of the lack of durable and powerful systems, including antenna-based systems, capable of operating with sufficient flexibility to provide point-to-point as well as point-to-multipoint communication between client stations (e.g., home or business locations) and an internet service provider, including wireless internet service providers.

To keep cost the costs of such devices down, so that they may be provided to even underserved communities at a reasonable price, such antenna must be both reliable and also easy to manufacture, and easy to use. In addition, these antennas must have a sufficiently large bandwidth in an appropriate band. Further, the devices must be compact, yet have minimal line radiation and other sources of noise.

Ideally, such systems would include user-friendly devices including amplifying, broadband radios/antenna that are robust (including for use in outdoor regions), and easy to install and use. Described herein are devices and systems that may address the issue raised above.

SUMMARY OF THE DISCLOSURE

The present invention relates generally to wireless transmission stations, including wireless broadband radio devices. These apparatuses, including devices and systems, may be wireless broadband access devices that are configurable as a point-to-point or point-to-multipoint stations.

These apparatuses may include an array antenna and control circuitry configured to control transmission and receipt of broadband information to and from an antenna. In general, an array antenna, which may also be referred to as a patch array antenna or patch antenna, may be formed of a plurality of antenna radiating elements each having a radiating surface. The antenna arrays described herein may also be configured and/or referred to as planar antennas or planar array antennas.

The control circuitry of the wireless transmission stations may be adapted to operate with an array antenna using a layered printed circuit board that minimizes impedance mismatch. The wireless transmission stations may also include a housing having a mount (e.g., bracket mount) for adjustably connecting the apparatus to a bracket that can be connected to a pole, wall, stand or any other surface. The housing may be adapted to allow the apparatus to be aimed, e.g., towards another wireless broadband access apparatus, and the housing may also be adapted so that once positioned, it may be locked into place. In some variations locking the device in position may irreversibly deform a component to help retain the positioning. The housing may include one or more antenna alignment features, including an integrated spirit (or bubble) level that is part of the outer housing and may be visible by the person adjusting or positioning the apparatus.

The housing may also permit the display of one or more indicators (e.g., indicating lights, LEDs, etc.) from within the housing to be visible outside of the housing; this may permit the device to be operated without compromising the housing enclosure (e.g., seal). For example, the housing may include a transparent or opaque region that permits transmission of a visible indicator (e.g., light) through the housing.

It should be understood that any of the features or elements described herein may be used alone or in conjunction with any of the other features described herein, except where noted otherwise. Although the description below be divided up into sections (e.g., describing the patch antenna, housing, housing mount, etc.), it should be understood that this is for convenience, and features described in one section may be used with the apparatuses and methods described in other sections. An apparatus may include some or all of these features.

For example, described herein are wireless transmission stations that may be configured as amplifying radio and antenna devices for providing wireless broadband access and data transmission configured for indoor and/or outdoor use as a point-to-point or point-to-multipoint station. These devices may include a housing with an integrated tiltable or tilt-selectable bracket or mount (or integrated connector to a bracket or mount), an array antenna having a plurality (e.g., 2, 4, 9, etc.) of patch antennas (antenna radiating elements) arranged within the housing. In any of the apparatuses described herein, the array antenna may have a tiered construction, having multiple (e.g., discrete) layers. The tiered construction may separate the patch antennas, each comprising an antenna radiating element (also referred to as a patch radiating element or simply radiating element) into a separate plane or planes from the antenna feed line (e.g., an antenna feed plate that feed multiple radiating elements, and/or a plurality of feed lines that each feed one or more radiating element), and a separate plane than the ground plate. Although in general the array antennas described herein may include antenna radiating elements each having a radiating surface, where the radiating elements are in the same plane, in any of the variations described herein some or all of the antenna radiating elements may be positioned in different planes. In general, the tiered configuration described herein is an arrangement that may allow the array to be more closely packed in the xy dimension (e.g., the radiating elements may be closer to each other than the one-half wavelength of the wavelength of radiation of the patch array). Further, any of the patch/array antennas described herein may have patch radiating elements with radiating surfaces that are slightly differently-sized, preventing reflected in-phase energy from interfering with the operation. In addition to arranging the radiating elements, feed and ground in different planes (along the z axis), the use of radiating surfaces having different sizes is another difference from conventional array (patch) antennas, which typically have an array of radiating elements that are all the same sizes. Any of the apparatuses (device and systems) described herein may also be used with array antennas having radiating elements that are the same (or approximately the same) sizes. The location of any connection to the radiating elements may be off-center relative to the center of the radiating surface. The connection to the antenna feed between each radiating surface and the antenna feed may be made at an edge of the radiating element, or it may be made at a location more centrally (though not in the center) of each antenna feed. The attachment between the antenna feed and the radiating element may be chosen so that the radiating elements may be closely arranged.

In general, any of the antennas described herein may be used for transmission and/or receiving broadband data. Thus, any of the radiating elements, including radiating surfaces may be used both to transmit and to receive broadband data. In general, unless the context indicates otherwise, a "transmitter" or a "receiver" may be referred to as either a transmitter or receiver, or as a transceiver.

The apparatuses described herein may generally be weather and/or water resistant/proof, and may include one or more controllers for controlling transmission/reception from the antenna of wireless, broadband data. The controller may be configured to permit sending and receiving of wireless broadband signals. The controller may be hardware (e.g., circuitry), software, and/or firmware (including reprogrammable/reconfigurable circuitry). For example, the controller may support one or more of the broadband transmission protocols commonly used in the industry, such as a time division multiple access (TDMA) protocol, or Carrier Sense Multiple Access (CSMA) protocol, frequency division multiple access (FDMA), Code Division Multiple Access (CDMA), etc. These devices may be configured to be positioned outside to transmit over intermediate (e.g., <1, 3-5, 5-10, etc. kilometers) or long (e.g., tens to hundreds of kilometers) ranges as part of a system for wireless broadband transmission. In some variations, these devices may be advantageously configured to be powered by power over Ethernet (PoE) power supplies.

As described in detail below, in some variations, these devices are configured to be used indoors, outdoors, or outdoors and indoors, and may be adapted for sustained outdoor use. For example, the devices may be weatherproof, weather resistant, water proof, water resistant, etc. In some variations, these devices are configured for indoor use, and therefor may be adapted so that they do not include weather or water resistance/proofing features.

The array antenna apparatuses described herein may be referred to as stacked array antennas, or compact array antennas, because they may be arranged with tightly packed emitter surfaces above one or more feed surfaces. Any of these antennas may be used for high-speed wireless communication, including array antennas for wireless transmission having an array of emitters/receivers that are compactly arranged above an antenna feed and ground plate. These high gain devices may be configured to operate in any appropriate band, such as the 5.15 to 5.85 GHz band and/or the 2.40-2.48 GHz band. The antenna emitters are arranged in a separate plane (or planes) above an antenna feed connecting the emitting elements to the radio circuitry. The antenna feed is positioned between the emitters and a ground plane. The antenna array may be configured to operate with both horizontal and vertical polarization. The apparatuses may be configured for low impedance mismatch and may have a high gain relative to a very small and compact overall shape.

In general, the patch antennas included as part of these devices may be referred to as tiered, e.g., having three or more adjacent planes in which the patch radiating elements are above or in a first plane that is adjacent (and above) a second plane including the antenna feed (or feeds), which is also adjacent to (and above) a third plane comprising the ground plate/plane. The numbers used to refer to the planes (e.g. first plane, second plane, third plane) may be different; in general the patch radiating elements are arranged in the plane (or planes) furthest from the ground plane, with the antenna feeds arranged in the intermediate plane.

The patch antenna may also be characterized as having multiple radiating elements (antenna/patch radiators); some or all of the radiating surfaces corresponding to these antenna radiating elements may be different shapes and/or sizes. For example, the total surface areas of the radiating surface of the antenna (e.g., "patch") radiating elements, as well as the dimensions of the antenna feeds, may be slightly different from each other (and may vary from an average or mean size). For example, the total surface area of the all (or a sub-set) of the patch radiating elements may differ from the other patch radiating elements by between about 0.01% and about 20.00% (e.g., 0.1% to 20%, 0.1% to 15%, 0.1% to 10%, 0.1% to 5%, 1% to 5%, etc.) of the average surface area. Thus, for generally rectangular (including square) patch radiating elements, the width and/or length of each patch radiating element may be slightly different from each other and/or from the width and/or length of other patch radiating elements in the array. In some variations the width and/or length (the two dimensions in the plane of the emitting surfaces) may vary as a percentage of the one-half wavelength of radiation of the patch antenna. For example, the width and/or length may independently vary by less than about 20% (e.g., 15%, 10%, 9%, 8%, 7%, 6%, 5%, 4%, 3%, 2%, 1%) of the one-half wavelength of radiation of the patch antenna. The wavelength of radiation may itself be a range, and thus the surface area dimensions of each or a subset (e.g., 25%, 50%, 75%, 100%) of the patch radiating elements may fall within a range of values. Variations in the sizes of the antenna emitting elements (as well as in the shapes/sizes of the antenna feeds) may prevent summation of in-phase reflected energy that could otherwise result in a degradation of performance of the apparatus. However, some of the antenna variations described herein include antenna radiating elements that are approximately the same size and shape.

In some variations the radiating surfaces in the plurality of antenna radiating elements have a number of different surface areas. For example, the radiating surfaces may have different shapes and/or surface areas, around a particular value; e.g., the diameter of each of the radiating surfaces may vary relative to each other, but each one may have a diameter that is less than about 20.0% of the value of the one-half wavelength of radiation of the patch antenna. In some variations, the plurality of patch radiating elements have a plurality of radiating surfaces of different surface areas that vary from each other by between about 0.1% and 20.0%, between about 0.1% and 10.0%, between about 0.1% and 5.0%, etc.

In general, the dimensions and shape of the antenna feeds may be non-uniform. For example, the trace forming the antenna feed is not limited to straight and/or parallel lines. In some variations, all or some of the antenna feeds have width that varies along the length, (where length and width are dimensions in the plane of the antenna feed). Each antenna feed may have a different surface area in the third plane. Alternately, different antenna feeds may have very different shapes, including regions that are wider or narrower along the length; the variation may be continuous (e.g., curved or angled sides of the trace) or they may be continuous (steps). In some variations, each antenna feed may have a length and a width extending in the third plane, and wherein for at least half of the antenna feeds, the width varies along the length. An antenna feed line, which may also be referred to herein as a feed line, connector feed line, antenna feed, and/or microstrip line may refer to the conductive connector between radiating elements, including lines over an image plane of the antenna.

For example, described herein are patch array antennas comprising: a ground plate in a first plane; a plurality of antenna radiating elements above the first plane wherein the antenna radiating elements each have a radiating surface and these radiating surfaces extend above the first plane (and wherein the antenna radiating elements may extend in the same plane or in different planes); an antenna feed in a third plane between the first plane and the radiating surfaces; and a plurality of feed lines extending from the third plane, wherein each feed line connects an antenna radiating element to the antenna feed. As mentioned, any of these patch antennas may be configured for use as part of a radio and antenna device for providing wireless broadband access configured for use as a point-to-point or point-to-multipoint station.

The antenna feed may comprises a plurality of antenna feed regions in the third plane. The antenna feed may be a single plate (antenna feed plate). In some variations the antenna feed plate is divided up into different regions, e.g., different feed regions. The antenna feed plate may be cut to provide multiple paths along the length of the plate, where different regions form different paths. The antenna feed may generally include two connections, a vertical polarization connection and a horizontal polarization connection.

If the antenna feed is divided up into antenna feed regions, these regions may be different shapes and sizes. For example, an antenna feed may include a plurality of antenna feed regions that each have a length and a width extending in the third plane, and wherein for at least some of the antenna feeds, the width varies along the length. The antenna feed may comprises a plurality of antenna feed regions that each have a length and a width extending in the third plane, and wherein for at least half of the antenna feeds, the width varies along the length.

As mentioned, in general the antenna feed may include a vertical polarization feed connection connected to a first radio connection point, and a horizontal polarization feed connection connected to a second radio connection point.

Each of the antenna radiating elements is connected to the antenna feed by a feed line that extends from the plane of the antenna feed to the plane(s) of the antenna radiating elements. In some variations, the plurality of feed lines comprises a plurality of slant feed lines, wherein each slant feed line connects one side of an antenna radiating element to the antenna feed. The slant feed lines may extend at an angle in the z-axis between the antenna feed and the antenna radiating element. In some variations the feed lines extend perpendicular or substantially perpendicularly (+/– a few degrees of perpendicular relative to the third plane) from the antenna feed to the radiating element.

For example, the plurality of feed lines in an apparatus may a plurality of slant feed lines wherein each slant feed line connects to the edge of one antenna radiating element from the plurality of antenna radiating elements to the antenna feed, and/or a plurality of cylindrical feed lines wherein each cylindrical feed line connects one antenna radiating element from the plurality of antenna radiating elements to the antenna feed at a position that is off-center relative to the radiating surface of the antenna radiating element.

In general, the antenna feed may be formed of a single sheet of metal (e.g., conductive metal). The feed lines may be formed of the same material (e.g., metal). In some variations the feed lines are fused to the antenna feed(s) or are integrally formed with the antenna feed(s). In some variations, the plurality of antenna radiating elements, antenna feed, and plurality of feed lines are each or are all formed of a single sheet of metal. For example, the antenna radiating elements, antenna feed(s), and plurality of slant feed lines are all formed of a single sheet of tin plated steel, brass, or copper.

Although the radiating surfaces may typically extend in a single plane (e.g., the second plane) above, and typically parallel with, the first and third planes, in some variations the radiating surfaces of each antenna radiating element of the plurality of antenna radiating elements extend in multiple planes above the first plane. Each of these planes (e.g., the first plane, second plane and third plane) are distinct and may be separated from each other by a discrete amount, such as between about 2 and about 20 mm. For example, the first plane may be separated from the third plane by between about 1 and about 10 mm, and wherein the second plane is separate from the third plane by between about 1 and about 10 mm.

The surface area (e.g., size and surface dimensions) of the radiating elements may be uniform or the same for all of the antenna radiating elements; in some variations a surface area of the radiating surface of at least some of the antenna radiating elements in the plurality of antenna radiating elements may vary relative to each other by within about 20.0% of an average surface area of the radiating surfaces in the plurality of antenna radiating elements. For example, at least some of the antenna radiating elements in the plurality of antenna radiating elements may have different shapes and surface areas. In some example, the surface area of the radiating surface of at least some of the antenna radiating elements in the plurality of antenna radiating elements may vary relative to each other by between about 0.1% and 20.0% of an average surface area of the radiating surfaces in the plurality of antenna radiating elements. In some variations, the radiating surfaces of the plurality of antenna radiating elements have different surface areas that vary from each other by between about 0.1% and 10.0% of an average surface area of the radiating surfaces in the plurality of antenna radiating elements. The plurality of antenna radiating elements may have a plurality of radiating surfaces of different surface areas that vary from each other by between about 0.1% and 5.0%.

Any appropriate number of antenna radiating elements may be used, including in particular n by m arrays of antenna radiating elements. For example, the plurality of antenna radiating elements may include four antenna radiating elements (e.g., a 2×2 array). The plurality of antenna radiating elements consists of nine antenna radiating elements (e.g., a 3×3 array).

In general, the antenna gain for the array antenna described herein may be between about 15 and about 20 dB. The bandwidth of any of these antenna may be between about 5.15 to 5.85 GHz (e.g., "a 5 GHz antenna"); alternatively or additionally, the bandwidth of the antenna may be between about 2.40 to 2.48 GHz (e.g., "a 2 GHz antenna").

For example, a patch array antenna may include: a ground plate in a first plane; a plurality of antenna radiating elements extending in or above a second plane, wherein the second plane is above the first plane, and further wherein each antenna radiating element has a radiating surface extending parallel to the second plane; an antenna feed in a third plane between the first and second planes, the antenna feed comprising a vertical polarization feed connection connected to a first radio connection point and a horizontal polarization feed connection connected to a second radio connection point; and a plurality of feed lines, wherein each feed line connects an antenna radiating element from the plurality of antenna radiating elements to the antenna feed. Such patch array antennas may be configured as discussed and described herein. For example, a patch array antenna may include radiating surfaces that extend in the second plane.

The antenna feed may comprises a plurality of antenna feeds in the third plane (e.g., antenna feed regions). The plurality of feed lines may be selected from the group consisting of: a plurality of slant feed lines wherein each slant feed line connects to the edge of one antenna radiating element from the plurality of antenna radiating elements to the antenna feed, and a plurality of cylindrical feed lines wherein each cylindrical feed line connects one antenna radiating element from the plurality of antenna radiating elements to the microstrip feed at a position that is off-center relative to the radiating surface of the antenna radiating element.

In any of the variations described, adjacent antenna radiating elements are separated from each other by less than one-half of a wavelength of radiation of the patch array antenna.

A patch array antenna may include: a ground plate in a first plane; a plurality of antenna radiating elements each comprising a radiating surface, wherein the radiating surfaces extend in a second plane above the first plane; an antenna feed in a third plane between the first and second planes, the antenna feed comprising a vertical polarization feed connection connected to a first radio connection point and a horizontal polarization feed connection connected to a second radio connection point; and a plurality of feed lines extending from the third plane to the radiating surfaces, wherein the plurality of feed line are selected from the group consisting of: a plurality of slant feed lines wherein each slant feed line connects the edge of one antenna radiating element to the antenna feed, and a plurality of cylindrical feed lines wherein each cylindrical feed line connects one antenna radiating element to the microstrip feed at a position that is off-center relative to the radiating surface of the antenna radiating element As mentioned, the ground plate may not comprise a dielectric material. For example, the ground plate may comprise a metal (e.g., conductive metal) including stainless steel. In some variations the ground plate may be formed by stamping, and each of the patch radiating elements may be DC grounded (for lightening/EMI protection) by connection to the ground plane/plate. The connection may be made by soldering or the like, or by other securement, such as screwing. This connection may also securely hold the components of the patch antenna together.

As discussed above, in some variations the feed lines are configured as slant feed lines. In generally slant feed lines connect the patch radiating elements to the antenna feeds. The slant feed lines extend from an edge of each patch radiating element to an edge of an antenna feed. The slant feed lines may be referred to as slant feed lines because they extend between the adjacent planes of the antenna feed lines and the patch radiating elements at an angle (typically <90°, such as 30°, 45°, 60°, etc.) relative to these adjacent planes. In some variations, although the distance between adjacent patch radiating elements in the plane that they are located in (e.g., the "first" or "outer" plane), may be less than one-half of the wavelength of radiation of the patch antenna, the actual length between adjacent radiating elements is still in phase (e.g., a distance of approximately one-half the wavelength of radiation, one wavelength of radiation, etc.). This is because the actual distance must travel from the plane of the patch radiating elements to the plane of the antenna feed and back. For example, each patch radiating element may be connected to an adjacent patch radiating element such that a first radiating element is connected to a second radiating element by a first slant feed line, an antenna feed, and second slant feed line, to form a set of patch radiating elements, such that the distance between a midpoint of the first radiating element and a midpoint of the second radiating element is approximately one wavelength of radiation of the patch antenna when measured as the shortest distance between the midpoint on a surface of the first patch radiating element, down a surface of the first slant feed line, along a surface of the antenna feed, up the surface of the second slant feed line, and back along the surface of the second patch radiating element.

The antenna feed may include both a vertical polarization input and a horizontal polarization input. In some variations a subset of antenna feed lines may be configured as a vertical polarization feed network connected to a radio connection point, and the remaining antenna feed lines may be configured as a horizontal polarization feed connected to a radio connection point.

The various elements (planes) of the apparatus may be connected together so that the antenna is robustly secured together. For example, in some variations each patch radiating element is connected to the ground plate through a screw; the screw may be electrically isolated from the ground plate (e.g., by an insulated washer/spacer). The antenna feed may be connected directly to the radiating elements and/or the radio circuitry (e.g., radio connection point(s)), and may also be connected to the ground plate via an insulated connection (e.g., screw, post, etc.).

In some variations of a patch antenna, the plurality of patch radiating elements, antenna feed(s) and plurality of slant feed lines are all formed of a single sheet of appropriately conductive material, such a metals (including alloys). For example, the plurality of patch radiating elements, plurality of antenna feeds and plurality of slant feed lines may all be formed of a single sheet material such as tin plated steel, brass, or copper (or any other appropriate conductive materials, including non-metals). For example, the radiating elements and feed lines may be stamped from the material.

As mentioned, the antenna feeds, ground plate, and patch radiating elements may be separated from each other by a separation that provides an appropriate bandwidth for the antenna. For example, the first plane (the plane of the ground plate) and the second plane (the plane of the patch radiating element) may be separated by between about 2 and about 20 mm. Similarly, the ground plane may be separated from the antenna feed plane by between about 1 and about 10 mm, and the patch radiating element plane may be separate from the antenna feed plane by between about 1 and about 10 mm. These planes are generally adjacent to each other, and may, in some variations, be parallel to each other or at least non-intersecting over the dimensions of the antenna array.

In some examples, a patch array antenna comprises: a ground plate in a first plane; a plurality of patch radiating elements in a second plane above the first plane wherein each patch radiating element has a radiating surface extending in the second plane, further wherein adjacent patch radiating elements are separated from each other by less than one-half of a wavelength of radiation of the patch antenna; a plurality of antenna feeds in a third plane between the first and second planes; and a plurality of slant feed lines, wherein each slant feed line connects one side of a patch radiating element to an antenna feed.

In other examples, a patch array antenna comprises: a ground plate in a first plane; a plurality of patch radiating elements in a second plane above the first plane, wherein each patch radiating element has a radiating surface extending in the second plane and further wherein the plurality of patch radiating elements have a plurality of radiating surfaces of different surface areas that vary from each other by between about 0.1% and 20.0%; a plurality of antenna feeds in a third plane between the first and second planes, wherein each antenna feed has a length and a width extending in the third plane, and wherein for at least half of the antenna feeds, the width varies along the length, further wherein each antenna feed has a different surface area in the third plane; and a plurality of slant feed lines, wherein each slant feed line connects one side of a patch radiating element to an antenna feed.

In another specific example, a patch array antenna comprises: a ground plate in a first plane, wherein the ground plate does not comprise a dielectric; a plurality of patch radiating elements in a second plane above the first plane, wherein each patch radiating element has a radiating surface extending in the second plane and further wherein the plurality of patch radiating elements have a plurality of radiating surfaces of different surface areas that vary from each other by between about 0.1% and 20.0%; a plurality of antenna feeds in a third plane between the first and second planes, wherein each antenna feed has a length and a width extending in the third plane, and wherein for at least half of the antenna feeds, the width varies along the length, further wherein each antenna feed has a different surface area in the third plane; and a plurality of slant feed lines, wherein each slant feed line connects one side of a patch radiating element to an antenna feed; wherein each patch radiating element is connected to an adjacent patch radiating element such that a first radiating element is connected to a second radiating element by a first slant feed line, an antenna feed, and second slant feed line, to form a set of patch radiating elements, such that the distance between a midpoint of the first radiating element and a midpoint of the second radiating element is approximately one wavelength of radiation of the patch antenna when measured as the shortest distance between the midpoint on a surface of the first patch radiating element, down a surface of the first slant feed line, along a surface of the antenna feed, up the surface of the second slant feed line, and back along the surface of the second patch radiating element; wherein a subset of the antenna feeds are configured as a vertical polarization feed network connected to a radio connection point, and the remaining antenna feeds are configured as a horizontal polarization feed connected to a radio connection point; wherein each patch radiating element is connected to the ground plate through a grounding attachment.

Also described herein are methods of transmitting and receiving wireless broadband data using any of the apparatuses described herein. Thus, described herein are transmission and reception of high-speed wireless communications using a stacked array antenna, including methods of transmitting and receiving wireless signals using a compact antenna having an array of compactly arranged emitters/receivers. Wireless signals are transmitted from an antenna feed to the plurality of emitters/receivers in any appropriate band, such as the 5.15 to 5.85 GHz band and/or the 2.40-2.48 GHz band. The feed is connected to a radio connection point and from there may connect to the plurality of emitters/receivers arranged in a plane (or planes) above an antenna feed connecting the emitting elements to the radio connection point. The antenna feed is positioned between the emitters and a ground plane. Signals (e.g., horizontally and vertically polarized signals) may be emitted from the plurality of antenna radiating surfaces. Methods of manufacturing compact array antennas are also described.

For example, a method of transmitting wireless broadband data may include: transmitting broadband data from a feed connection to an antenna feed, wherein the feed connection is connected to a radio connection point; transmitting the broadband data from the antenna feed along a plurality of feed lines to a plurality of antenna radiating elements, wherein the antenna radiating elements are positioned in or above a second plane that is above a ground plate that extends in a first plane, further wherein the antenna feed extends in a third plane between the first plane and the antenna radiating elements, and wherein the plurality of feed lines extend from the third plane and connect to the antenna radiating elements; and emitting the broadband data from a plurality of antenna radiating surfaces, wherein each of the plurality of antenna radiating elements includes one of the plurality of antenna radiating surfaces.

In general, transmitting broadband data may comprise transmitting vertically polarized broadband data and/or transmitting horizontally polarized broadband data. For example, the method may include transmitting horizontally polarized broadband data from a horizontal polarization feed connection that is connected to a second radio connection point to the antenna feed. The method may include transmitting the horizontally polarized broadband data from the antenna feed to a plurality of horizontal polarization feed lines, wherein the horizontal polarization feed lines extend from the third plane and connect to the antenna radiating elements. The method may also include receiving broadband data on the antenna radiating surfaces and transmitting the broadband data to the antenna feed and from the antenna feed to the radio connection point via the feed connection.

In any of the methods described herein, the geometry of antenna may be as described above. For example, the antenna feed may comprise a plurality of antenna feed regions in the third plane. The plurality of feed lines may comprise a plurality of slant feed lines, wherein each slant feed line connects one side of an antenna radiating element to the antenna feed. The radiating surfaces may extend in the second plane. The first plane and the second plane may be separated by between about 2 and about 20 mm. The first plane may be separated from the third plane by between about 1 and about 10 mm, and wherein the second plane is separate from the third plane by between about 1 and about 10 mm. A surface area of the radiating surface of at least some of the antenna radiating elements may vary relative to each other by within about 20.0% of an average surface area of the radiating surfaces in the plurality of antenna radiating elements. At least some of the antenna radiating elements may have different shapes and surface areas. A surface area of the radiating surface of at least some of the antenna radiating elements may vary relative to each other by between about 0.1% and 20.0% of an average surface area of the radiating surfaces in the plurality of antenna radiating elements. The radiating surfaces of the plurality of antenna radiating elements may have different surface areas that vary from each other by between about 0.1% and 10.0% of an average surface area of the radiating surfaces in the plurality of antenna radiating elements. The antenna feed may comprise a plurality of antenna feed regions that each have a length and a width extending in the third plane, and wherein for at least some of the antenna feeds, the width varies along the length. The antenna feed may comprise a plurality of antenna feed regions that each have a length and a width extending in the third plane, and wherein for at least half of the antenna feeds, the width varies along the length. The plurality of feed lines may be selected from the group consisting of: a plurality of slant feed lines wherein each slant feed line connects to the edge of one antenna radiating element from the plurality of antenna radiating elements to the antenna feed, and a plurality of cylindrical feed lines wherein each cylindrical feed line connects one antenna radiating element from the plurality of antenna radiating elements to the antenna feed at a position that is off-center relative to the radiating surface of the antenna radiating element. The antenna feed may be formed of a single sheet of metal. The plurality of antenna radiating elements, antenna feed, and plurality of feed lines may be formed of a single sheet of metal. The plurality of antenna radiating elements, antenna feed, and plurality of feed lines may all formed of a single sheet of tin plated steel, brass, or copper. The plurality of antenna radiating elements may consist of four antenna radiating elements. The plurality of antenna radiating elements may consist of nine antenna radiating elements.

The gain of the transmitted broadband data may be between about 15 and about 20 dB. The bandwidth of the transmitted and received broadband data may be between about 5.15 to 5.85 GHz. The bandwidth of the transmitted and received broadband data may be between about 2.40 to 2.48 GHz.

In some variations, the method of transmitting and receiving wireless broadband data may include: transmitting vertically polarized broadband data from a vertical polarization feed connection to an antenna feed, wherein the vertical polarization feed connection is connected to a first radio connection point; transmitting horizontally polarized broadband data from a horizontal polarization feed connection to the antenna feed, wherein the horizontal polarization feed connection is connected to a second radio connection point; transmitting the vertically polarized broadband data from the antenna feed along a plurality of vertical polarization feed lines to a plurality of antenna radiating elements; transmitting the horizontally polarized broadband data from the antenna feed along a plurality of horizontal polarization feed lines to a plurality of antenna radiating elements; wherein the antenna radiating elements are positioned in or above a second plane that is above a ground plate that extends in a first plane, further wherein the antenna feed extends in a third plane between the first plane and the antenna radiating elements, and wherein the plurality of feed lines extend from the third plane and connect to the antenna radiating elements; and emitting the horizontally and vertically polarized broadband data from a plurality of antenna radiating surfaces, wherein each of the plurality of antenna radiating elements includes one of the plurality of antenna radiating surfaces. The method may also include receiving broadband data on the antenna radiating surfaces and transmitting the broadband data to the antenna feed. The method may also include receiving broadband data on the antenna radiating surfaces and transmitting the broadband data to the antenna feed and from the antenna feed to the first radio connection point via the vertical polarization feed connection. The method may also include receiving broadband data on the antenna radiating surfaces and transmitting the broadband data to the antenna feed and from the antenna feed to the second radio connection point via the horizontal polarization feed connection.

In general, methods of making and/or manufacturing patch antenna arrays (alone or as part of an apparatus including a housing) are also described herein. For example, described herein are methods of manufacturing a patch array antenna, the method comprising: forming a plurality of patch radiating elements, a plurality of antenna feeds, and a plurality of slant feed lines from a single sheet of metal, so that the plurality of patch radiating elements are arranged in a first plane and the plurality of antenna feeds are arranged in a second plane adjacent to the first plane, and each patch radiating element is connected one or more of the antenna feeds by one or more of the slant feed lines; and connecting the patch radiating elements to a ground plate, wherein the ground plate is in a third plane that is adjacent to the second plane.

As mentioned above, in some variations, the single sheet of metal comprises a single sheet of tin plated steel, brass, or copper.

The step of connecting the patch radiating elements to the ground plate may include connecting the patch radiating elements to a non-dielectric ground plate. For example, the two may be connected by soldering, screwing, etc.

The step of forming may comprise stamping the plurality of patch radiating elements, the plurality of antenna feeds, and the plurality of slant feed lines from a single sheet of metal. In some variations, the step of forming comprises bending the slant single sheet of metal to position the plurality of patch radiating elements in the first plane and the plurality of antenna feeds in the second plane with the plurality of slant feed lines connecting the plurality of patch radiating elements and the plurality of antenna feeds. The stamping and/or bending may be performed in the same step (e.g., using a mandrel, press, etc.), or they may be performed separately.

In some variations, the step of forming comprises forming a bend between the plurality of slant feed lines and the plurality of patch radiating elements, and forming a bend between the slant feed lines and the plurality of antenna feeds.

The step of forming may also comprise forming a plurality of patch radiating elements having a different surface areas in the first plane that vary from each other by between about 0.1% and 20%, as described above.

The patch antenna may generally be included within a housing that is configured to adjustably and reliably hold the device to a mount. The mount may be positioned indoors or outdoors and may be used as part of an overall system. Thus, described herein are adjustable-tilt housings having a flattened dome shape, an array antenna, and a bracket mount. For example, radio devices for wireless transmission may include an integrated adjustable mount allowing mounting to a pole or stand and adjustment of the angle of the device (e.g., the altitude). The device may include a compact array antenna having a high gain configured to operate in, for example, the 5.15 to 5.85 GHz band and/or the 2.40-2.48 GHz band. The antenna emitters may be arranged in a separate plane from a plane containing the antenna feed connecting the emitting elements and also from a ground plane. The antenna array may be contained within a protective weatherproof housing along with the radio control circuitry In some variations, the devices described herein include: a disc-shaped housing having a flattened dome shaped front region and a back region having an integrated bracket mount; a plurality of antennas held within the housing and arranged across a surface within the housing as a patch antenna; and a bracket configured to couple to a pole, the bracket further configured to engage with the bracket mount, wherein the bracket and bracket mount cooperate to form a plurality of selectable positions securing the housing at different tilt angles relative to the bracket.

The housing maybe configured as a flattened-dome on at least one (e.g., the front) side. This shape may allow space for the plurality of antenna to be distributed over a plane within the housing (e.g., in a two-dimensional spreading pattern within the housing, e.g., a box pattern). The back of the housing may be flattened, flattened-dome shaped, or the like, and typically includes the integrated bracket mount region. The front and back regions may be secured (e.g., sealed, welded, plastic welded etc.) together to enclose the antenna and any electronics, such as a controller for controlling operation of the antenna.

In some variations, the device includes a lock configured to secure the bracket to the housing. The lock may be a connector (e.g., snap-fit, or snap-engaging connector) between the bracket and the housing or it may be the combination of one or more windows through the bracket and bracket mount through which a tie (e.g., zip-tied) mounting the device to a pole, post or the like passes.

In some variations, the bracket mount comprises a ball socket and threaded clamp. The threaded clamp may, for example, fit (by screwing) over the ball-socket. Tightening the threaded clamp may lock the position of the ball of the bracket (e.g., a ball joint) within the socket. Additional locking mechanisms may be included.

In general, the housing may be configured to form a weather-resistant, water-resistant, waterproof and/or waterproof enclosure around the plurality of antennas and/or controller.

The bracket (or mount) is generally configured to secure the device to a pole or post. For example, the bracket may comprise a concave pole mount region configured to be connected at least partially around a pole. The bracket mount typically couples to the bracket so that the tilt angle between the housing and the bracket (and therefore the tilt angle of the device when mounted) may be set and/or adjusted with a range. In some variations, the tilt angle may be selected from a plurality of predetermined positions. For example, the bracket and bracket mount may cooperate to form a plurality of selectable positions securing the housing at different tilt angles relative to the bracket extending over about a 20° range. The bracket and bracket mount may cooperate to form a plurality of selectable positions separated by between about 10° and about 3° in tilt.

In some variations, the housing includes an integrated and visible level element, showing the angle/level of the housing relative to the horizon (gravity).

In general, the bracket engages with the integrated bracket mount. For example, in some variations the bracket mount may include an elongate curved channel into which the bracket rides. The bracket may comprise a fastening pass-through configured to pass a tie for securing to a pole. In some variations, the rear region comprises a fastening pass-through configured to align with the fastening pass-through of the bracket.

In some variations, the bracket includes a ball (forming a ball joint) to made with the integrated bracket mount.

As mentioned, the devices may include a patch antenna array having any number of patch antennas (e.g., 2, 3, 4, 5, 6, 7, 8, 9, etc.). For example, the devices may include at least four patch antennas, arranged across a surface within the housing (e.g., in a two-dimensional pattern that fills the 2D space of an antenna board within the housing). For example, these apparatuses may include any of the patch antennas described above.

Any of the devices described herein may include a power over Ethernet (PoE) port that can be accessed on, in or through the housing and configured to receive a PoE cable. Thus, the device may be powered by the combined data/power line of a power over Ethernet cable.

As mentioned above, any of the devices described herein may include a controller connected to the antennas and configured to send and receive wireless broadband signals from the patch antenna. For example, the devices may include a controller connected to the patch antenna and configured to send and receive wireless broadband signals using a time division multiple access (TDMA) protocol.

In some variations the housing may also include a door (e.g., hinged, sliding, or swinging door) for accessing an inside of the disc-shaped housing.

For example, described herein are amplifying radio and antenna devices for providing wireless broadband access, using an appropriate broadband transmission protocol, for example a time division multiple access (TDMA) protocol. In some variations, the device is configured for outdoor or for outdoor/indoor use. The device may be configured for use as a point-to-point or point-to-multipoint station, the device comprising: a disc-shaped housing comprising a rear region having an integrated bracket mount and a front region configured as a flattened dome; a plurality of antennas held within the housing; an integrated circuit connected to the plurality of antenna and configured to send and receive wireless broadband signals using the antenna; and a bracket configured to couple to a pole, the bracket further configured to engage with the bracket mount, wherein the bracket and bracket mount cooperate to form a plurality of selectable tilt positions of the housing relative to the bracket.

As mentioned above, tiered array antennas may generally include tightly packed antenna radiating element that are closely packed, so that the distance from midpoint of the radiating element to midpoint of an adjacent radiating element is less than one-half of a wavelength of radiation of that patch array antenna (tiered array antenna). It is understood that the radiating elements (and radiating surfaces) described herein both transmit and receive radiation (RF radiation). By arranging the radiating elements of the antenna in a different plane than the connectors (antenna feeds) between the radiating elements, these elements may be packed more tightly.

For example, described herein are patch array antennas that generally include: a ground plate in a first plane; a plurality of antenna radiating elements above the first plane wherein each antenna radiating element has a radiating surface extending in one or more planes above the first plane; a plurality of antenna feeds in a third plane between the first plane and the radiating surfaces; and a plurality of slant feed lines, wherein each slant feed line connects one side of an antenna radiating element to an antenna feed from the plurality of antenna feeds. The radiating surfaces of each antenna radiating element of the plurality of antenna radiating elements may all extend in a second plane above the first plane. The first plane and the second plane may be separated by between about 2 and about 20 mm. The first plane is separated from the third plane by between about 1 and about 10 mm, and wherein the second plane is separate from the third plane by between about 1 and about 10 mm.

At least some of the antenna radiating elements in the plurality of antenna radiating elements may have different shapes and surface areas. For example, a surface area of the radiating surface of at least some of the antenna radiating elements in the plurality of antenna radiating elements may vary relative to each other by within about 20.0% of an average surface area of the radiating surfaces in the plurality of antenna radiating elements. The surface area of the radiating surface of at least some of the antenna radiating elements in the plurality of antenna radiating elements may vary relative to each other by between about 0.1% and 20.0% of an average surface area of the radiating surfaces in the plurality of antenna radiating elements. In some variations, the radiating surfaces of the plurality of antenna radiating elements have different surface areas that vary from each other by between about 0.1% and 10.0% of an average surface area of the radiating surfaces in the plurality of antenna radiating elements. The plurality of antenna radiating elements may have a plurality of radiating surfaces of different surface areas that vary from each other by between about 0.1% and 5.0%.

In general, as mentioned above, the dimensions of the antenna feed antennas may be irregular, and may change diameter along their length. For example, each antenna feed may have a length and a width extending in the third plane, and wherein for at least some of the antenna feeds, the width varies along the length. Each antenna feed may have a length and a width extending in the third plane, and wherein for at least half of the antenna feeds, the width varies along the length. The irregular shape, which may include having nonparallel sides over the length of the antenna feed, may be configured to optimize the behavior of the array antenna.

For any of the patch array antennas described herein, each antenna radiating element may be connected to an adjacent antenna radiating element such that a first antenna radiating element is connected to a second antenna radiating element by a first slant feed line, an antenna feed, and second slant feed line, to form a set of antenna radiating elements, such that the distance between a midpoint of the first antenna radiating element and a midpoint of the second antenna radiating element is approximately one wavelength of radiation of the patch antenna when measured as the shortest distance between the midpoint on a surface of the first antenna radiating element, down a surface of the first slant feed line, along a surface of the antenna feed, up the surface of the second slant feed line, and back along the surface of the second antenna radiating element.

As mentioned, the antennas described herein may be configured to have both vertical and horizontal polarization. For example, in any of the antenna arrays described herein, a subset of the antenna feeds may be configured as a vertical polarization feed network connected to a first radio connection point, and the remaining antenna feeds are configured as a horizontal polarization feed connected to a second radio connection point.

In general, each antenna radiating element is connected to the ground plate through a grounding attachment. For example, each antenna radiating element is connected to the ground plate through a grounding attachment that is positioned off-center relative to the radiating surface of the antenna radiating element.

As mentioned, in manufacturing the array antennas described herein, the plurality of antenna radiating elements, plurality of antenna feeds, and plurality of slant feed lines may all formed of a single sheet of metal. For example, the plurality of antenna radiating elements, plurality of antenna feeds, and plurality of slant feed lines may all be formed of a single sheet of tin plated steel, brass, or copper.

In some variations, the plurality of antenna radiating elements consists of four antenna radiating elements, which may be arranged as a 2×2 array. In some variations, the plurality of antenna radiating elements consists of nine antenna radiating elements, which may be arranged as a 3×3 array.

Also described herein are patch array antennas comprising: a ground plate in a first plane; a plurality of antenna radiating elements in a second plane above the first plane wherein each antenna radiating element has a radiating surface extending in the second plane; a plurality of antenna feeds in a third plane between the first and second planes; and a plurality of slant feed lines, wherein each slant feed line connects one side of an antenna radiating element from the plurality of antenna radiating elements to an antenna feed from the plurality of antenna feeds. Adjacent antenna radiating elements may be separated from each other by less than one-half of a wavelength of radiation of the patch array antenna.

Also described herein are patch array antenna comprising: a ground plate in a first plane; a plurality of radiating surfaces in a second plane above the first plane, wherein the radiating surfaces in the plurality of radiating surfaces have surface areas that vary relative to each other; a plurality of antenna feeds in a third plane between the first and second planes, wherein each antenna feed in the plurality of antenna feeds has a length and a width extending in the third plane, and wherein for at least half of the antenna feeds in the plurality of antenna feeds, the width varies along the length; and a plurality of slant feed lines, wherein each slant feed line connects one side of a radiating surface of the plurality of radiating surfaces to an antenna feed in the plurality of antenna feeds.

As described above, any of the array antennas described herein may be manufactured by forming a single piece of metal into the antenna feeds and the antenna radiating elements. For example, a method of manufacturing a patch array antenna may include the steps of: forming a plurality of antenna radiating elements, a plurality of antenna feeds, and a plurality of slant feed lines from a single sheet of metal, so that the plurality of patch antenna radiating elements are arranged in a first plane and the plurality of antenna feeds are arranged in a second plane adjacent to the first plane, and each patch antenna radiating element of the plurality of antenna radiating elements is connected one or more of the antenna feeds by one or more of the slant feed lines; and connecting the antenna radiating elements to a ground plate, wherein the ground plate is in a third plane that is adjacent to the second plane. The single sheet of metal may be a single sheet of tin plated steel, brass, or copper.

In general, the sheet of metal may be formed by any appropriate manner. Forming may comprise stamping the plurality of antenna radiating elements, the plurality of antenna feeds, and the plurality of slant feed lines from a single sheet of metal. Forming may comprise bending the single sheet of metal to position the plurality of antenna radiating elements in the first plane and the plurality of antenna feeds in the second plane with the plurality of slant feed lines connecting the plurality of antenna radiating elements and the plurality of antenna feeds. In some variations, Forming comprises forming a plurality of antenna radiating elements having different surface areas in the first plane. Forming may comprise forming a plurality of antenna radiating elements wherein a surface area of the antenna radiating elements in the plurality of antenna radiating elements vary relative to each other by between about 0.1% and 20.0% of an average surface area of the antenna radiating elements in the plurality of antenna radiating elements.

Also described herein are apparatuses, including wireless broadband access devices, that include both an antenna, such as those described above, and control circuitry, typically formed in a layered PCB having multiple layers, wherein the impedance mismatch between the antenna and the circuitry is minimized. Although the devices, techniques and configurations, including the apparatuses, described herein may be used with the antenna arrays described, they may also be used with any other antenna, including other (e.g., traditional) array antennas, and non-array antennas.

For example, described herein are wireless broadband access devices that minimize impedance mismatch between the antenna input/output and a layered PCB, in which the device includes: an antenna having an antenna port radio frequency (RF) pin extending therefrom; a printed circuit board (PCB) comprising a first layer and a plurality of additional layers; an antenna contact electrically coupling the antenna port RF pin to the first layer of the PCB, wherein the antenna port RF pin passes through the additional layers of the PCB without making electrical contact therewith; and a clearing region on each layer of the additional layers of the PCB, wherein each clearing region surrounds the antenna port RF pin on all sides in each layer of the additional layers of the PCB by more than about 0.5 mm, wherein the clearing region is substantially free of conductive materials.

The clearing region is generally formed in each layer of the PCB to which the antenna port RF pin (the input/output for the RF energy detected and/or transmitted by the antenna) should not make an electrical connection. The clearing region is typically free of conductive (electrically and/or magnetically conductive) material, such as conductive metals, or the like. The clearing may include non-conductive (e.g., insulative) material. In some variations the conductive clearing forms an air gap between adjacent layers, and includes only the substrate material for that layer.

A multi-layer PCB may be used increase the area available for connections and may include multiple conductor patterns inside the board. Multi-layer PCBs may be formed by gluing (laminating) several double-sided boards together with insulating layers in between. The number of layers may be referred to as the number of separate conductor patterns. It is usually even and includes the two outer layers. It is common for layered PCBs to have between 4 and 8 layers, but PCBs with almost 100 layers (or more) can also be made. Layers in a PCB may be laminated together. Vias through the layered PCB may penetrate the whole board, or they may be blind or buried vias, which span only a few layers. Blind vias connect one or more of the inner layers with one of the surface layers without penetrating the whole board. Buried vias only connect inner layers.

In multi-layer PCBs the PCB may include an entire layers dedicated to Ground and Power. Layers may therefore be classified as Signal, Power or Ground planes. Sometimes there is more than one of both Power and Ground planes, especially if the different components on the PCB require different supply voltages. A layered PCB may also include surface mounted components that could be mounted on either or both sides of the PCB, including directly underneath each other.

In general, to minimize impedance mismatch by an antenna port RF pin passing though the layered PCB, the region of the PCB adjacent to the antenna port RF pin may be cleared or kept clear of a conductive material, such as copper, etc. The shape and size of the clearing may be determined to be above a minimum clearing distance (e.g., greater than 0.5, greater than 1.0, greater than 1.4, greater than 1.9, etc.) from the edge of the pin. In some variations, each clearing region forms a square or rectangular region that is substantially free of conductive materials. For example, each clearing region may surround the antenna port RF pin by more than about 0.5 mm, more than about 1 mm, more than about 1.5 mm, or more than about 1.9 mm.

Any of the variations described herein may also include one or more ground pin extending from a ground plate (e.g., between the antenna emitter(s) and the layered PCB). The ground pin may extend adjacent to the antenna port RF pin. In some variations pair of ground pins extends from the antenna (the ground plate of the antenna) and through the additional layers of the PCB. The ground pins may also each make an electrical contact with the first layer, or with one or more additional layers of the PCB, including a ground layer. The antenna contact (which may extend from the antenna port RF pin in the first layer) may be configured so that it does not pass between the electrical contacts of the pair of ground pins on the first layer. This may further minimize impedance mismatch.

As mentioned, the antenna may be any appropriate array antenna, including a patch array antenna comprising a plurality of radiating elements.

In some variations of a wireless broadband access device, the device includes a second antenna port RF pin that extends from the antenna that passes through the additional layers and makes electrical contact with the first layer. Each of the additional layers may include a second clearing region around the second antenna port RF pin. For example, a device may be configured so that the antenna includes both horizontal polarization (fed by one antenna port RF pin) and vertical polarization (fed by a second antenna port RF pin).

In general, the layered PCB may include circuitry configured to control transmission and receipt of broadband information from the antenna. In some variations, only the first layer of the PCB makes electrical contact with the antenna port RF pin (or any antenna port RF pins).

The layered PCB may include any number of layers; for example the additional layers (each having a clearing region or regions around the one or more antenna port RF pins) may include more than four layers.

Also described herein are wireless broadband access devices, the device comprising: an antenna having an antenna port radio frequency (RF) pin extending therefrom; a printed circuit board (PCB) comprising a first layer and a plurality of additional layers; an antenna contact electrically coupling the antenna port RF pin to the first layer of the PCB, wherein the antenna port RF pin passes through the additional layers of the PCB without making electrical contact therewith; a pair of ground pins extending from the antenna, the pair of ground pins in electrical contact with the first layer of the PCB; and a clearing region on each layer of the additional layers of the PCB, wherein each clearing region surrounds the antenna port RF pin on all sides in each layer of the additional layers of the PCB by more than about 0.5 mm, wherein the clearing region is substantially free of conductive materials, wherein the antenna contact does not pass between the pair of ground pins.

Any of the clearing regions descried herein may be rectangular (including square), round, oval, polygonal, etc., that is substantially free of conductive materials. The clearing region may surrounds the antenna port RF pin by more than about 0.5 mm, more than about 1 mm, more than about 1.5 mm, more than about 1.9 mm, etc. Optimally, the clearing region may be more than about 1.0 mm around the antenna port RF pin on all sides of each layer. For example, the clearing size may be a rectangle of approximately 3.8 mm by about 4.2 mm.

As mentioned, any of these devices may include more than one antenna port RF pin, which may also pass through the layers of the PCB until making electrical contact, and may pass through the middle of the clearing region (lacking any conductive material) in each non-contacting layers of the PCB. For example, the device may also include a second antenna port RF pin extending from the antenna that passes through the additional layers and makes electrical contact with the first layer, wherein each of the additional layers comprises a second clearing region extending at least 0.5 mm all around the second antenna port RF pin.

Any of the wireless broadband access devices described herein may include: an antenna comprising multiple radiating elements; a first antenna port radio frequency (RF) pin extending from the antenna; a second antenna port RF pin extending from the antenna; a printed circuit board (PCB) comprising a first layer and a plurality of additional layers, wherein the first antenna port RF pin is in electrical contact with a first antenna contact on the first layer and wherein the second antenna port RF pin is in electrical contact with a second antenna contact on the first layer, and wherein the first and second antenna port RF pins pass through, but do not make electrical contact with, the additional layers; wherein each of the additional layers comprises a first clearing region that is substantially free of conductive materials and surrounds the first antenna port RF pin and a second clearing region that is substantially free of conductive material and surrounds the second antenna port RF pin, wherein each of the first and second clearing regions extend from the antenna port RF pin on all sides by at least 0.5 mm. In some variations, each of the first and second clearing regions may form a square or rectangular region, e.g., wherein each of the first and second clearing regions surround the first or second antenna port RF pins by more than about 1 mm, more than 1.5 mm, or more than 1.9 mm.

In some variations, the device also includes a first pair of ground pins extending from the antenna adjacent to the first antenna port RF pin and through the additional layers of the PCB, wherein the first pair of ground pins each make an electrical contact with the first layer. As mentioned above, the antenna contact may be configured so that it does not pass between the electrical contacts of the first pair of ground pins on the first layer as it extends in the first layer.

In general, the apparatuses described herein may include a housing that is configured to aid in the alignment of the apparatus, particularly when the apparatus is configured for use as a radio and antenna device for providing wireless broadband access as a point-to-point or point-to-multipoint station The devices may be configured so that they can be mounted or coupled to a structure and/or surface (e.g. wall, stand, pole, table, etc.) using an integrated bracket mount that forms part of the housing and connects with a bracket for holding the radio/antenna device in place. The apparatus may also be configured so that it can be roughly adjusted/aligned, and once properly aligned, locked down into position. The locking into position may include permanently deforming a region of the device (e.g., of the clamp mount), such as crush ribs, in a manner that helps retain the device in alignment. In general, the device may also be adapted so that the rough adjustment can be made with sufficient friction between the bracket mount and bracket that it is held in place when released, but still easily adjustable. In some variations, the bracket mound and bracket are configured as a ball and socket bracket mount/bracket.

For example, described herein are radio and antenna devices (combined radio and antenna devices) for providing wireless broadband access configured for use as a point-to-point or point-to-multipoint station, in which the device comprise: a disc-shaped housing having a flattened, dome-shaped front region and a back region having an integrated bracket mount; a plurality of antenna emitters held within the housing and arranged as an array antenna; and a bracket configured to support the device, the bracket further configured to engage with the bracket mount, wherein the bracket and bracket mount cooperate to form a plurality of selectable positions securing the housing at different tilt angles relative to the bracket.

As mentioned, these device may include a spirit level (e.g., bubble level) that is integrated onto the housing, and can be viewed by a person when mounting and/or adjusting the device. The bracket mount may include a ball socket and/or a threaded clamp.

The device may also include a lock configured to secure the bracket to the housing. As mentioned, the bracket may comprise an arm and a ball joint at an end of the arm; a locking ring may also be used to tighten the ball joint in the ball socket of the bracket mount.

Any of the apparatuses described herein may also include one or more indicators, including optical indicators such as lights (LEDs) that are located within the housing but visible through the housing wall. For example, the apparatus (device or system) may include optical indicators within the housing that are visible through a wall of the housing. The wall of the housing may be adapted for viewing the optical indicators. In some variations the wall of the housing, or a region of the wall, is transparent. In other variations the wall is translucent or partially translucent; the region over the optical indicator may be thinner than other regions of the housing to permit light to be transmitted through the housing in these regions. For example, a region of a wall of the housing may be thinner than other regions of the wall, through which a plurality of lights within the housing may be visible. Having the indicator within the housing but visible through the housing may permit it to be viewed while maintaining the seal of the housing (e.g., around the circuitry and antenna). In general, the disc-shaped housing may form a waterproof enclosure around the plurality of antenna emitters.

Any of the antenna described herein may be used as part of the radio and antenna devices for providing wireless broadband access configured for use as a point-to-point or point-to-multipoint station. For example, the plurality of antenna emitters may include at least four patch antennas, arranged across a surface within the housing as an array antenna, or at least nine patch antennas arranged across a surface within the housing as an array antenna.

Any of the apparatuses or devices described herein may be configured to use power over Ethernet (PoE), and may therefore include a PoE port through the housing to receive a PoE cable/connector. For example, the device may include a cover, hatch, opening, door, (e.g., sliding door) for accessing an inside of the disc-shaped housing, or an atrial chamber of the housing that allows access to a port such as a PoE port. This cover may be removed and replaced and either or both the cover and housing may include an opening for the exit of a cable (e.g., a PoE cable).

As mentioned, s bracket may be configured to mount the devices to any appropriate surface, including a pole or wall. For example, the bracket may include a concave pole mount region configured to be connected at least partially around a pole.

In general the housing may also house a controller connected to the antenna emitters and configured to send and receive wireless broadband signals from the antenna. The controller may be a circuit or circuits (including part of a PCB) and/or firmware or software. The controller may be connected to the antenna emitters and configured to send and receive wireless broadband signals using a time division multiple access (TDMA) protocol.

The radio and antenna devices for providing wireless broadband access described above may also include: a disc-shaped housing comprising a rear region having an integrated bracket mount and a front region configured as a flattened dome, wherein the bracket mount comprises a ball socket; a bubble level integrated onto the housing; a plurality of antennas emitters held within the housing arranged as an array antenna; control circuitry connected to the array antenna and configured to send and receive wireless broadband signals using the array antenna; and a bracket comprising an arm having a ball joint at an end of the arm, the bracket configured support the device, wherein the bracket and bracket mount cooperate to provide a plurality of selectable tilt positions of the housing relative to the bracket.

Also described herein are radio and antenna devices for providing wireless broadband access configured for use as a point-to-point or point-to-multipoint station, the device comprising: a disc-shaped housing having a flattened dome shaped front region and a back region having an integrated bracket mount; a bubble level integrated onto the housing; a plurality of antenna emitters held within the housing and arranged across a surface within the housing as an array antenna; and a bracket for mounting the device, the bracket configured to engage with the bracket mount, wherein the bracket and bracket mount cooperate to provide a plurality of selectable positions securing the housing at different tilt angles relative to the bracket.

In general a bracket is a support that may be configured to be attached to a wall, pole, stand, etc., to hold the antenna. A mount or bracket mount on an antenna housing, or formed as an integral part of the housing, may connect the antenna to a bracket. The connection between the bracket and mount may be adjusted to adjust the position (angle, direction, altitude, azimuthal angle, zenith angle and/or elevation angle, etc.) of the antenna relative to another antenna. In some variations, and particularly ball joint configurations, a clamp (e.g., ring clamp) may be used to adjust the holding force between the bracket and the mount, and therefore the force locking the position of the antenna relative to the bracket. The clamp may be specifically designed to allow hand tightening. For example, the connection between the bracket and mount may be tightened within a first range of holding force between 0.5 and 8 kg force applied.

For example, a wireless broadband access device, configurable as a point-to-point or point-to-multipoint station, may include: an antenna; a housing coupled to the antenna, the housing comprising a bracket mount, wherein the bracket mount comprises a ball socket; a deformable locking projection (e.g., crush ridge, crush button, etc.) within the ball socket; circuitry within the housing and connected to the antenna and configured to send and receive wireless broadband signals using the antenna; a bracket comprising a ball joint, wherein the ball joint is configured to be held within the ball socket of the bracket mount, further wherein the ball joint has a textured surface; and a clamp configured to be secured to the bracket mount and to hold the ball joint within the ball socket with a retaining force, wherein the ring claim may be hand tightened to the bracket mount to provide sufficient retaining force to irreversibly deform the crush ridge against the textured surface of the ball joint so that the deformed crush ridge interlocks with the textured surface.

Any of the devices described herein may include a deformable locking projection that may be used to lock an adjustable mount in position by deforming, e.g., crushing, the projection so that the deformed structure engages another surface to lock to aid in holding the position of the mount. This deformable structure may be, in some variations, a crush ridge, a crush projection, a crush button, etc.

In some variations the clamp and the bracket mount engage to form a ratchet lock that allows the clamp to be tightened to the bracket mount but prevents the clamp from loosening off of the bracket mount unless a release catch is engaged. For example, the wireless broadband access device may also include gear teeth on the bracket mount that engage a releasable pawl on the clamp to prevent loosening of the clamp from the bracket mount.

The bracket may include a support arm configured to be secured to a pole, wall or stand.

As mentioned, any of these variations may include a deformable region, such as a crushable region, that may be deformed to lock the position of the apparatus. For example, the apparatus may include a crush ridge within the bracket mount that forms a ring in the ball socket of the bracket mount. A crush ridge may have a triangular cross-section. As mentioned, the bracket mount may be integrally formed as part of the housing.

Any of the housings described herein may have a flattened disc or flattened sphere (e.g., saucer) shape. This shape may permit the device to be compact, and is particularly well suited for the array antennas described herein, which may fit, along with the control circuitry, within the walls of the flattened disc housing.

As mentioned, in some variations the bracket and/or bracket mount are adapted to have an increased frictional region, even if a clamp (e.g., ring clamp) is not tightened down sufficiently to deform a locking or deformable member such as a crush ridge. For example, in variations including a ball joint as part of the bracket, the inside of the ball joint may be rough or roughened (e.g., having an irregular surface, bumpy, knobby, pitted, not smooth, etc.).

Any of these apparatuses (devices and systems) may have a bubble (spirit) level mounted in or on the housing, such as on the back side of the flattened disc forming the housing. The spirit level may be located at the top of the back side, and may allow a person to adjust the position with reference to the level.

The antenna may comprise an array antenna that has a plurality of patch radiating elements, as discussed and described herein; the housing may enclose the antenna.

Also described herein are wireless broadband access devices that are configurable as a point-to-point or point-to-multipoint station. These devices may include: a housing enclosing an antenna and circuitry configured to send and receive wireless broadband signals using the antenna, the housing comprising a bracket mount, wherein the bracket mount comprises a ball socket; a crush ridge within the ball socket; a bracket configured to be attached to a wall, pole, or stand, the bracket comprising a ball joint that is configured to be held within the ball socket, further wherein the ball joint has a textured surface; a clamp configured to be secured to the bracket mount and to hold the ball joint within the ball socket with a retaining force, wherein the clamp may be hand tightened to the bracket mount to provide a retaining force sufficient to permit adjustment of the housing relative to the bracket and wherein the clamp may be further hand tightened to lock the ball joint in the ball socket and irreversibly deform the crush ridge against the textured surface of the ball joint so that the deformed crush rings interlock with the textured surface.

Any of the features of the wireless broadband access devices described above may be included in this variation. For example, the clamp and the bracket mount may engage to form a ratchet lock that allows the clamp to be tightened to the bracket mount but prevents the clamp from loosening off of the bracket mount unless a release catch is engaged. In some variations, the device includes gear teeth on the bracket mount that engage a releasable pawl on the clamp to prevent loosening of the clamp from the bracket mount.

The crush ridge may form a ring in the ball socket, or radiating pattern in the ball socket, or both. In some variations, the crush ridge has a triangular cross-section. The clamp may be configured as a ring clamp. In some variations, the bracket mount is integrally formed as part of the housing.

Also described herein are methods of using wireless broadband access devices. For example, methods of using such devices may include methods of positioning a wireless broadband access device that is configurable as a point-to-point or point-to-multipoint station wireless broadband access device. The method may include: placing a clamp over a first end of a bracket, the bracket comprising a ball joint at a second end of the bracket, wherein the ball joint has a textured surface; placing the ball joint into a ball socket of a bracket mount that is connected to a housing of the wireless broadband access device; attaching the clamp to the wireless broadband access device to hold the ball joint within the ball socket; adjusting the position the wireless broadband access device by moving the ball socket relative to the ball joint; and locking the position of the wireless broadband access device by tightening the clamp until a crush ridge within the ball socket of the bracket mount is irreversibly deformed against the textured surface of the ball joint so that the deformed crush rings interlock with the textured surface.

A method of positioning a wireless broadband access device may also include securing the bracket to a surface, pole or mount.

Attaching the clamp to the wireless broadband access device to hold the ball joint within the ball socket may include tightening the clamps to engage a ratchet between the clamp and the broadband access device that allows the clamp to be tightened to the bracket mount but prevents the clamp from loosening off of the bracket mount unless a release catch is engaged.

The step of attaching the clamp may comprise partially tightening the clamp so that the position of the wireless broadband access device relative to the bracket is adjustably held by the ball joint and ball socket.

In general, adjusting the position the wireless broadband access device may comprise aiming an antenna within the housing of the wireless broadband access device to another wireless broadband access device.

BRIEF DESCRIPTION OF THE DRAWINGS

FIG. 7A shows a back view of the wireless transmission station of FIG. 6A.

FIG. 7B shows a sectional view through the wireless transmission station of FIG. 6A.

FIG. 10A is a side perspective view of the mount portion (including a ball mount) of FIG. 9A.

FIG. 10B is a perspective view of a locking ring for the ball and socket mount of FIG. 9A.

FIG. 10C shows the ball of the mount within the locking ring.

FIG. 51D illustrates one example of a printed circuit board to which an array antenna has been attached.

in FIG. 52B the antenna within the housing is a small 4×4 array antenna; in FIG. 52C the antenna within the housing is a slightly larger 3×3 array antenna.

FIGS. 63A, 63B and 63C show bottom perspective, top perspective and side views, respectively, of one variation of a wireless transmission station; the outer housing and mount are shown. The housing may be adapted to enclose an patch array antenna, such as a 2×2 patch array antenna as illustrated in FIGS. 64A-66B.

DETAILED DESCRIPTION

In general, described herein are wireless transmission stations including radio and antenna (e.g., combined radio and antenna) devices for providing wireless broadband access configured for outdoor and/or indoor use to provide point-to-point or point-to-multipoint communication. Also described herein are antennas, such as array (patch array) antennas, that may be used as part of a wireless transmission station.

A wireless transmission station apparatuses, including devices and/or apparatuses, may include a closed housing that may be sealed or otherwise made weatherproof/waterproof, an integrated bracket mount forming part of the housing, and an internal space housing one or more antennas, and particularly patch antennas (including a plurality of antenna patches, such as two, three, four, five, six, seven, eight, nine, etc.). In some variations, the device also includes a bracket the engages (and may be locked/secured) to the bracket mount on the rear of the housing to secure the device to pole, stand, or any other mount. In some variations the bracket and bracket mount are ball-and-docket brackets/mounts that permit adjustment of the position of the housing and thereby the antenna. In some variations the bracket (e.g., a socket) is configured as a fixed bracket, i.e., the bracket is in a permanently fixed position (non-moveable) relative to the housing or is formed as part of the housing. The bracket mount and bracket may be configured to cooperate to allow the angle of the device (e.g., the altitudinal angle of the device relative to the pole or mount to which it has been attached) to be selected. Once selected, the angle may be fixed. In some variations, the angle may be permanently fixed, while in other variations the angle may be later adjusted. The bracket may include a lock or locking element that may be fixed and/or released to allow adjustment. Although different examples of apparatuses (including devices and systems) configured as wireless transmission stations and/or antenna are described and illustrated, any of the features of one example may be combined with features of any of the other examples. For example, any of the various housing configurations may be used with any of the mount sub-systems and/or any of the antenna examples described herein.

Figure 1:
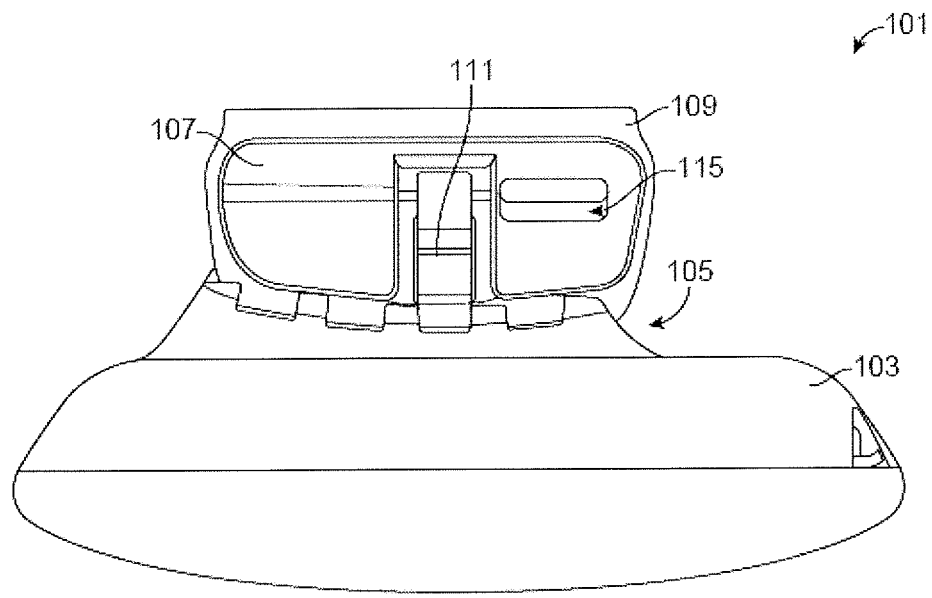
FIG. 1 is a side perspective view of one variation of one variation of an amplifying radio and antenna device for providing wireless broadband access configured for indoor and/or outdoor use as a point-to-point or point-to-multipoint station.

For example, FIG. 1 illustrates one variation of a wireless transmission station that is an amplifying radio and antenna device for providing wireless broadband access configured for outdoor use to provide point-to-point or point-to-multipoint communication. In FIG. 1, the device includes a roughly disc-shaped housing 101 (e.g., having a circular top perspective profile). The front or top of the housing is rounded, and may be dome-shaped, though relatively flat. This flattened dome shape may allow the device to project only slightly but give sufficient internal room (as described below) to house an array of antennas in a particular predetermined arrangement). The back of the housing may be flat or flattened, though it may also or alternatively includes a flattened dome-shape. In general the front and back of the fit together to form an internal cavity into which the electronics and any cord connectors may fit and be protected (e.g., from the elements). The internal structures of the device are described in greater detail below. In some variations the housing includes an access (e.g., opening) for a connection (e.g., a power over Ethernet or PoE connection). Any appropriate power supply may be used with these devices in addition or alternatively to PoE connections. For example, in some variations, the device includes an internal (or external) battery power supply. The devices may include a power wire connected or connectable to a power supply (e.g., wall power). The same (or a separate) access may allow access to internal components or connections, and may be covered by a door or doors. For example, in some variations the top and/or bottom components of the housing include a hinged region that can swing open and shut/snap closed. The entire housing may be sealed or sealable to provide weather and/or water resistance/proofing.

In general, the housing may be formed of any appropriate material, but particularly plastics or other polymeric materials. The housing may be formed of two or more (e.g., three, four, or five) components that are secured together. The housing may be assembled in any appropriate manner, including welding (e.g., plastic welding), by adhesive, or the like. The housing is generally assembled to provide weather/water resistance, as the device may be mounted outdoors, and may therefore have to withstand a variety of temperature, moisture, and UV (weathering) conditions. The outer surface of the housing may be treated. For example the housing may be polished, textured, coated, etc., including combinations thereof. The device may be colored or made optically reflective (e.g., to prevent or reduce damage from sunlight.

The housing typically includes a back region 103 including an integrally-formed bracket mount 105, into which a bracket 107 may be mated. As mentioned, in some variations the bracket mount is formed as part of the back of the housing (e.g., is "integrally formed"). In this example, the bracket mount is a concave surface that includes a track for engaging a bracket 107. Other bracket mounts (described below) may be socket-type bracket mounts. Forming the bracket mount integrally may make the connection stronger, as well as reducing costs. The housing components may be formed in any appropriate manner, including injection molding, extrusion, or the like.

In FIG. 1, a bracket 107 is shown attached to the back of the housing (e.g., in the housing mount), and includes a release control 111 that will allow the relative position of the housing to change with respect to the housing. For example, the bracket may be engaged with the bracket mount and held (locked) in a position relative to the housing; pushing the release control may allow the angle between the housing and the bracket to change. The device in this example includes a plurality (e.g., 2, 3, 4, 5, 6, etc.) different pre-set angles that are selectable, e.g., between 12° and −6°. When the bracket is mounted to a pole, changing the angle between the bracket and the housing changes the angle (e.g., tilt, or altitude) of the device relative to a paired device on another mount some distance away. Since these devices are configured for point-to-point or point-to-multiple-point communication with other devices, changing the angle may dramatically improve performance. FIGS. 6A-6D, described below, illustrate the different angles.

The bracket in FIG. 1 also includes a pass-through (tie pass-through region 115) through which a securing element (e.g., tie, wire, clip, etc.) may be passed to tie the device to a pole or other mount. In some variations the pass-through region in the bracket matches a pass-through region in the housing (e.g., in the bracket mount region of the device). Thus, when the bracket is tied or secure to the post, the housing may also be secured to the post. Other locking or securing means may also or alternatively be included to secure the bracket to the housing.

Figure 2:
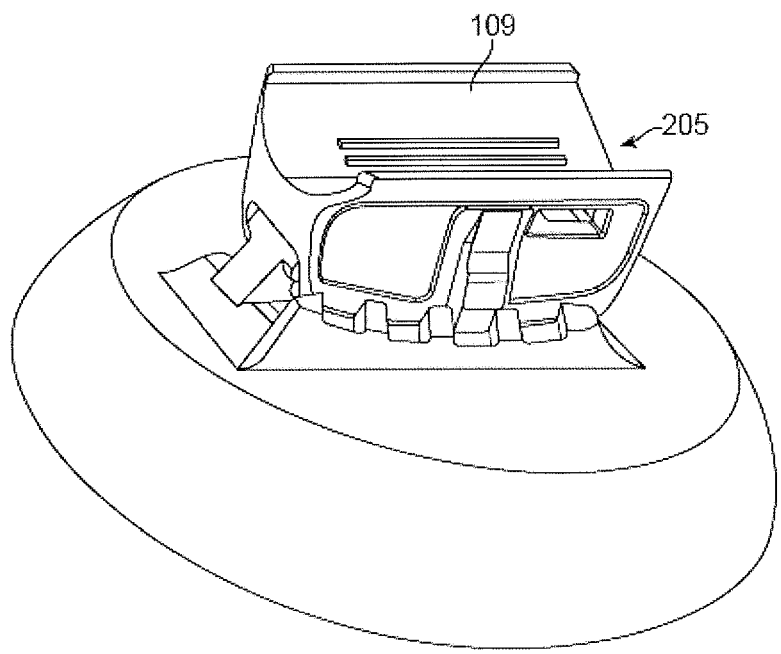
FIG. 2 is a back perspective view of the device shown in FIG. 1.

FIG. 2 shows a back perspective view of the variation shown in FIG. 1. In this view, the back of the bracket is shown. In this example, the back of the bracket includes a concave region 205 configured to mount against a pole. This region may be any appropriate size, and/or may be adjustable (e.g., with hinged regions on the mount, etc.).

Figure 3:
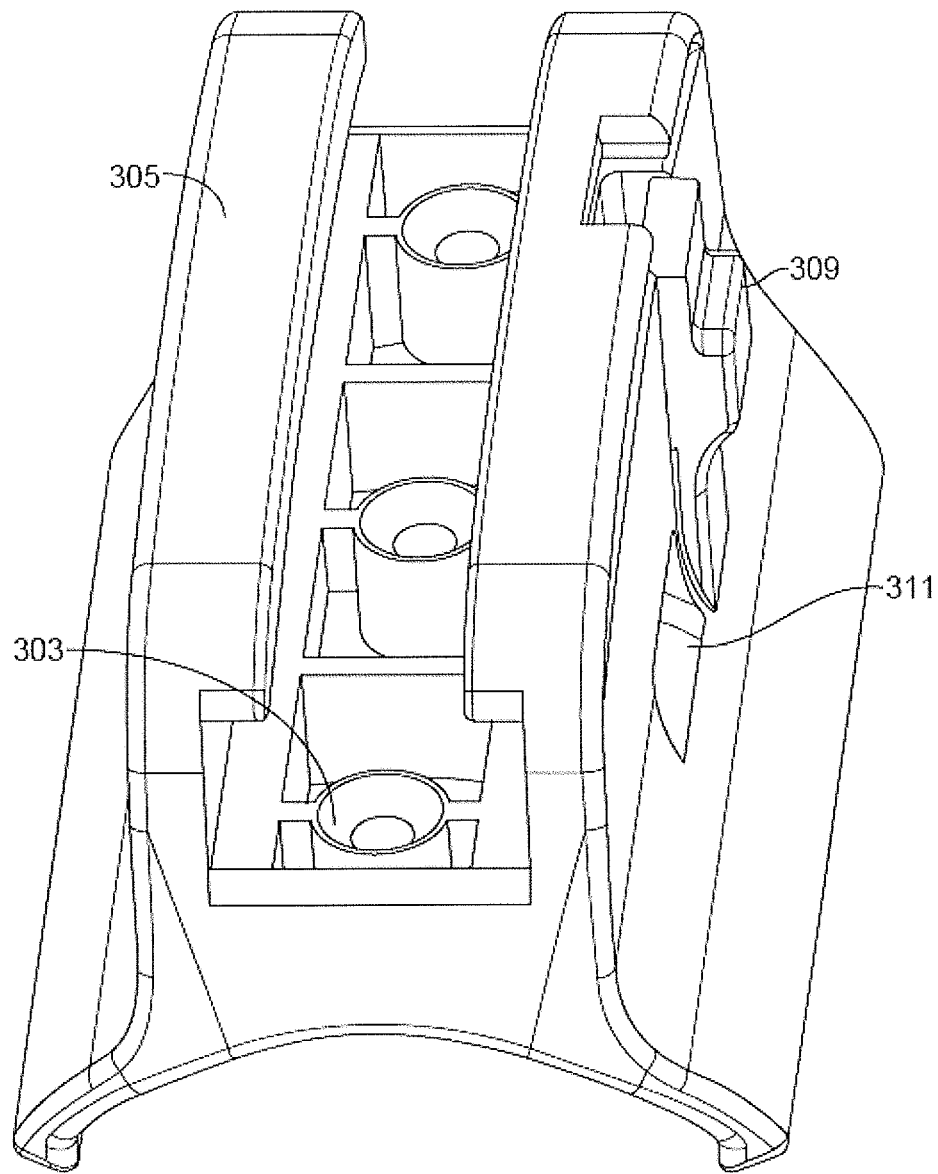
FIG. 3 is a top perspective view of the mount portion of the device shown in FIG. 1.

FIG. 3 shows an enlarged view of the bracket of FIGS. 1 and 2 from a bottom perspective view. The bracket includes a slotted channel configured to mate with a portion of the back of the housing. One side of the bracket (the "top", not visible in FIG. 3) is concave and configured to mount to a pole. The opposite side (the "bottom") is rounded or curved (e.g., a convex curve); this curved surface 305 may engage (along with the inner, also curved, surface(s) of the slotted channel 303) with a bracket mount; the curve may allow the angle between the bracket and the bracket mount.

The bracket may snap-fit or lock into the bracket mount. In some variations the bracket and/or the bracket mount includes set positions in which the bracket may securely hold the bracket mount. The set positions may be formed by interference regions between the bracket and the bracket mount; for example recessed regions on the bracket mount may engage with one or more projections on the bracket to hold the bracket (or vice versa) and housing in a particular relative position. In FIG. 3, the bracket includes a region 309 including a rocker button that can be depressed to move a projection out of a recess in the bracket mount of the housing; the projection is normally biased inwardly to click or lock into a recessed region in the bracket mount of the housing. The recessed regions may be separated by a predetermined distance, so that the angle of the housing relative to the bracket may be adjusted by a known amount (e.g., 4° tilt, 5° tilt, 6° tilt, 7° tilt, 8° tilt, 9° tilt, 10° tilt, etc.). In operation, pressing the button 309 allows the bracket to slide in the bracket mount, which may engage in the slotted channel 303; sliding changes the relative angle (tilt) between the housing and the bracket. When the bracket is fixed to a pole, post, or any other appropriate mount, sliding the bracket in the bracket mount of the housing allows the angle of the device to be adjusted and/or set, so that it can be "aimed" or otherwise directed, e.g., at a second wireless transmission station. In FIGS. 1-3, the angle/tilt of between the bracket and housing may be adjusted by pushing the button (rocker button 309) to click into one of a variety of preset positions. In some variations the bracket and the bracket mount may be configured to allow continuous adjustment of the angle. For example, in some variations the bracket may include one or more pins or clamps that engage with the bracket mount (or vice versa) that can be released or locked down at any position. Alternatively other configurations may include preset/predetermined positions.

In some variations the bracket may be configured to lock onto the housing to prevent the housing from being removed (e.g., as an anti-theft deterrent) once it has been mounted to a pole, post or the like. In some variations the lock is a snap-fit or clamping region within the housing mount and/or bracket; once the bracket is engaged with the housing (e.g., by sliding the housing mount into the slot of the bracket), a portion of the bracket may be snapped into position to hold the two pieces together, while still allowing the bracket to slide relative to the housing. For example, the bracket may include one or more (e.g., two) projecting pieces (e.g., wedges) that can be deflected slightly as the bracket is engaged with the bracket mount; once the bracket is fully engaged, the projecting pieces return to their non-deflected position, preventing the bracket from being removed from the housing.

In some variations the bracket includes a passage or window 311 that is transverse to the concave region (and/or the front curved surface) through which a tie, belt, strap, or other securement can be passed to secure the bracket (and housing) to a pole, post, or the like. In some variations the securement may be integral to the bracket and/or housing; for example, a belt or strap may extend from the bracket and/or housing and be configured to wrap around a pole, post, or the like, and secure to the opposite side of the bracket and/or housing (not shown). In some variations the securement is a zip-tie structure that can be used to constrict the bracket to a pole, post of the like.

In FIGS. 1-3, the bracket includes a passage that is transverse to the long axis (and the slotted channel 303), and configured so that a zip tie may be passed through the passage to secure the bracket and the housing of the device to a pole. In some variations the housing also includes a complimentary opening or set of opening (e.g., at different predetermined positions) that may align with the opening/passage on the bracket. Thus, the passage may allow the coupled bracket and housing to be secured to a pole or post by passing through both the passage/opening on the bracket and the complimentary opening(s) on the housing. The aligned openings may operate as both the lock (securing the bracket and housing to a pole, post, etc.) and a predetermined position/angle selection. For example, the opening through the housing and/or bracket may allow the angle of the device to be selected based on which holes between the two are aligned and used to tie the device to the post.

In general, the devices described herein are configured as wireless transmission stations. Thus, they typically include internal (within the housing) components that are configured to allow the device to operate to send and transmit broadband. For example, these devices may be configured to allow them to provide time-division multiple access (TDMA) wireless access. These wireless transmission stations may be specifically configured for operation outside, where they can communicate with other wireless transmission stations and/or antenna for broadband communication over intermediate (e.g., less than one to one or more kilometers) to long (tens to hundreds of kilometers) distances. Thus, in general, these devices include one or more processors configured to process digital data for receipt and transmission by a plurality of individual antennas arranged within the housing.

Figure 4:
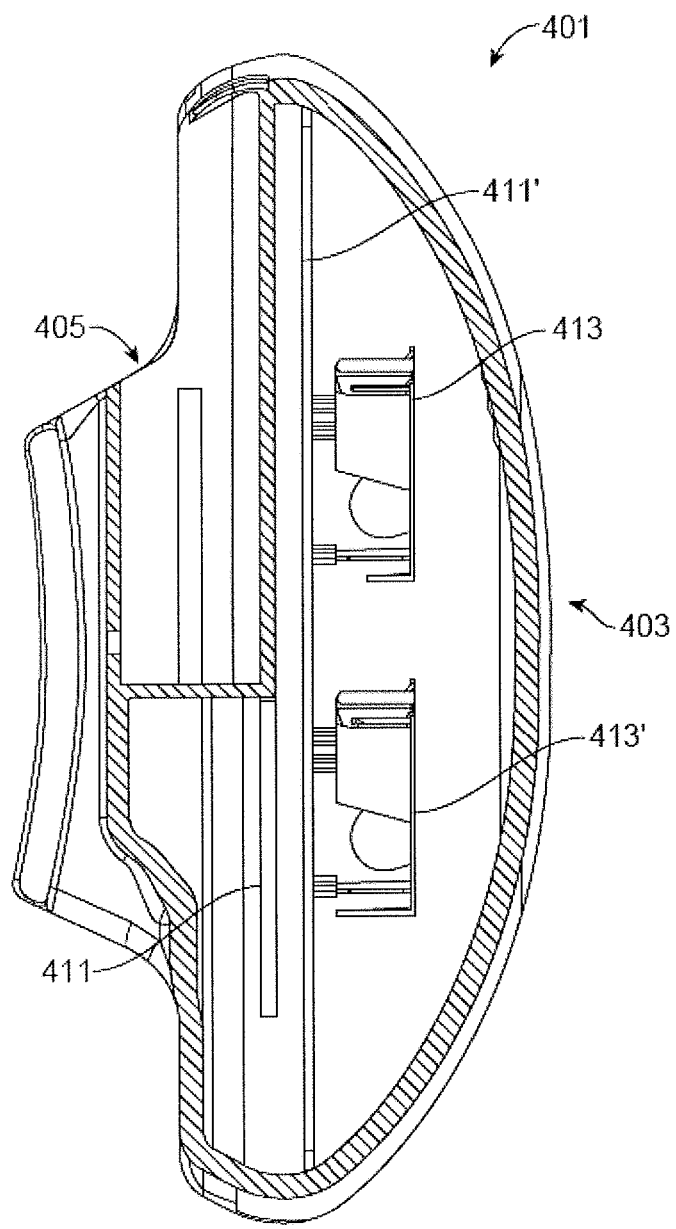
FIG. 4 is a section though the device of FIG. 1, shown from the side.
Figure 5:
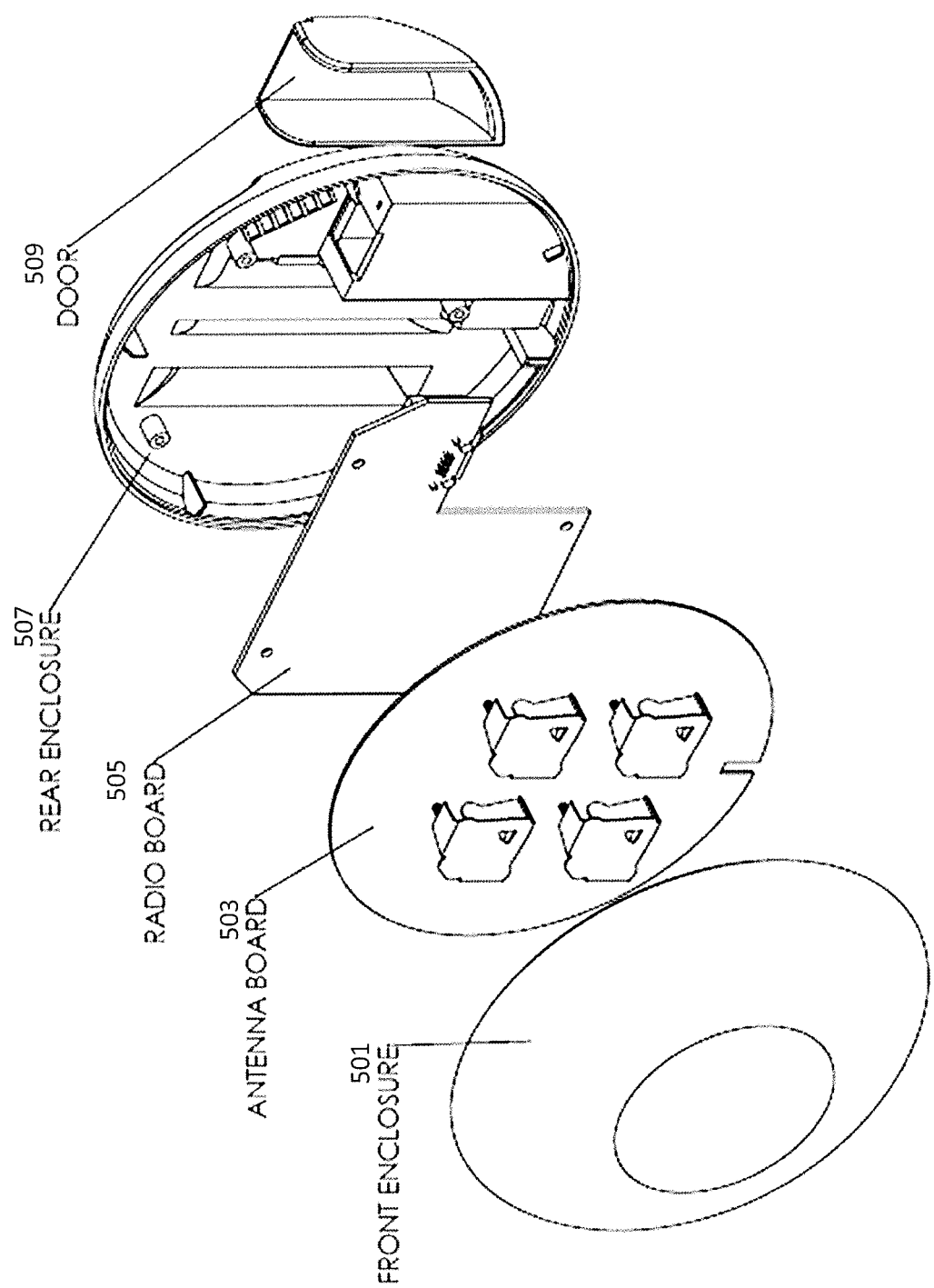
FIG. 5 is an exploded view of one variation of a wireless transmission station similar to the variations shown in FIGS. 1-4.

FIG. 4 illustrates one variation of a wireless transmission station in cross-section, illustrating the internal compartment of the housing. In this example, the housing 401 is assembled (as mentioned above) from a flattened-dome shaped front piece 403, and a back piece including a bracket mount 405. The housing may be attached to a bracket for mounting, as discussed above. The internal portion of the housing may hold the circuitry on one or more printed circuit boards (PCBs) 411, 411'. In this example, two antennas 413, 413' are shown within the housing, mounted on a PCB 411' ("antenna board") that is held within the housing.

Any appropriate type and number of antenna may be used. These antennas may be arranged as a collective antenna system (sub-system). As used herein, these collective antenna systems/sub-systems may be referred to as "microstrip antenna," "patch antenna" or "patch antenna". Prior art patch antenna are typically narrowband, wide-beam antenna that are often fabricated by etching the antenna element pattern in metal trace bonded to an insulating dielectric substrate, such as a printed circuit board, with a continuous metal layer bonded to the opposite side of the substrate which forms a ground plane (or ground plate). Common patch antenna shapes are square, rectangular, circular and elliptical, but any continuous shape is possible. As used herein, a patch antenna does not have to use a dielectric substrate, or dielectric spacers. Further, the patch antenna described herein may be formed of metal that is bent, pressed soldered, or the like. The metal may be, but does not necessarily have to be, etched. For example, the metal may be cut by mechanical means, including the use of a mandrel that both cuts and bends the shape as described herein. Exemplary variations of patch antenna are show in FIGS. 4-5 and 8A-8D. Each individual antenna may be referred to as a patch or patch antenna; the combination may be referred to as a For example, in some variations, four antennas (arranged in a box pattern across the antenna board) are present; in other variations five, six, seven or eight antennas are used. The antennas are typically arranged across the antenna board.

Figure 8A:
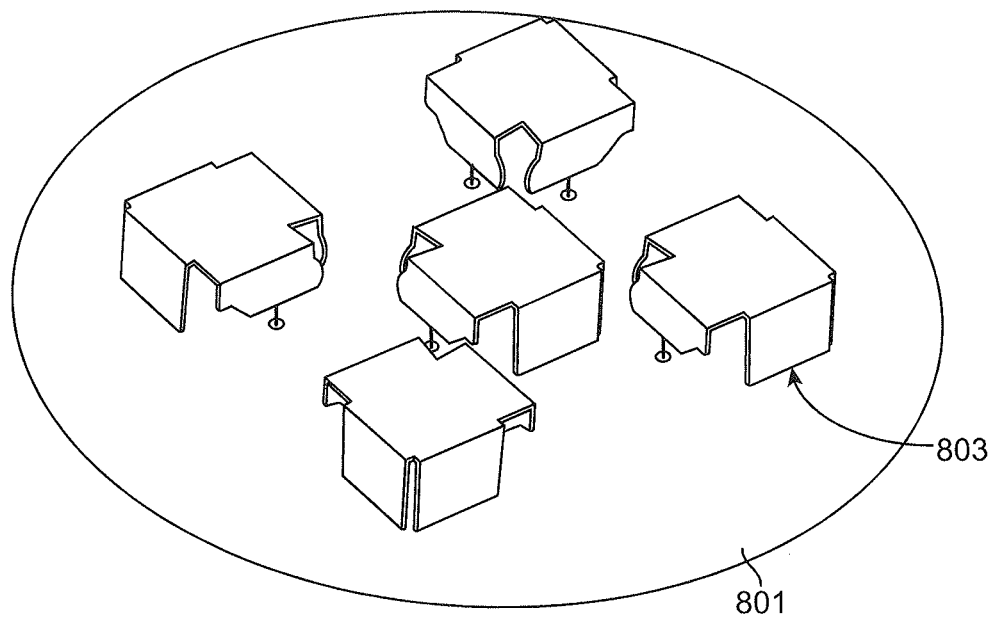
FIGS. 8A-8D illustrate one example of an antenna board (PCB).
Figure 8B:
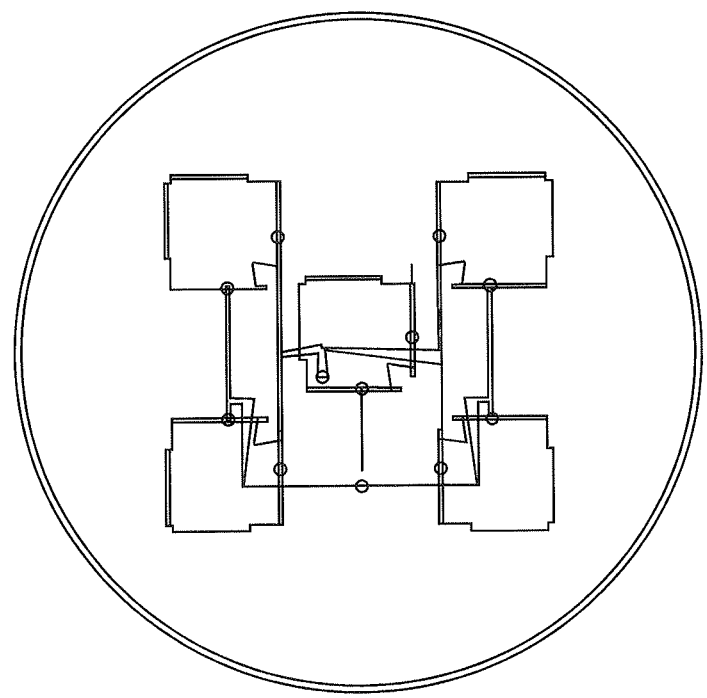
Figure 8C:
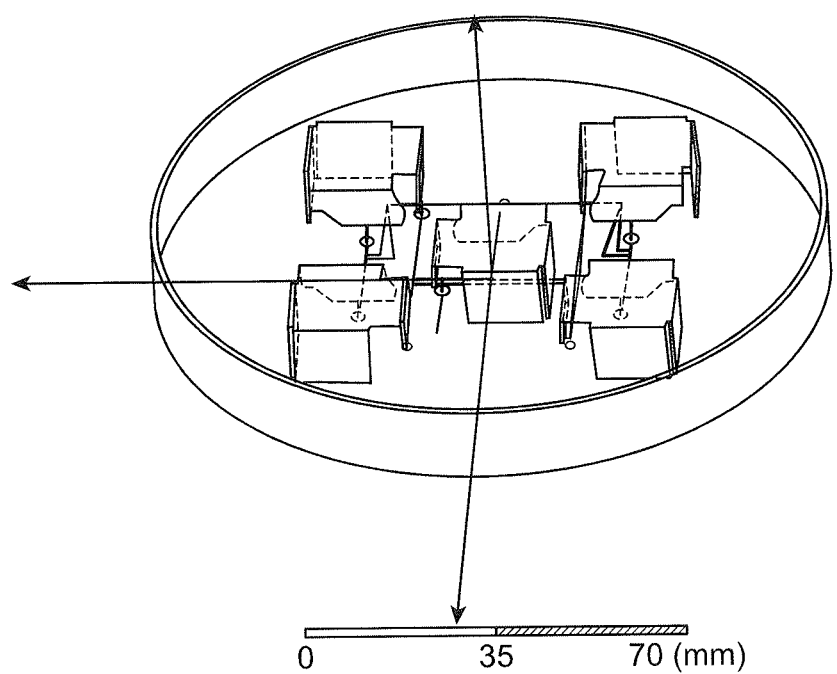
Figure 8D:
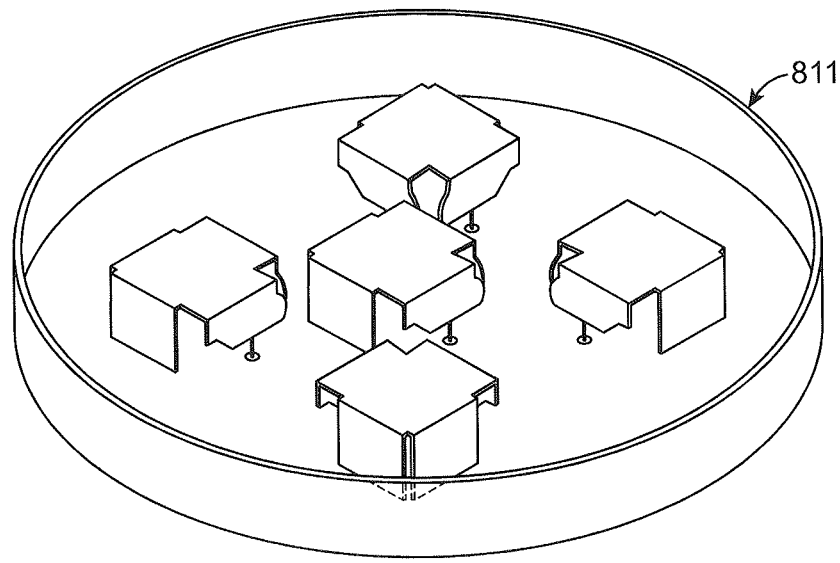

For example, in some variations, the antennas are NBE5-130 antennas that are circular-shape printed circuit board (PCB) antenna made using FR408, 30 mils thick PCB stamped metal structures. Another example is shown in FIGS. 8A-8D. In this example, the antenna design provides about 14.5 dB gain for each polarization (vertical/horizontal). FIG. 8A shows a top perspective view of an exemplary antenna board having five antennas formed as PCB 801 antennas including stamped metal structures 803. FIG. 8B is a schematic of the antenna board of FIG. 8A showing the feeds connecting to each of the antenna on the PCB. FIG. 8C is a three-dimensional schematic of the antenna board (showing dimensions in x, y and z). Finally, FIG. 8D is a three-dimensional rendering of the antenna board. The upper ring 811 is included (as in FIG. 8C) to indicate the height of the antenna board in the z direction.

Returning to FIG. 5, FIG. 5 shows one variation of a wireless transmission station in an exploded view, illustrating the five components that may be assembled to foil the device. In this example, the housing is formed by a front enclosure 501 that is configured to seal to a rear enclosure 507; the rear enclosure also include a door 509 that is secured (e.g., by hinging, snap fitting, etc.) to the rear enclosure. Two printed circuit boards are contained within the assembled housing, an antenna board 509 and a radio board 505. The radio board 505 and antenna boards 503 are configured to connect to each other within the housing to allow a controller to control transmission and receipt of broadband information from the antenna. In this example, the power to power the device may be provided by a power over Ethernet (PoE) cable (not shown) that is connected within the chamber formed by the door 509 though the rear enclosure 507 to plug into a connector on the radio board 505.

As mentioned above, the angle of the devices described herein may be adjusted before, during or after mounting to a stand, pole, wall, etc. For example, FIGS. 6A to 6D illustrate side perspective views of one example of a device mounted to a pole 601 by securing the bracket 605 to pole, then coupling the bracket 605 to the housing 607 as discussed above. Alternatively, the bracket may be first coupled to the housing, and then attached to the pole.

Figure 6C:
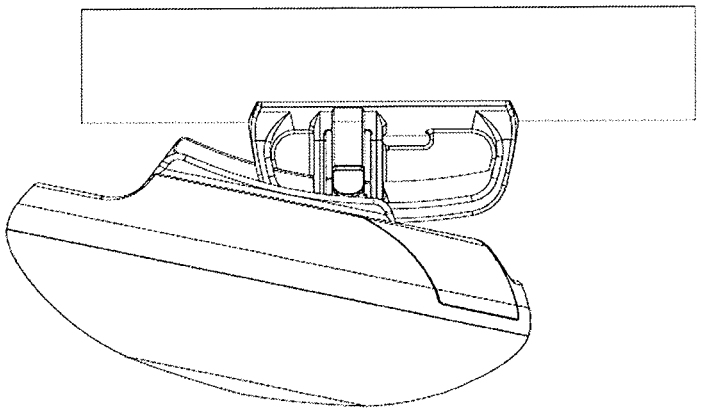
FIGS. 6A-6D illustrate positioning of a wireless transmission station mounted to a pole.
Figure 6B:
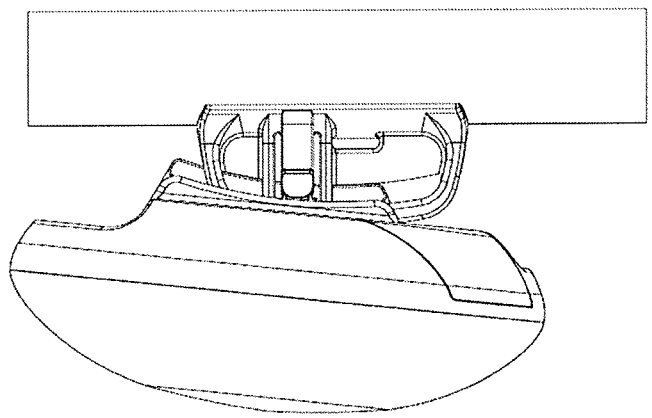
Figure 6A:
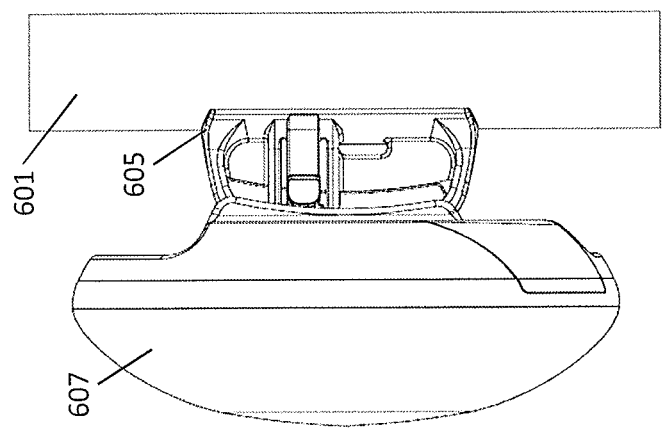
Figure 6D:
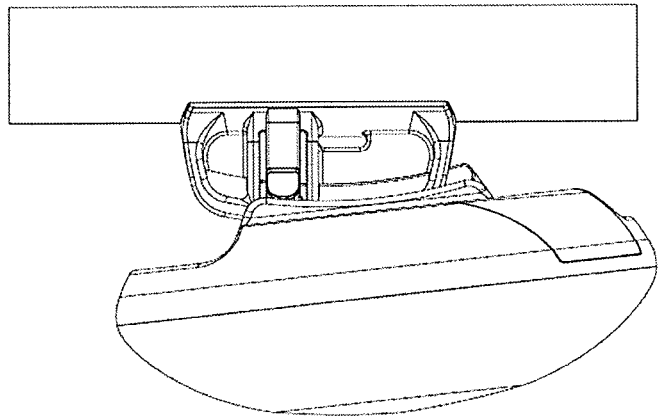

In FIG. 6A, the device is shown in a "neutral position" also referred to as "horizontal"; the hosing 607 is parallel to the bracket 605 and pole 601, so that, if the pole is positioned vertically, the housing (and thus the internal antenna) is facing horizontally. The angel of the housing may then be adjusted as mentioned above, by sliding the housing relative to the bracket; in some variations a release button (not shown), allowing a change of position between the housing and the bracket by sliding the bracket within the bracket mount of the housing. In some variations the bracket mount and bracket include a number of preset positions (tilt positions) that can be selected. For example, in FIGS. 6A-6D there are four pre-set positions (0°, 6°, 12° and −6°, respectively). The angle is achieved by the interaction between the curved surface of the bracket 605 and the receiving region of the housing mount in the housing 607. In FIG. 6B, the housing is positioned at a predetermined angle of 6° "up" (from the horizontal or 0° horizontal position). In FIG. 6C, the bracket and housing (e.g., integrated bracket mount) may be engaged at a third predetermined position, tilting the housing at a 12° "up" position, as illustrated. In FIG. 6D, the bracket and housing are shown engaged at a fourth predetermined position that holds the housing at a 6° "down" position. Once the tilt of the housing is positioned as desired in any of the predetermined positions illustrated, the housing may be locked into position, as mentioned above. In some variations the housing may be permanently locked (e.g., or non-adjustably locked), e.g., by tying, fastening, screwing, or otherwise securing the housing to the mount and/or post when in the predetermined position. For example, the housing or mount may include a screw and/or threading that can be secured.

The bracket and housing maybe adjusted after mounting the bracket (e.g., to a post, holder, wall, etc.); however, in some variations the tilt angle may be adjusted before securing the bracket to the post or other object. In some variations, mounting the bracket to the post or other object may lock the tilt angle relative to the housing.

FIG. 7A illustrates a back view of a device that has been mounted to a post as illustrated in FIG. 6A. In this example, the door 703 is shown on the back of the housing 701 and the housing is connected (via mount, not visible in FIG. 7A) to a post 705. A section though FIG. 7A (along lines B-B') is shown in FIG. 7B. In this example, the housing is shown coupled to the bracket 707. A release control button 711 on the bracket 707 is shown engaged in a preset position (cavity 715) of the bracket mount 713 in the housing 701. In this variation, pushing on the release control button allows the housing to slide relative to the bracket so that the release control button can engage with other slots in the bracket mount 713.

Although various illustrative embodiments are described above, any of a number of changes may be made to various embodiments without departing from the scope of the invention as described by the claims. For example, the order in which various described method steps are performed (or structural elements are connected) may often be changed in alternative embodiments, and in other alternative embodiments one or more elements or method steps may be skipped altogether. Optional features of various device and system embodiments may be included in some embodiments and not in others.

Figure 9A:
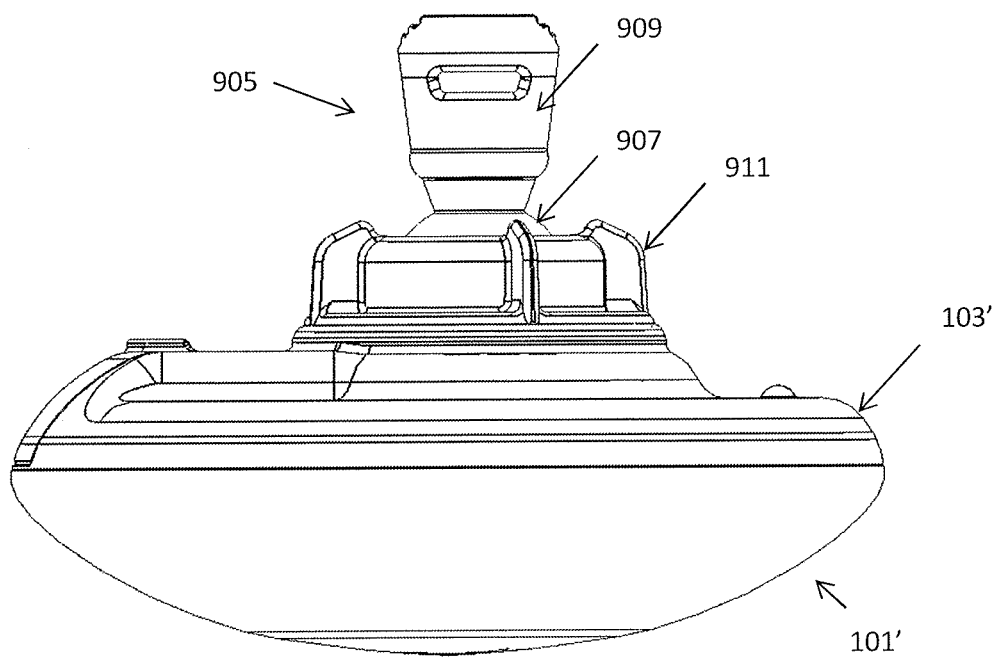
FIG. 9A is a side perspective view of one variation of an amplifying radio and antenna device for providing wireless broadband access configured for indoor and/or outdoor use as a point-to-point or point-to-multipoint station, having a mount configured as a ball and socket mount.
Figure 9B:
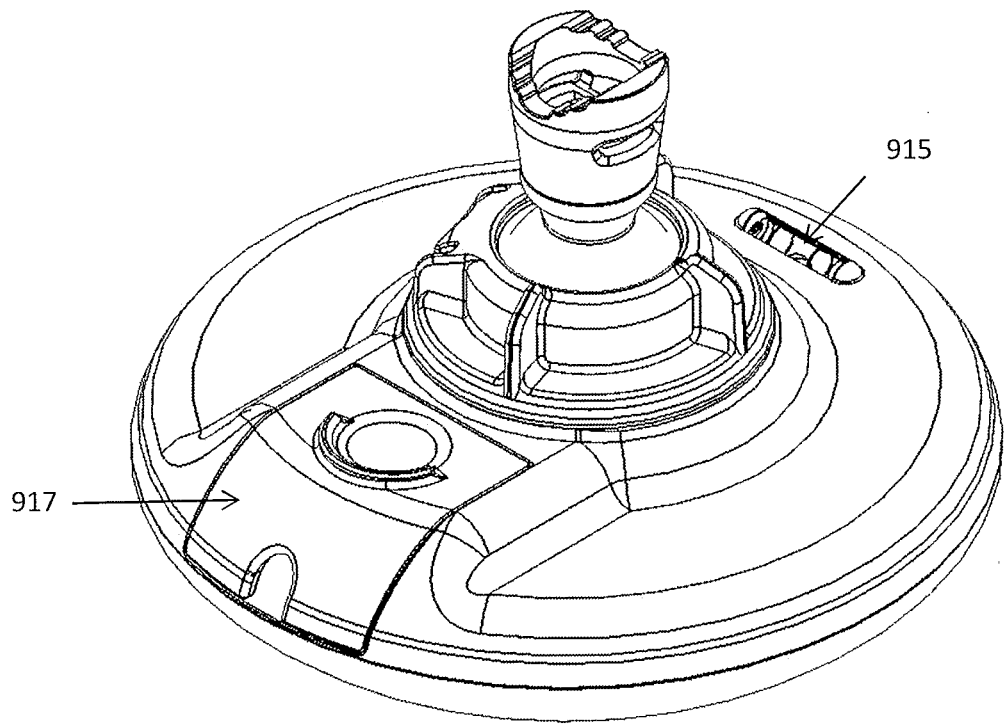
FIG. 9B is a back perspective view of the device shown in FIG. 9A.

FIGS. 9A and 9B illustrate another variation of a housing for a radio and antenna device for providing wireless broadband access. In this example, similar to the variation shown above for FIGS. 1-3, the housing includes a dome-shaped housing body 101' including a front (or upper) region 101' and a back (or lower) region 103'. The housing may be secured together as described above. In this variation, the back region 103' includes a mount region (bracket mount) configured as a socket for a bracket including a ball region, forming part of a ball-and-socket joint allowing articulation of the housing relative to a surface to which the housing has been mounted. The bracket 905 in this example includes a ball 907 and a stem 909 region. The mount assembly including the bracket mount (in the back of the housing) and the bracket 905 may also include a securement 911 that can be secured to the rest of the bracket mount to hold the ball of the bracket in place; further adjusting this securement may lock the ball against the bracket mount, holding it in place. This interaction is described in greater detail below in FIGS. 10A-10D.

In some variations, the housing also includes a level indicator 915. The level indicator may be a mechanical and/or electric level indicator. For example, in FIG. 9B, the level indicator 915 is a bubble-type level ("spirit level") that indicates whether a surface is horizontal (level) or vertical (plumb). Any appropriate type of level may be used, including convex and/or concave, bull's eye, or other shaped/type of levels. Electronic levels may also be used.

The rear enclosure (back region 103') may also include a door or access 917, as mentioned, that may provide access, particularly to connectors/outlets, plugs, cabling, and the like.

Figure 10D:
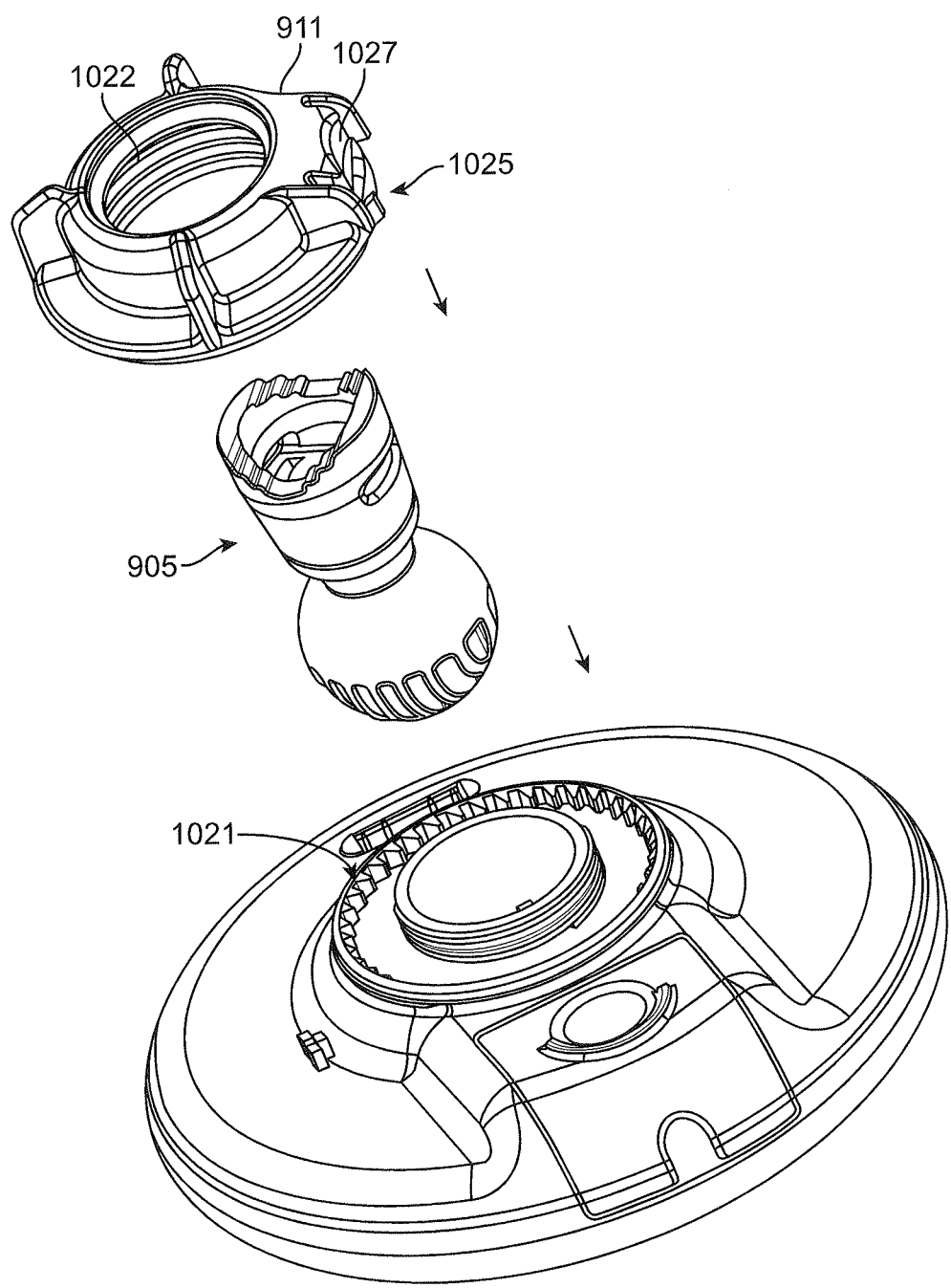
FIG. 10D is an exploded view showing the assembly of the ball mount with the housing (including the socket) of FIGS. 9A-9B.

FIGS. 10A-10D illustrate the operation and interaction of the bracket and mount for the variation shown in FIGS. 9A-9B. An example of a ball-type bracket 1001 is shown in FIG. 10A. In this example the ball region is formed at the distal end and is connected to a stem region that includes a pass-through (tie pass-through region 1015) through which a securing element (e.g., tie, wire, clip, etc.) may be passed to tie the device to a pole or other mount. The bracket may be formed of any appropriate material, including plastics (polymers) and may be formed by any appropriate means. The ball may be solid, or may be formed with cut-out regions (e.g., having "fins" or ribs forming the ball region, as shown in FIGS. 10A-10D); this may make it lighter and may also enhance the strength and lockability.

FIG. 10B shows one variation of a securement 911 that can be used. This securement is locked down by screwing into a threaded region on the back housing (the mount region of the back housing). As shown in FIG. 10C, the mount may be passed through the securement before attaching to the housing, as further illustrated in FIG. 10D. As shown in FIG. 10D, the securement (which may also be referred to as a hold-down, keeper, lock or the like) holds the ball within the socket in the back housing. The securement 911 includes internal threads 1022 that may mate with threads 1021 on the back housing. The back housing and securement may also engage a pawl element 1025 on the securement (as shown in FIG. 10D) or on the housing (not shown). The pawl may engage teeth in the housing to allow discrete adjustment of the securement, while limiting motion (e.g., permitting motion only clockwise or counterclockwise). In some variations this interaction may form a lock allowing tightening of the ball joint, but preventing it from loosening or unlocking unless a release (e.g., release element 1027) is engaged, e.g., by pushing. The exploded view of the bracket and mount (mounting subsystem) in FIG. 10D includes directional arrows showing how the bracket, bracket mount and securement may be assembled.

Figure 11A:
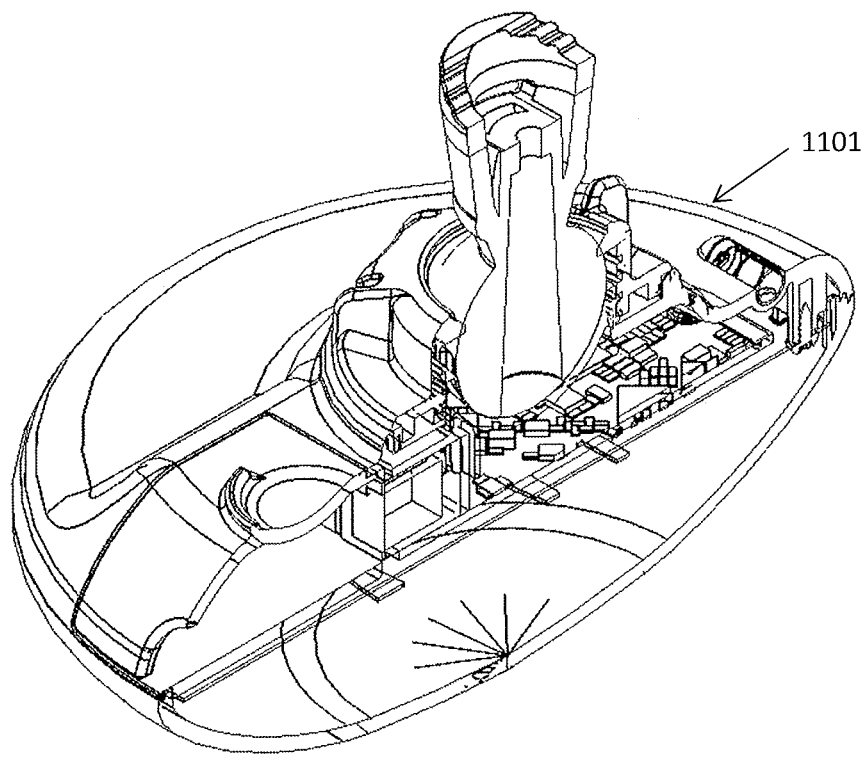
FIGS. 11A and 11B shows side perspective and side views, respectively, of an antenna device similar to the device of FIG. 9A, showing interior detail of the housing, including an array antenna housed within the housing.
Figure 11B:
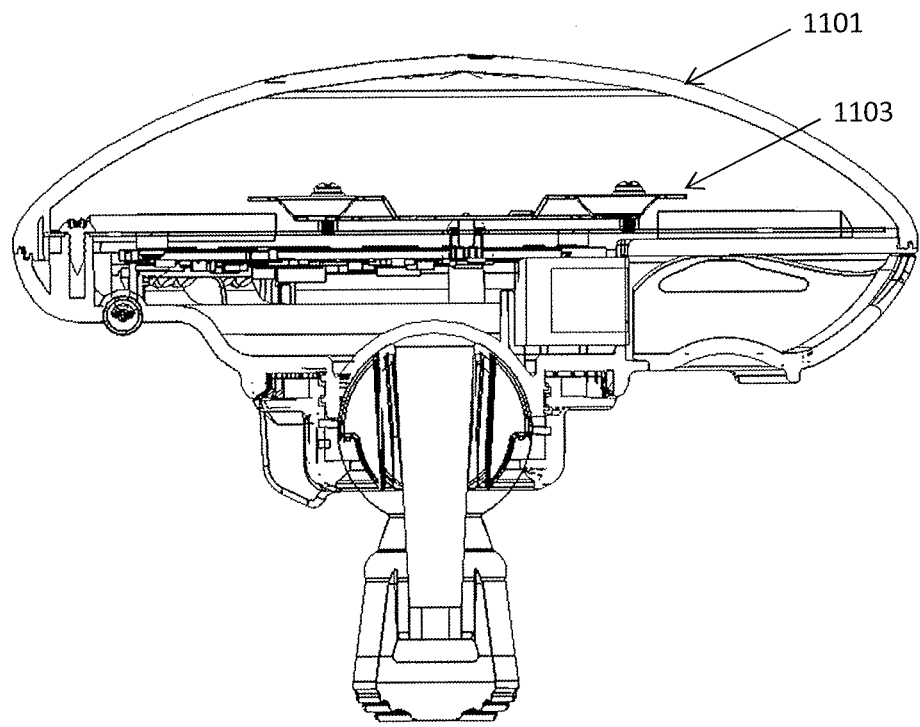

FIGS. 11A-11B illustrate a section view of one variation of a radio and antenna device for providing wireless broadband access (apparatus) having the housing described above in FIGS. 9A-10D. Similar to FIG. 5, described above, the apparatus includes a housing 1101, and the antenna assembly 1103 is housed within the housing. The antenna assembly 1103 is shown in the exploded view of FIG. 12, and may include a patch antenna formed of a multiple patch antenna mounted to a ground plate and a circuit board providing the feed to the antenna. Additional detail on the antenna is provided below with reference to FIGS. 13A-14D.

Figure 12:
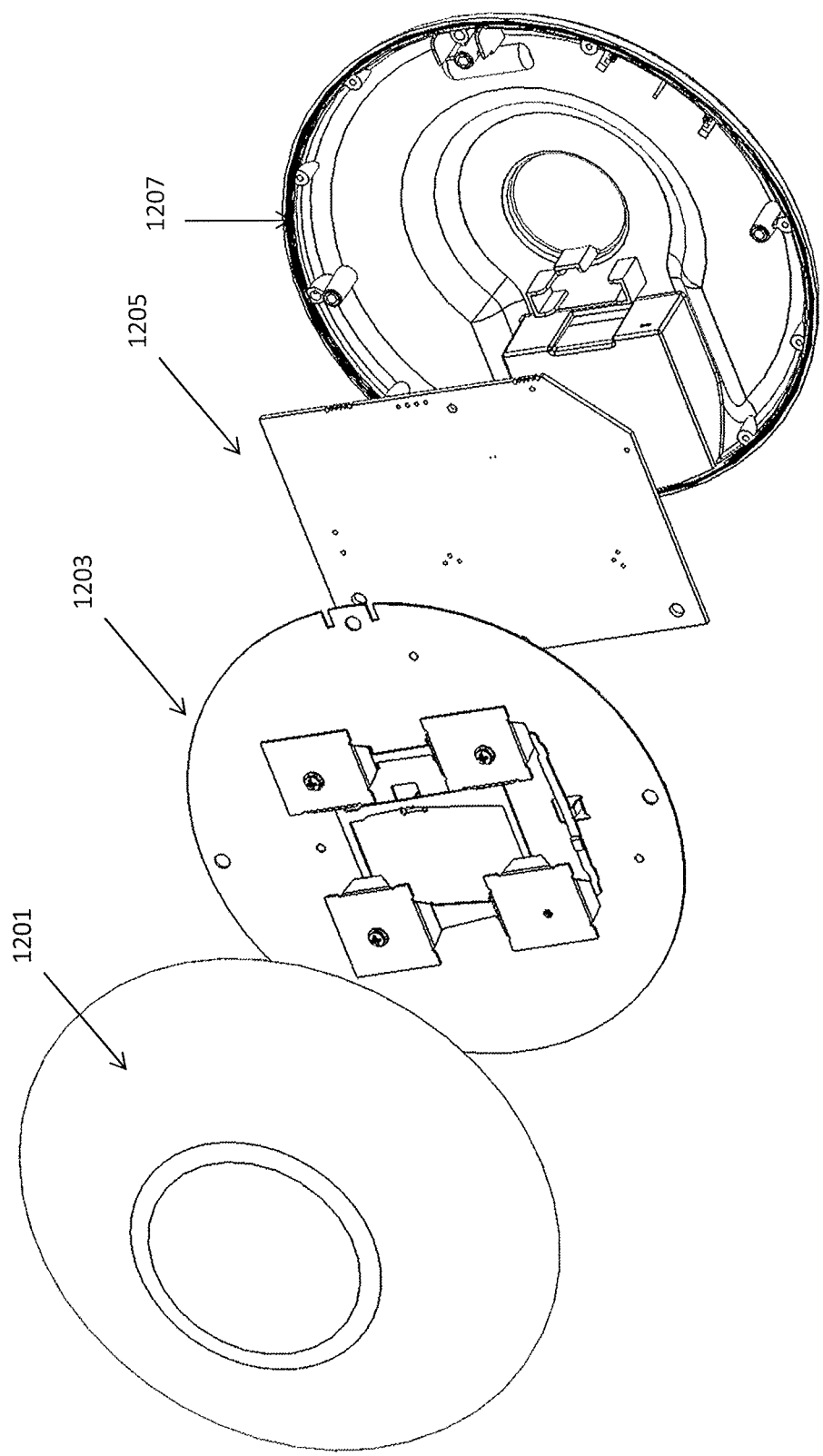
FIG. 12 shows an exploded view of an antenna such as the antenna of FIG. 9A-9B, including the housing and patch antenna (comprising a ground plate formed of a first sheet of material, and an array of patch radiating elements, antenna feeds and slant feed lines formed of second sheet of material.

In FIG. 12, the dome-shaped upper cover 1201 is removed, showing the patch antenna 1203 and a circuit board 1205 (e.g., PCB) to which the circuitry may be mounted. The lower cover 1207 is also shown.

Figure 13A:
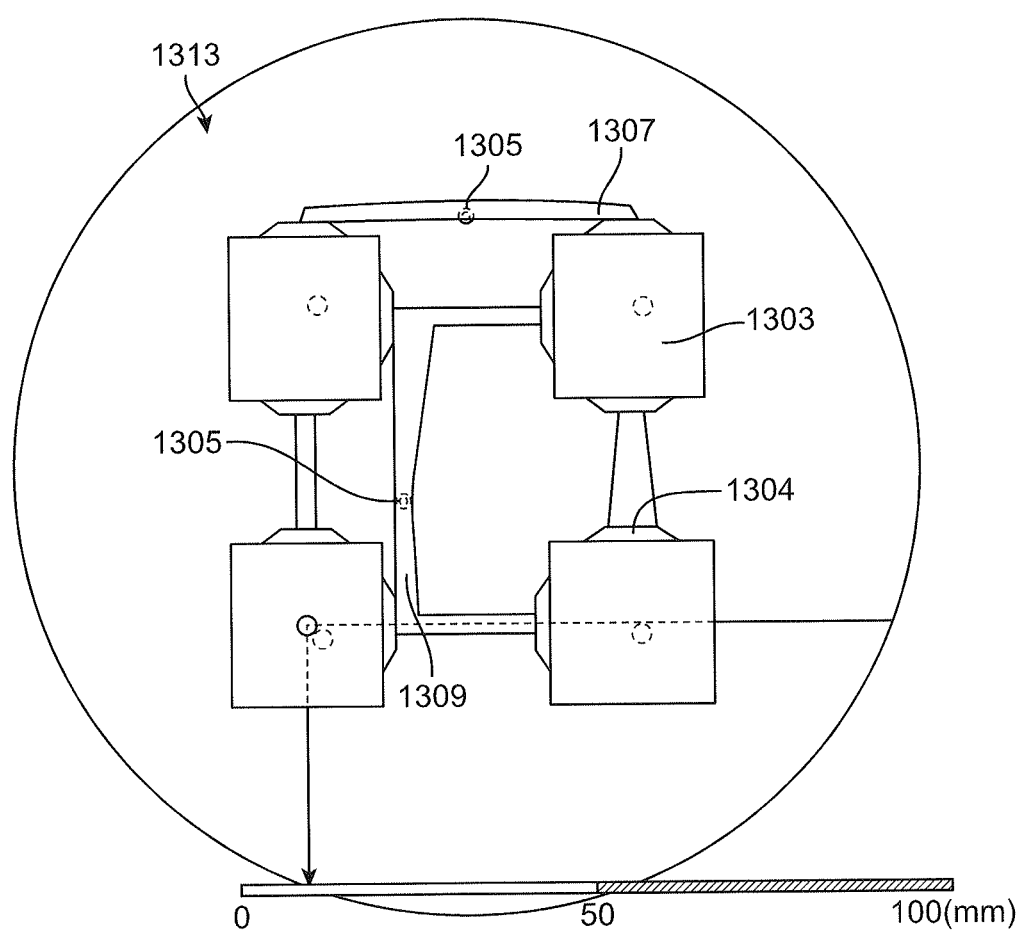
FIG. 13A illustrates one example of a patch antenna that may be included with any of the apparatuses described herein; the patch antenna shown is an antenna having a 4 Patch, 130 mm configuration, which fits within an housing as described and shown herein.

FIG. 13A shows more detail on one variation of a patch antenna. In general, a patch antenna may include a ground plane (plate) forming a first plane. As mentioned, the ground plane may be non-dielectric material (e.g., including conductive materials such as metals). The patch antenna may also include multiple patch radiating elements (patches) that are positioned in a second plane above the ground plane, so that they are separated from the ground plane. Each patch radiating element may have a radiating surface extending in the second plane. The radiating surface may be connected (e.g., by a screw or other connection) to the ground plane, providing grounding to each patch. The path between the emitting elements (e.g., 1403) and the ground plate 1413 may be insulated to prevent grounding the antenna radiating elements.

In some variations, unlike traditional microstrip antennas, the patch radiating elements in the patch antennas described herein may have surface areas (and/or shapes) of the radiating surfaces of different patches that vary from each other within some range of values, typically centered around a central value. For a square and/or rectangular radiating surface, the central value may be approximately the square of one-half of the wavelength of radiation of the patch antenna. For example, the surface areas of all, most, or some of the radiating surfaces forming the patch antenna may be different but between about 0.1% and 20.0% of each other.

FIGS. 64A-65B, described in detail below, illustrate a similar variation in which the shapes of the antenna antenna radiating elements are approximately the same size, though the design may share may of the other features of the apparatuses described in FIGS. 14A-14D.

In FIG. 14A-14D, the radiating surfaces forming the patches are connected to an antenna feed that is divided up into different regions; the antenna radiating elements are each connected by one or more feed lines. The antenna feed(s) may be arranged in a third plane that is located between the plane of the radiating elements and the ground plane. Positioning the antenna feed out of the plane of the radiating elements may reduce line radiating and enhance performance. In this example, the antenna radiating elements are each connected to two or more feed lines, configured as slant feed lines. These connecting elements (slanted risers) may connect each radiating element to a microstrip line. The antenna feeds may be arranged so to form a dual polarized configuration (e.g., vertical polarization and horizontal polarization), as illustrated below. This dual polarization may avoid the need for crossovers in the microstrip.

The dimensions of the antenna feeds connecting the radiating elements of the patches may be irregular; for example, rather than rectangular shapes between radiating elements, the edges of the antenna feeds may vary, so that the distance between the edges along the length of an antenna feed (the width) varies. Thus, the width of an antenna feed extending in the plane between the ground plane and the emitting surface may vary along its length.

Because the antenna feed(s) and slant feed lines are located in a different plane above the ground plate than the radiating surfaces, the patch radiating surfaces may be positioned closer to other in the same plane while still maintaining a distance that is within a wavelength or half-wavelength multiple of the wavelength of radiation of the patch antenna. Thus, the distance between adjacent patch radiating surfaces maybe smaller than one-half wavelength of the wavelength of radiation of the patch antenna because the actual distance energy will travel between them follows the shortest path along the length of the first slanted riser, antenna feed and second slanted riser.

The patch radiating surfaces (patch radiating elements) may be connected to an adjacent patch radiating surface (element) such that one radiating surface is connected to a another radiating surface by a first slant feed line, an antenna feed, and second slant feed line, to form a set of patch radiating elements. The distance between a midpoint of the first radiating element and a midpoint of the second radiating element may be approximately one wavelength of radiation of the patch antenna when measured as the shortest distance between the midpoint on a surface of the first patch radiating element, down a surface of the first slant feed line, along a surface of the antenna feed, up the surface of the second slant feed line, and back along the surface of the second patch radiating element.

In general, the patch array antenna apparatuses described herein may be configured to include both vertical and horizontal polarization. For example, a subset of the antenna feeds may be configured as a vertical polarization feed network connected to a first radio connection point, and the other antenna feeds may be configured as a horizontal polarization feed connected to a radio connection point. Each patch radiating element may also be connected to the ground plate through a grounding attachment, which may provide EMI protection, acting as a high pass filter, e.g., protecting against discharges such as from lightening, which would be filtered out by the ground connection.

Returning now to FIG. 13A, this figure shows one variation of a patch antenna having four patches (thus, having four antenna radiating elements and surfaces). In this example each patch (emitter) 1303 shown has slightly different dimensions in the x and y direction (in the plane of the radiating surfaces) but are located in the same (z) plane. In this variation, a subset of the antenna feed lines connecting the patches to a feed form a vertical polarization (v-pol) network (or v-pol network feed) 1307, which is connected to a radio connection point 1305. Similarly, a horizontal polarization (h-pol) network formed of a subset of the antenna feeds is also connected to each patch and to form an h-pol network feed 1309 that is connected to a radio connection point 1305. All of the antenna feeds are between the emitting/receiving patch surfaces 1303 and the ground plane 1313. The antenna feeds connect to the sides of the patches via slant feed lines 1304.

Figure 13B:
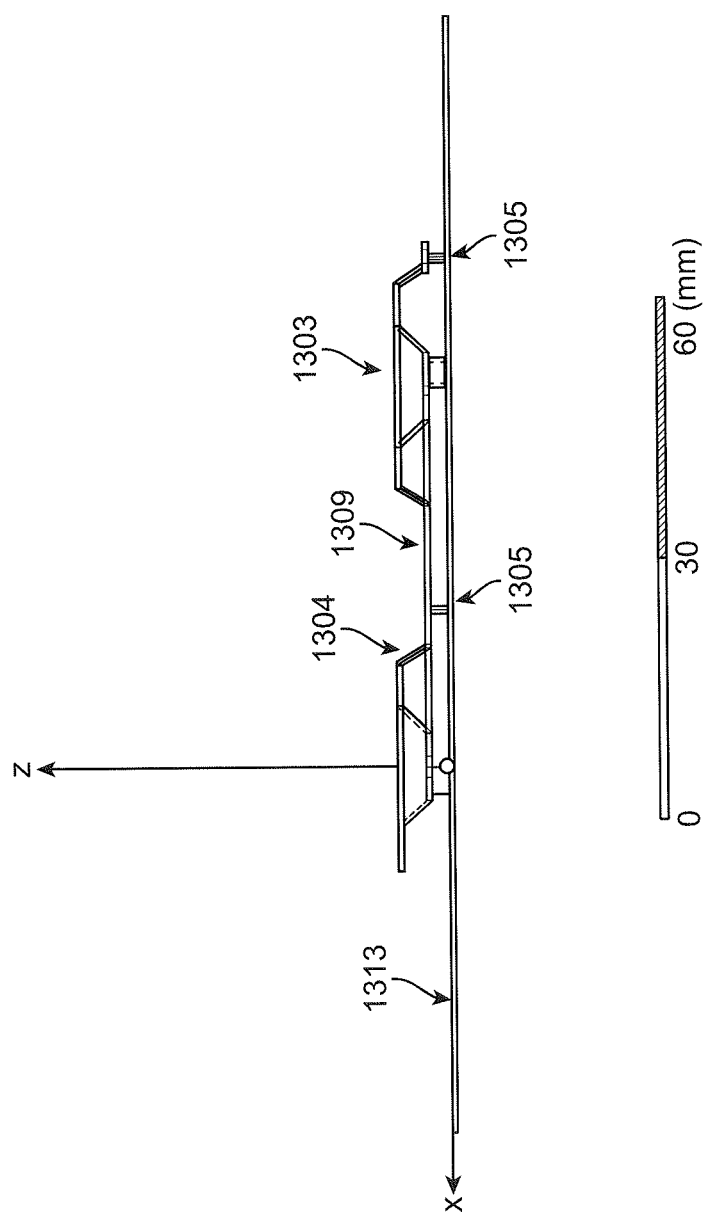
FIG. 13B shows a side view of the antenna of FIG. 13A.
Figure 15A:
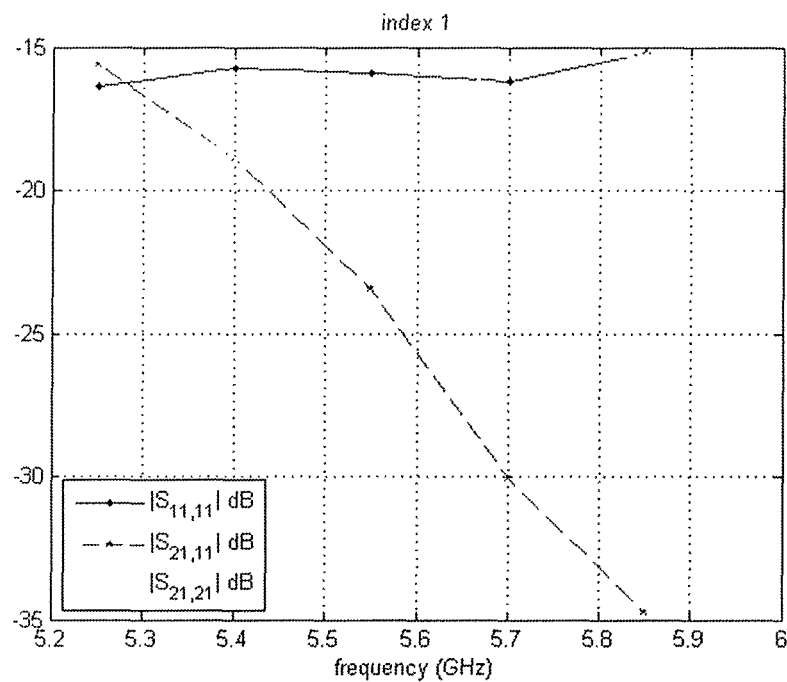
FIGS. 15A and 15B show graphs indicating the performance of a 4-pol apparatus such the one shown in FIGS. 13A-13B.
Figure 15B:
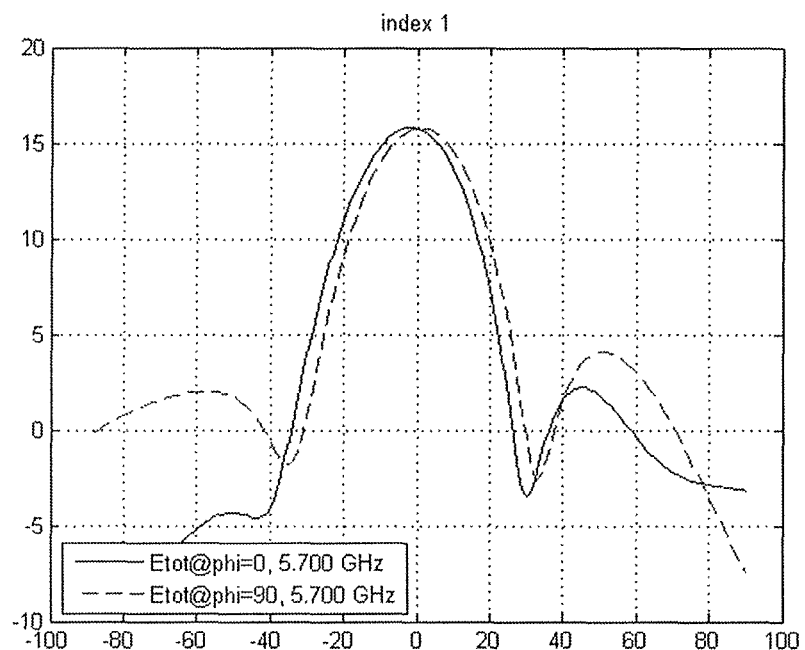

FIG. 13B shows a side view of the exemplary patch antenna from FIG. 13A, including the ground plane (plate) 1313. Two of the four patches (each with an emitting surface 1303) are visible, and antenna feeds 1309 and slant feed lines 1304 are shown. The radio connection points 1305 for both the v-pol network and the h-pol network are also visible; not visible are the connections to the circuit (e.g., PCB) which may be located beneath the ground plane 1313, as shown in FIGS. 11 and 12. The scale bars provided in FIG. 13A (showing 50 and 100 mms) and FIG. 13B (showing 30 and 60 mm) are exemplary only, and are not intended to be limiting; the actual dimensions of the patch antenna may be different both collectively and/or in individual parts. As illustrated in FIGS. 15A and 15B, which demonstrate the behavior of the patch antenna sub-system of FIGS. 13A and 13B the antenna gain may be between 15-16 dB for such a system. In addition, this embodiment may be within the 5.15 to 5.85 GHz band; adjusting the separation between the ground plate and the emitting surface may adjust the bandwidth.

The antennas described herein may be configured to be particularly compact. For example, the spacing between individual patches of the array of patches forming the patch antenna may be more closely packed than otherwise permitted when maintaining signal phase and gain. Typically the distance between emitting/receiving surfaces must be maintained at a multiple of the wavelength (or half-wavelength) of the antenna, so that the patches will radiate with the same phase and in the proper direction from the plane of the emitting surfaces. (e.g., perpendicular to the plane of the emitting surfaces). For example in FIG. 13, an signal from the top left patch (with reference to the figure) to the adjacent bottom left patch (with reference to the figure) must experience a 360 phase shift so that it is also in-phase when emitted by both patches. Since each patch is about ½ wavelength long, the distance from the center to the edge of the patch is approximately ¼ wavelength, thus the total distance traveled by the signal between the two patches should be approximately another one-half wavelength. This distance is the length of the antenna feed between the two patches as well as the length of the slant feed lines. Since the slant feed lines extend out-of-plane, the spacing between the adjacent edges of the patches may be less than this one-half wavelength distance. Note that feeds forming the v-pol network and the feeds forming the h-pol network are out-of-phase (e.g., by ½ wavelength) because the polarization is flipped.

In general, the patches forming the patch antenna (and specifically, the emitting areas, or emitting surfaces/regions, of the patches) may be slightly different sizes in a single patch antenna. For example, the sizes (and shapes) of the patches may all be slightly different, but within a predetermined range relative to the operational wavelength(s) of the patch antenna. For example, each feed in the array may be close to ½ wavelength in length, as mentioned above. However, if (as with prior art devices) the feeds are all exactly the same ½ wavelength length, the resulting array factor would provide high side lobes, which may be undesirable. When, as described herein, the distance between adjacent connected patches (which may be "length" in one, e.g., x, direction and "width" in another, e.g., y, direction) are slightly different, but centered around the desired frequency of the antenna, this effect may be reduced. Since the phase for all of the patches is ideally optimized so that the patches have approximately the same power and same phase, if reflections from the patches return to the radio connection point from identical patches, then the four patches would send the energy back at that frequency, combined in phase, at the radio point. By modifying the sizes of the patches slightly (so that each length is different), this effect can be minimized without sacrificing the overall phase and power. The slant feed lines that ramp up between the patches, which allow tighter packing between patches described above, may also help suppress the energy emitted in the x and y directions.

Figure 14A:
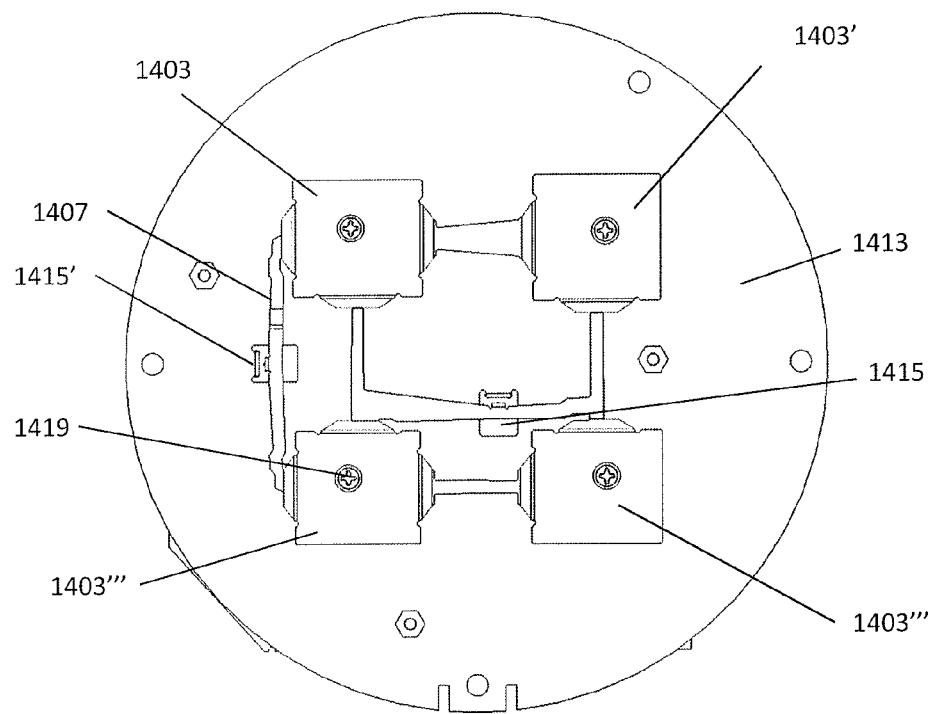
FIG. 14A shows an alternative view of a four-patch patch antenna similar to the variation shown in FIG. 13A.

FIG. 14A is another example of a array antenna sub-system that may be included in a housing to form a radio and antenna device for providing wireless broadband access. In FIG. 14A, the top view (looking down on the patches forming the patch antenna) shows for patches 1403, 1403', 1403", 1403'" each of slightly different size dimensions. Each of these patches is connected via a screw 1419 to the ground plane 1413. The radio feeds 1415, 1415' connected to the v-pol and h-pol antenna feed networks 1407, 1409, respectively, are also shown.

Figure 14B:
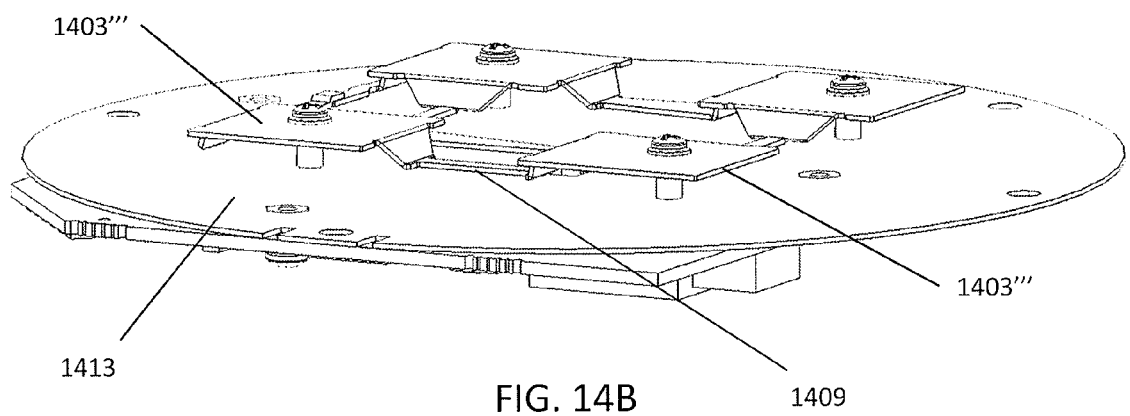
FIGS. 14B, 14C and 14D show a side perspective view, a side view, and an exploded side perspective view, respectively, of the antenna of FIG. 14A.
Figure 14C:
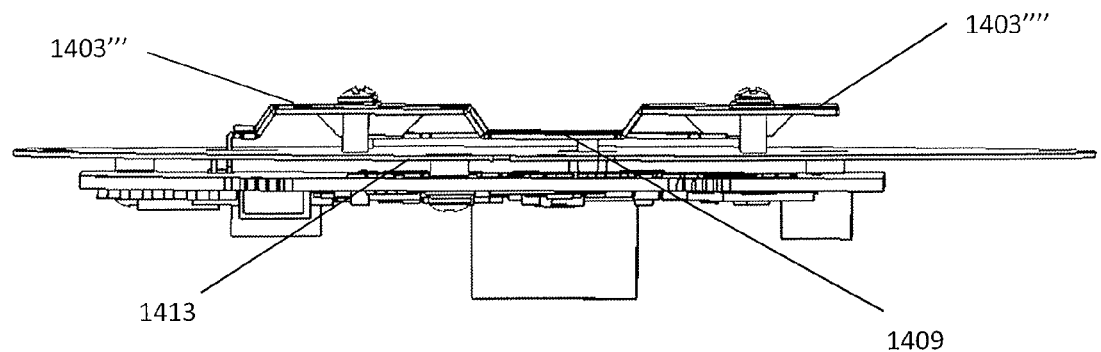
Figure 14D:
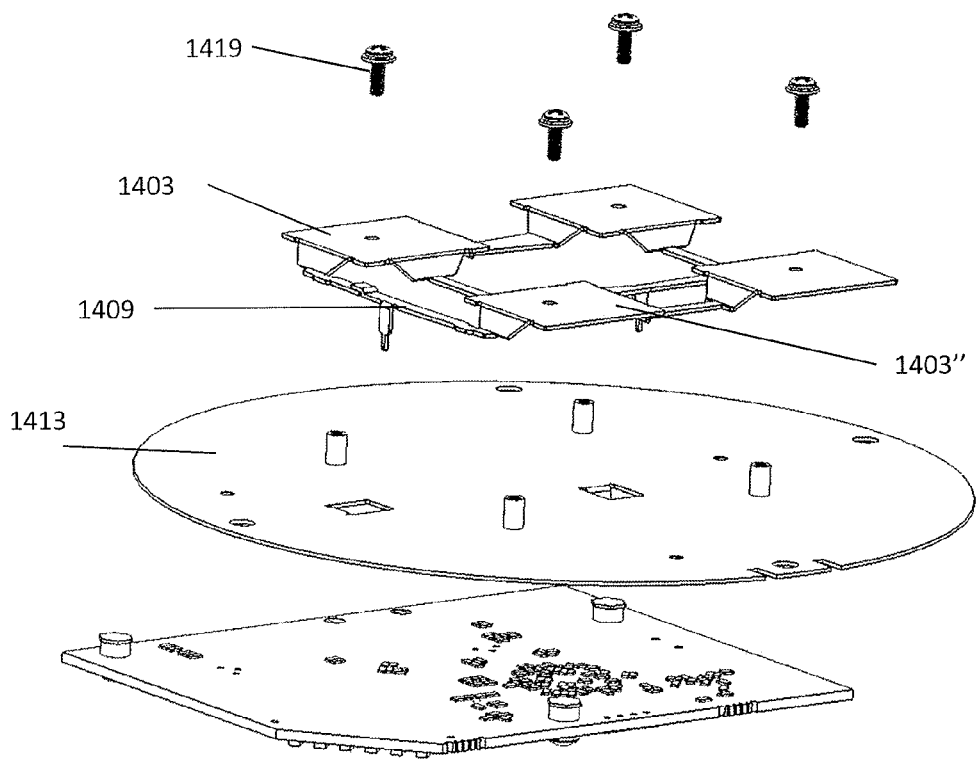

In the side perspective view of this antenna feed antenna shown in FIG. 14B, the spacing (in z) between the patch emitting surfaces 1413'", the antenna feeds 1409 and the ground plane 1413 may be seen. The side view of FIG. 14C makes this even more apparent. For example the separation between the ground plane and the antenna feeds may be about 6 mm and the separation between the ground plane and the antenna feed may also be about 6 mm.

In general, the patches may be formed by using a mandrel or other device to press/form/shape the emitter (patch) surfaces, slant feed lines and antenna feeds from a single piece of material, such as a plate of steel, brass, copper, or any other appropriate material. The shapes of the patch, slant feed lines and antenna feeds (including the radio feeds) may be pre-cut into the material before pressing; in some variations the pressing and cutting may be combined. Once the shaped sheet of material has been formed to the multi-planar shape (e.g., separating the plan of the emitter surfaces from the plane of the antenna feeds by a predetermined amount), the structure may be connected (e.g., via screws, welding, etc.) to the ground plane. For example, the two components may be spot welded together. The structure may be concurrently or sequentially connected to a printed circuit board (PCB) to which the controller hardware/firmware has been (or will be) attached.

Figure 16:
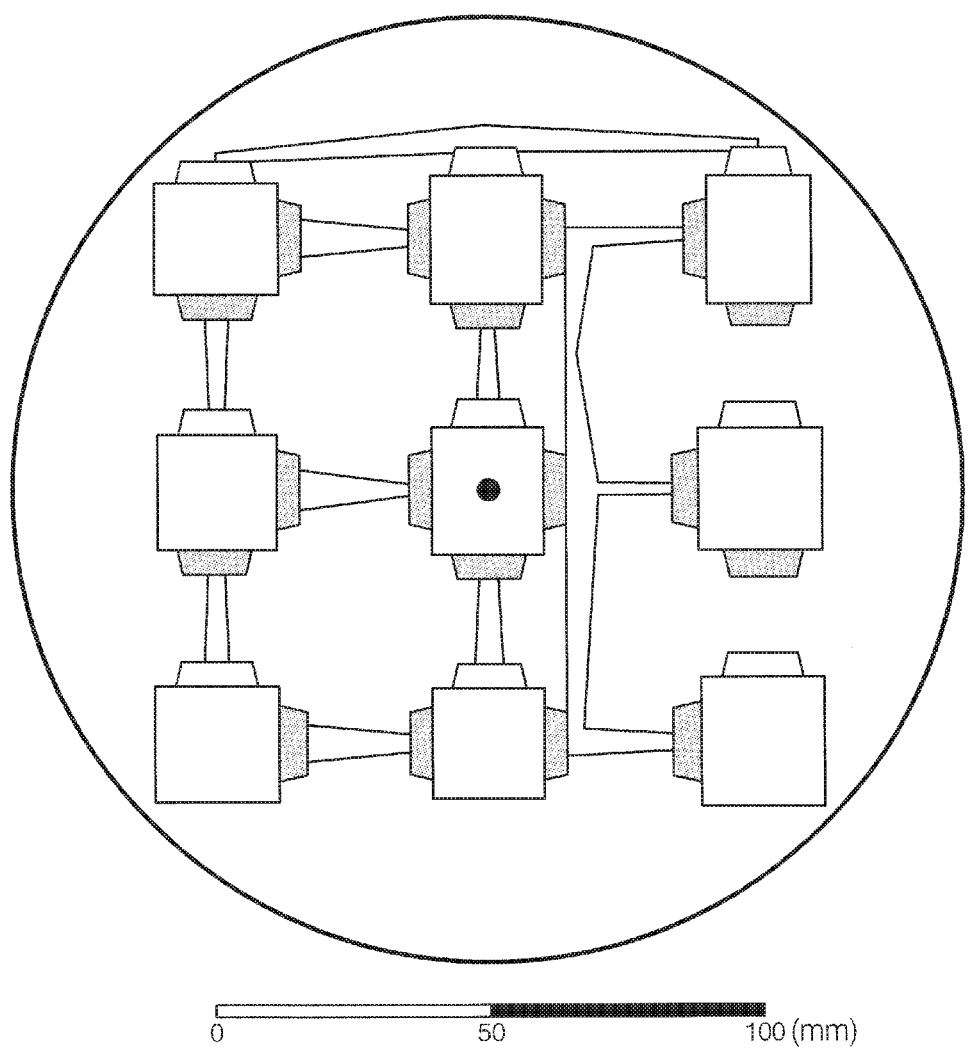
FIG. 16 shows another variation of a patch antenna that may be used as described herein. In particular, the patch antenna may be configured as a 9 patch (nine emitting surfaces), 180 mm device.
Figure 17:
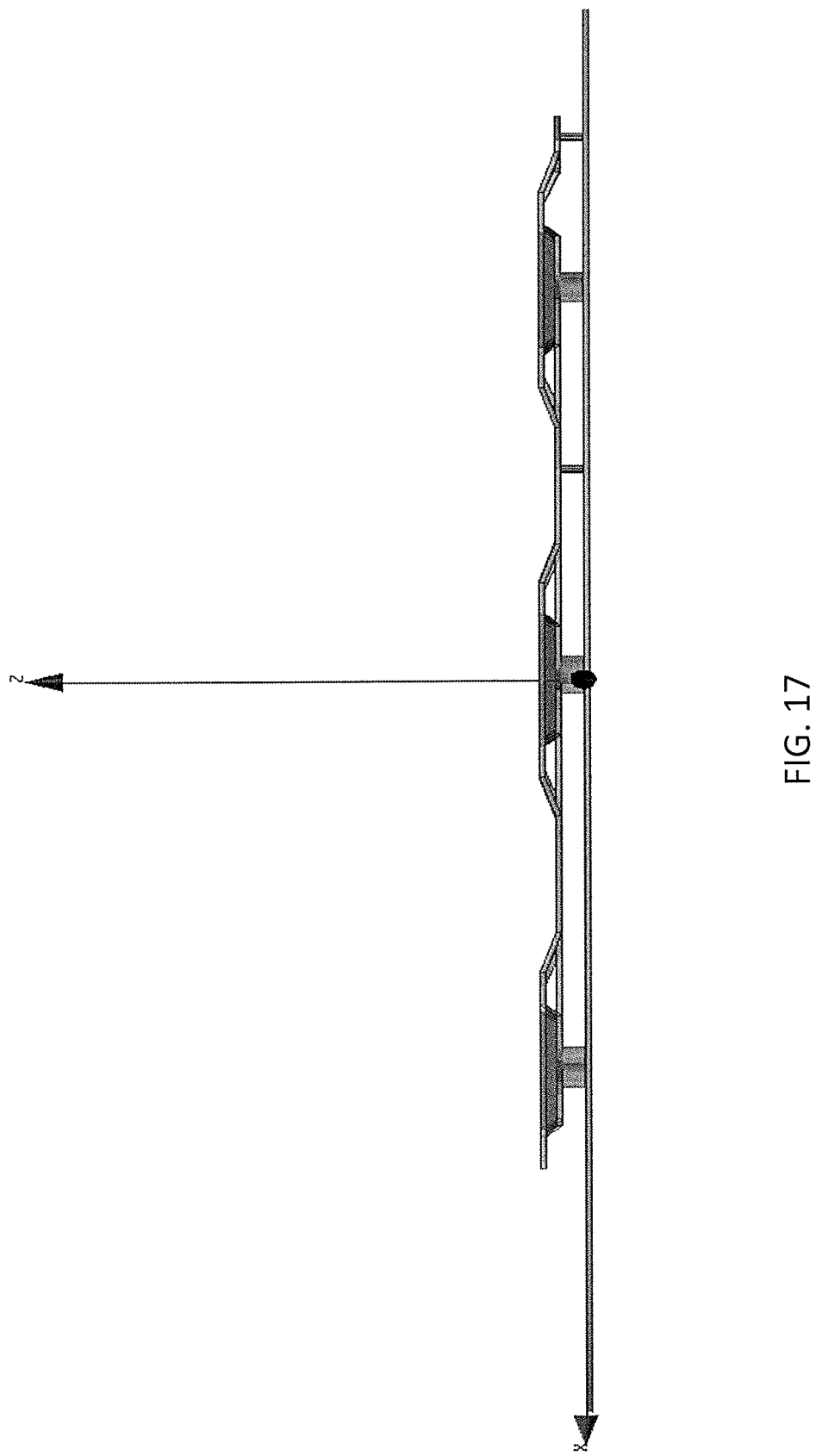
FIG. 17 is a side perspective view of the antenna shown and discussed for FIG. 16 (a 9 patch, 180 mm antenna).

FIGS. 16 and 17 show front/top and side views, respectively of another variation of a patch antenna; this variation includes nine patches. The same principles of operation and construction discussed above for the four-patch antenna in FIGS. 13A-14D also apply. As in the four-patch example, the nine patches can be arranged above the ground plane with the antenna feeds between the ground plate and plane of the patch emitter surfaces. In both examples the antenna feeds are arranged as v-pol and h-pol networks, and the antenna feeds have a variable width along their length; in FIG. 16 the antenna feeds have angled, somewhat irregular appearing sides.

Figure 18A:
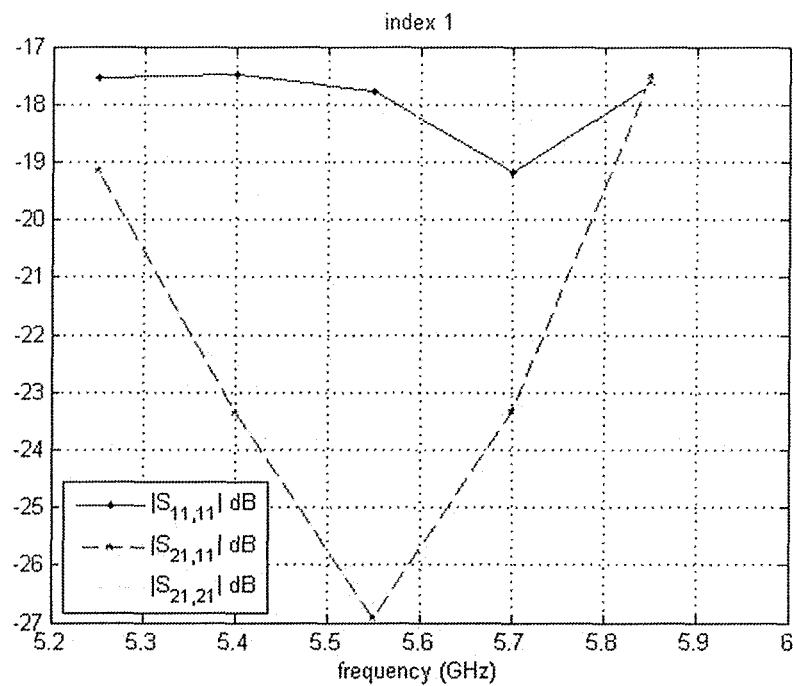
FIGS. 18A and 18B show graphs indicating the performance of a 9-pol apparatus such the one shown in FIGS. 16-17.
Figure 18B:
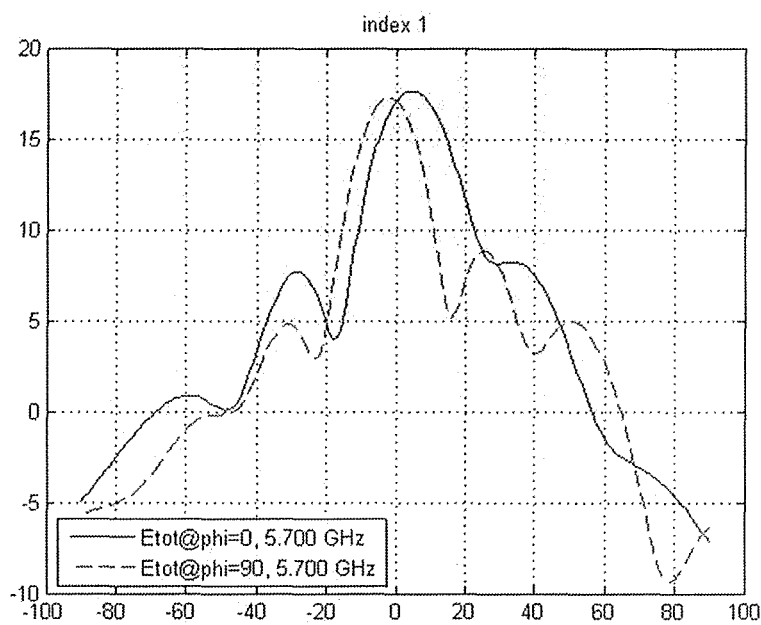
Figure 19:
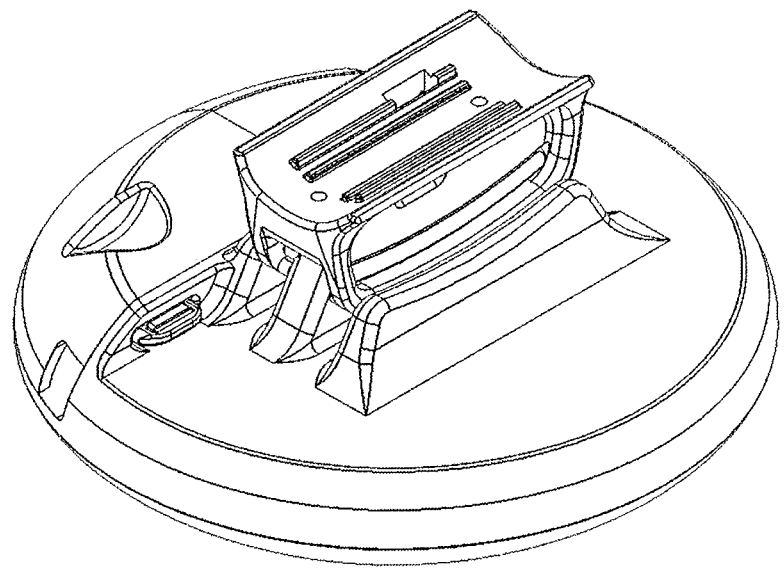
FIG. 19 is a back perspective (elevational) view of one variation of a wireless transmission station.
Figure 20:
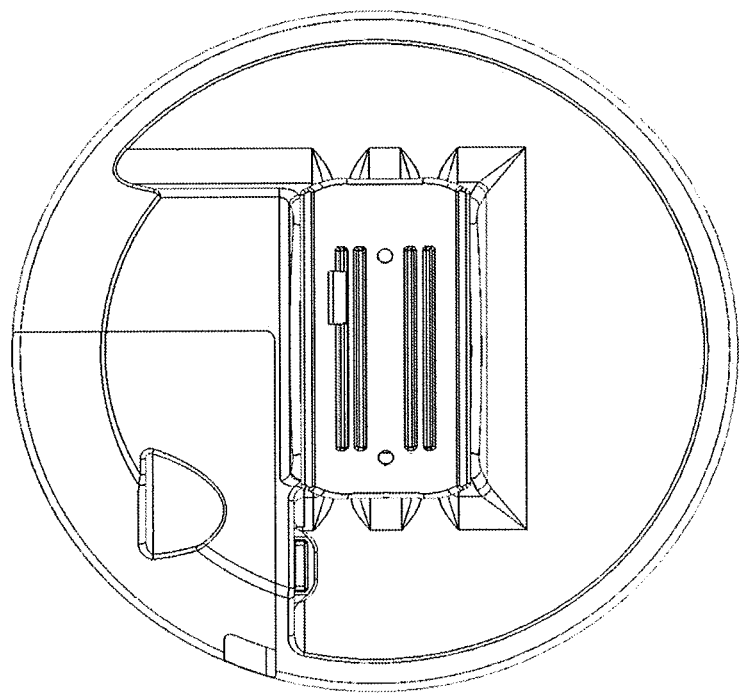
FIG. 20 is a back view of the wireless transmission station of FIG. 19.
Figure 21:
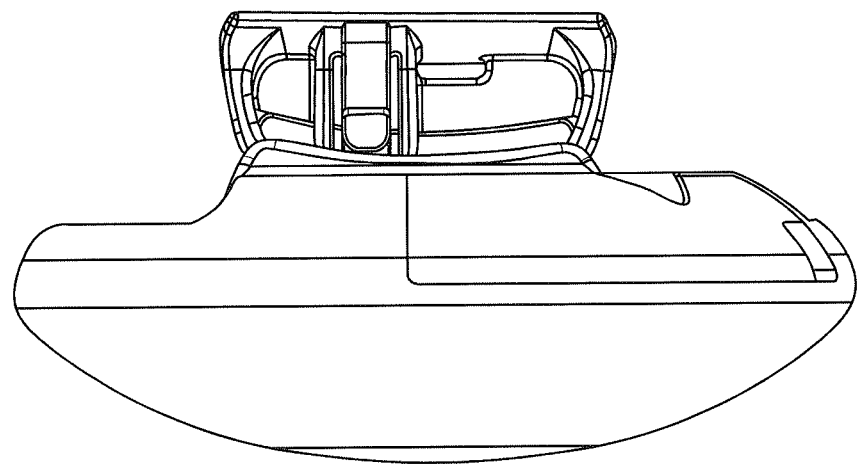
FIG. 21 is a left side view of the wireless transmission station of FIG. 19.
Figure 22:
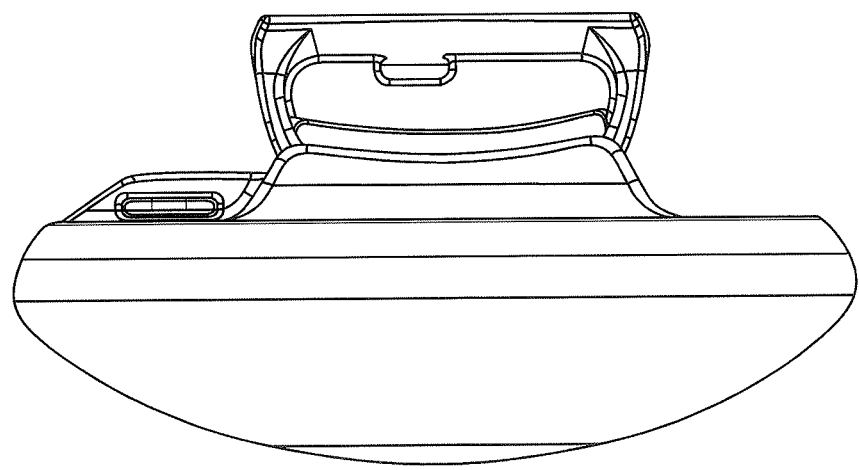
FIG. 22 is a right side view of the wireless transmission station of FIG. 19.
Figure 23:
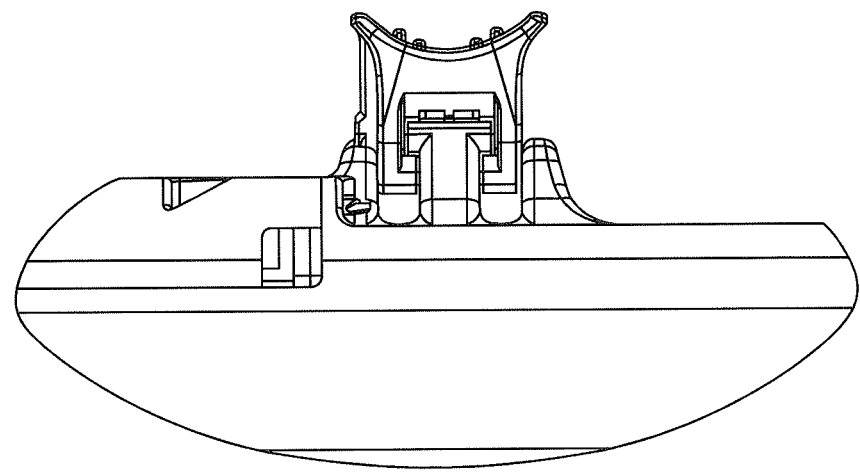
FIG. 23 is a bottom view of the wireless transmission station of FIG. 19.
Figure 24:
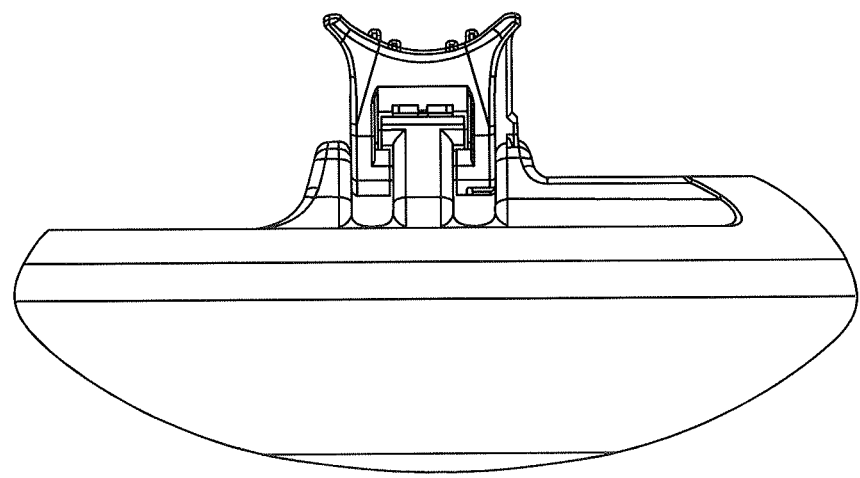
FIG. 24 is a top view of the wireless transmission station of FIG. 19.
Figure 25:
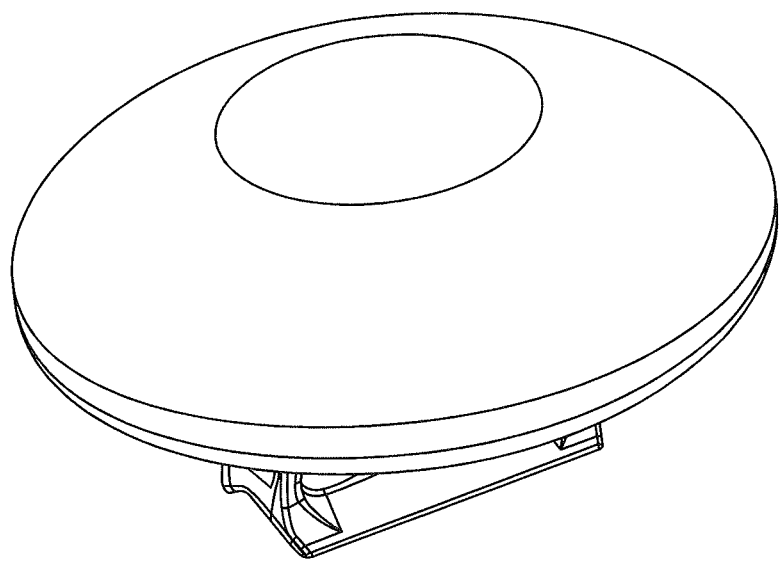
FIG. 25 is a front perspective (elevational) view of the wireless transmission station of FIG. 19.
Figure 26:
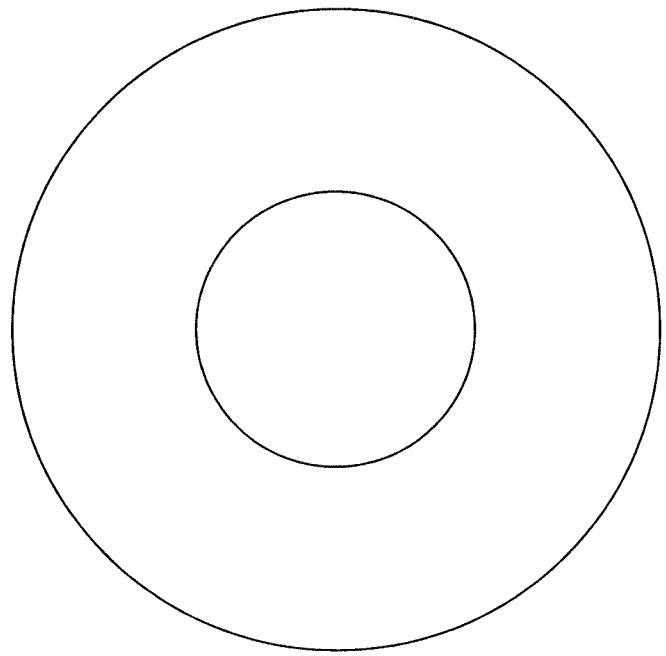
FIG. 26 is a front view of the wireless transmission station of FIG. 19.
Figure 27:
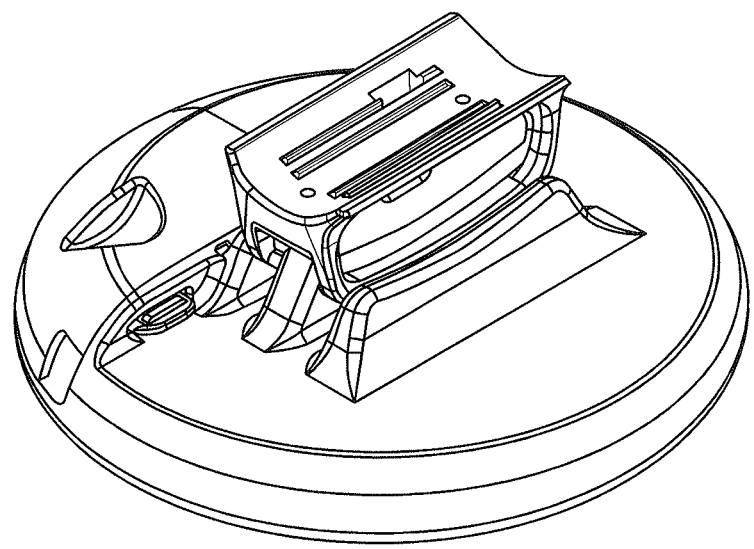
FIG. 27 is an alternative back perspective (elevational) view of a wireless transmission station of FIG. 19.
Figure 28:
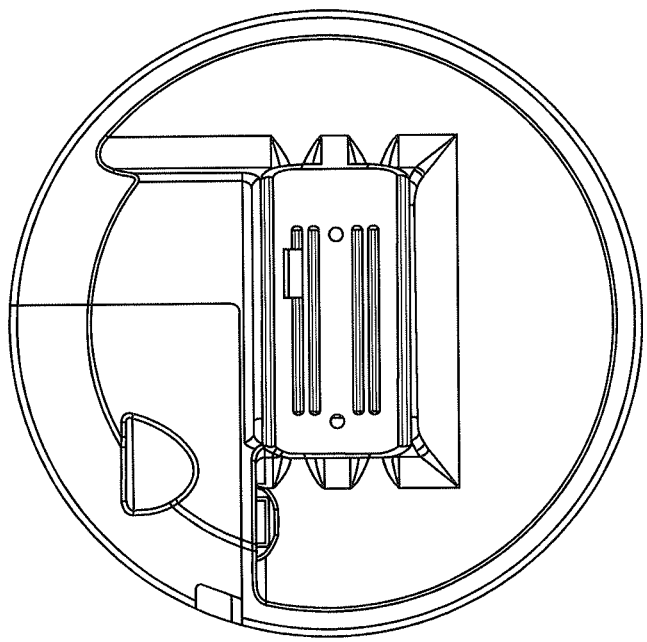
FIG. 28 is an alternative back view of the wireless transmission station of FIG. 19.
Figure 29:
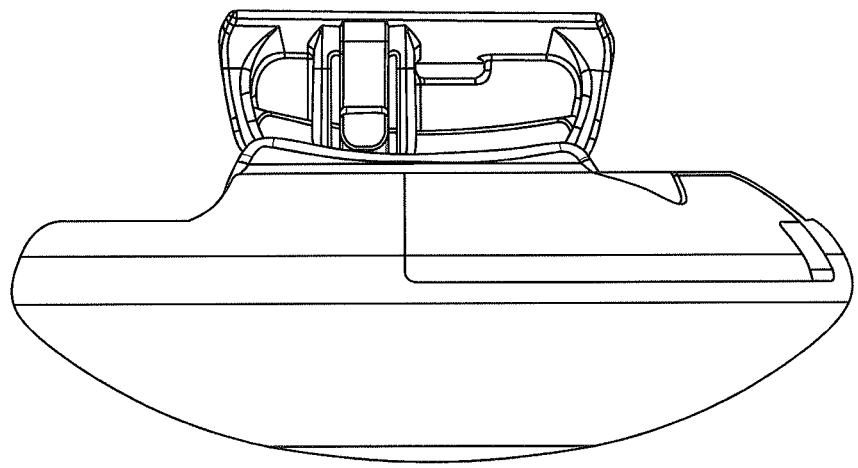
FIG. 29 is an alternative left side view of the wireless transmission station of FIG. 19.
Figure 30:
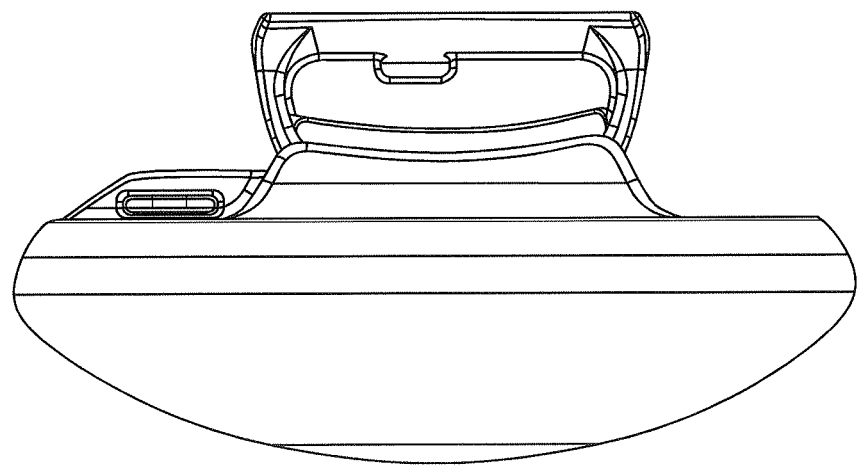
FIG. 30 is an alternative right side view of the wireless transmission station of FIG. 19.
Figure 31:
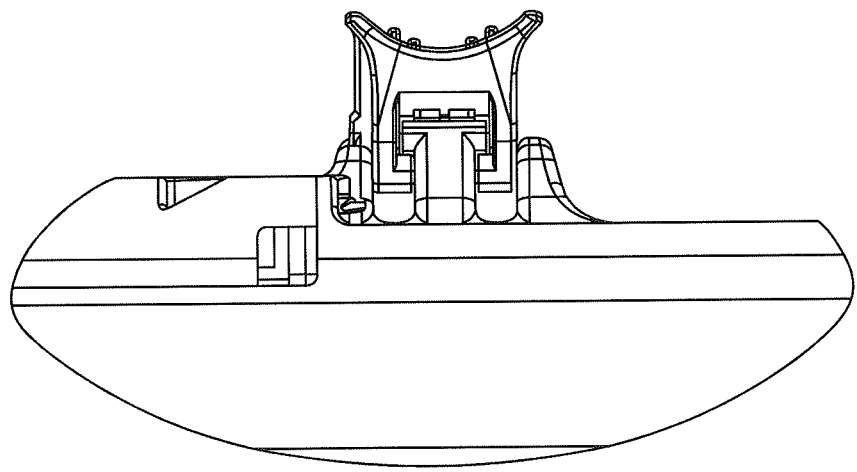
FIG. 31 is an alternative bottom view of the wireless transmission station of FIG. 19.
Figure 32:
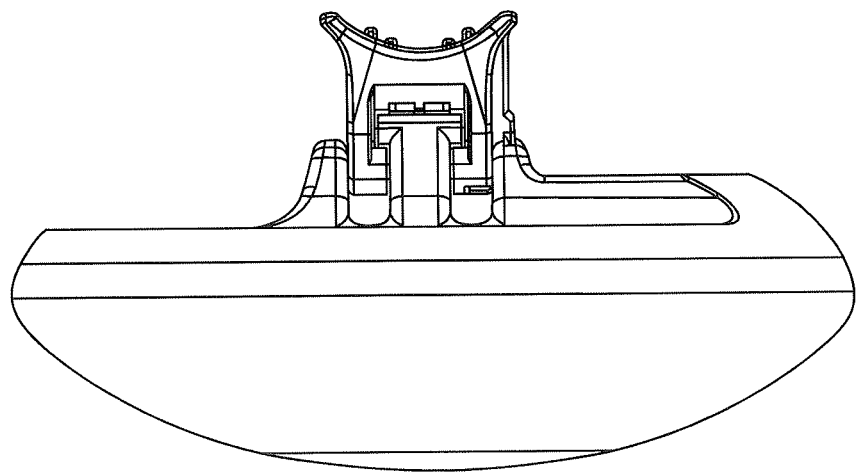
FIG. 32 is an alternative top view of the wireless transmission station of FIG. 19.
Figure 33:
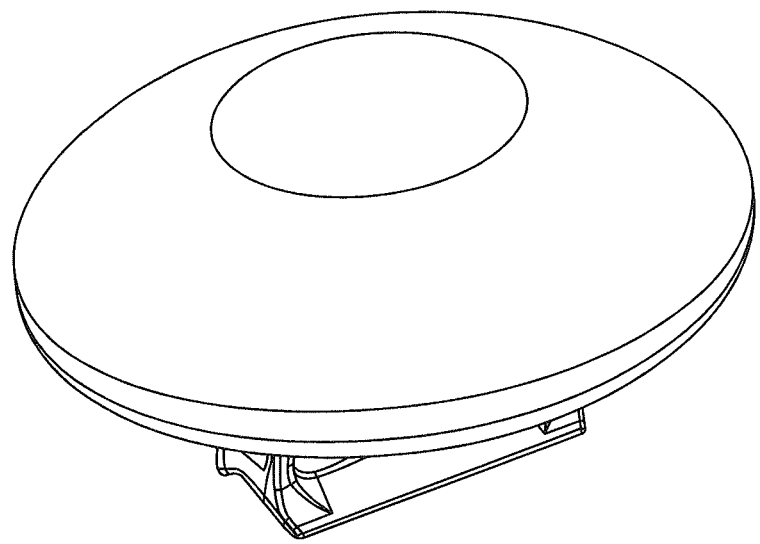
FIG. 33 is an alternative front perspective (elevational) view of the wireless transmission station of FIG. 19.
Figure 34:
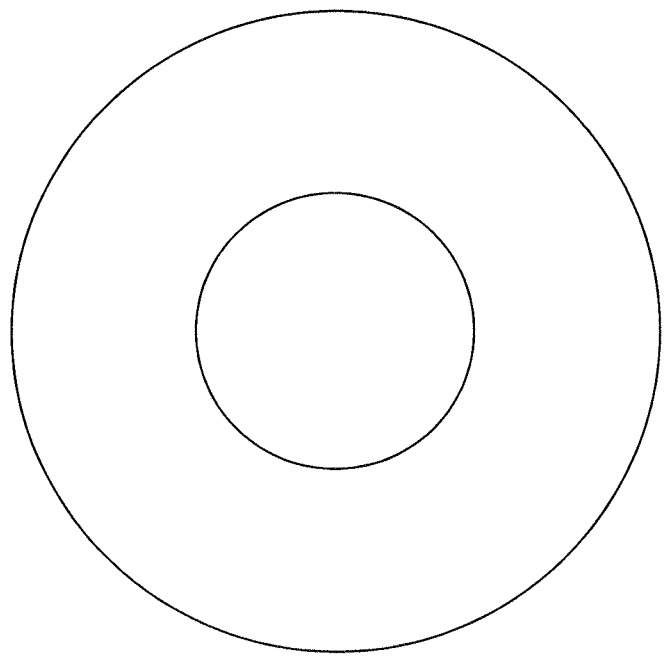
FIG. 34 is an alternative front view of the wireless transmission station of FIG. 19.
Figure 36:
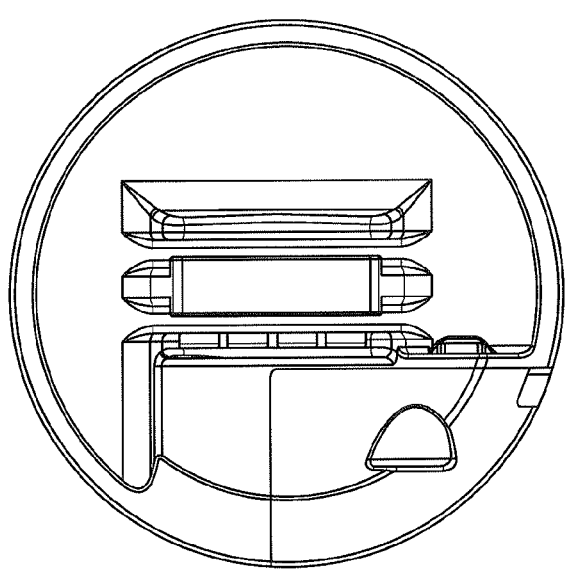
FIG. 36 is a back view of a wireless transmission station without the bracket connected to the housing.
Figure 38:
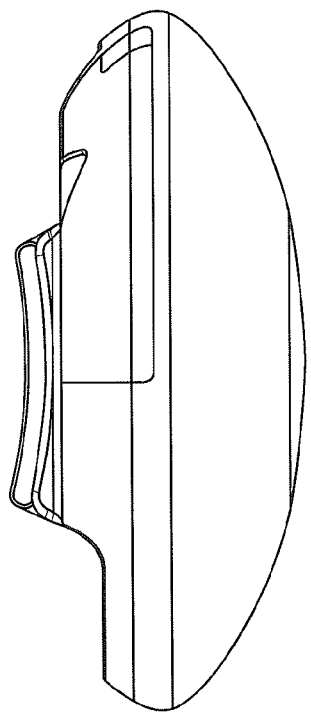
FIG. 38 is a left side view of the wireless transmission station without the bracket connected to the housing.
Figure 35:
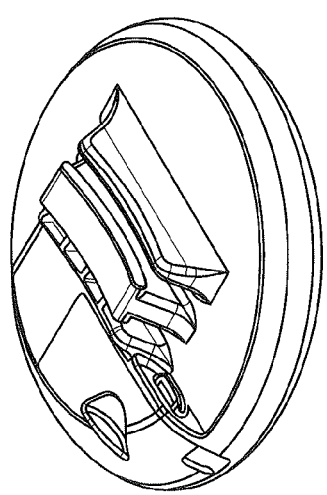
FIG. 35 is a back perspective (elevational) view of a wireless transmission station without the bracket connected to the housing.
Figure 37:
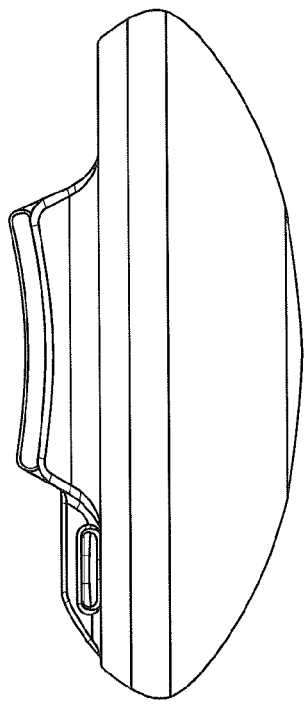
FIG. 37 is a right side view of the wireless transmission station without the bracket connected to the housing.
Figure 39:
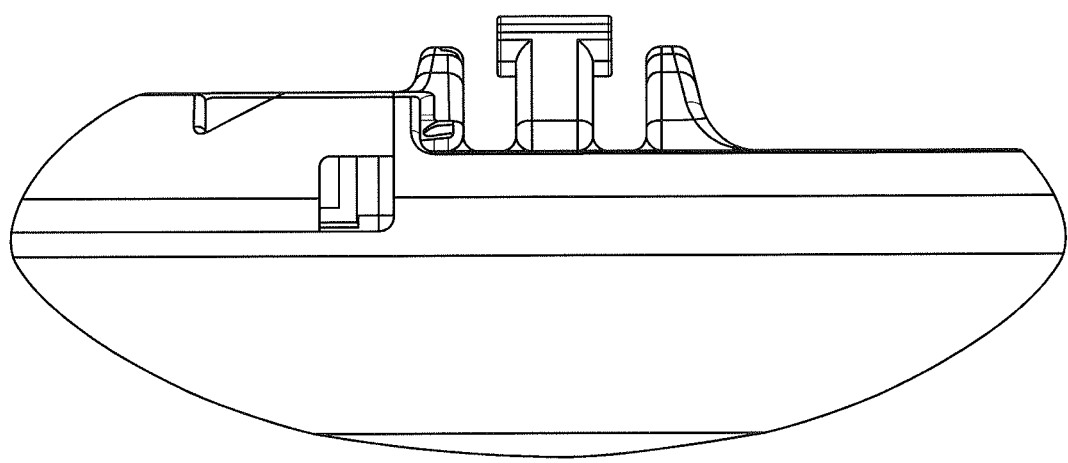
FIG. 39 is an alternative bottom view of the wireless transmission station without the bracket connected to the housing.
Figure 40:
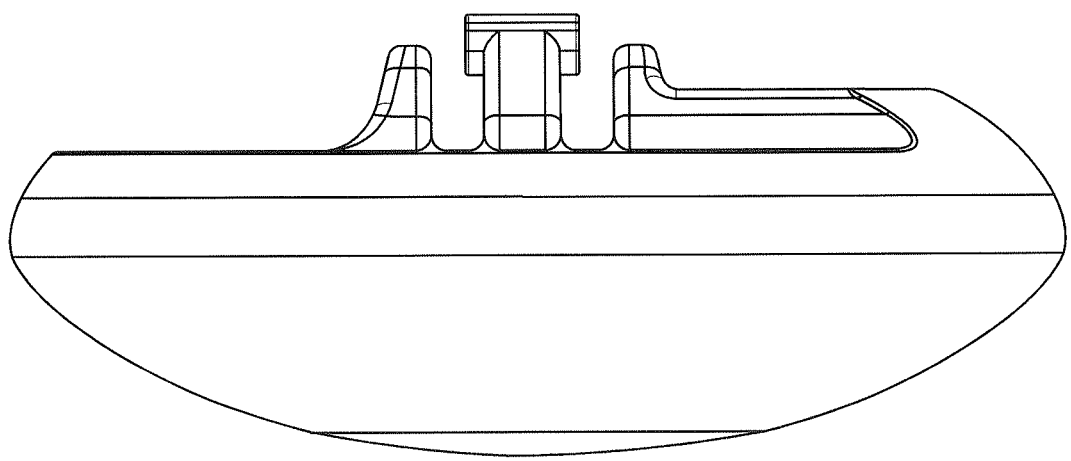
FIG. 40 is an alternative top view of the wireless transmission station without the bracket connected to the housing.
Figure 41:
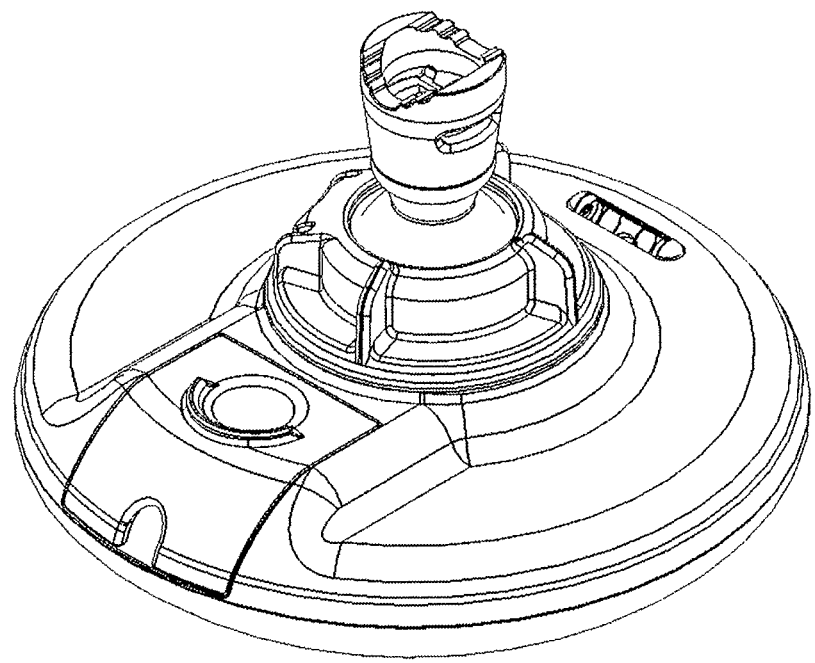
FIG. 41 is a back perspective (elevational) view of another variation of a wireless transmission station.
Figure 42:
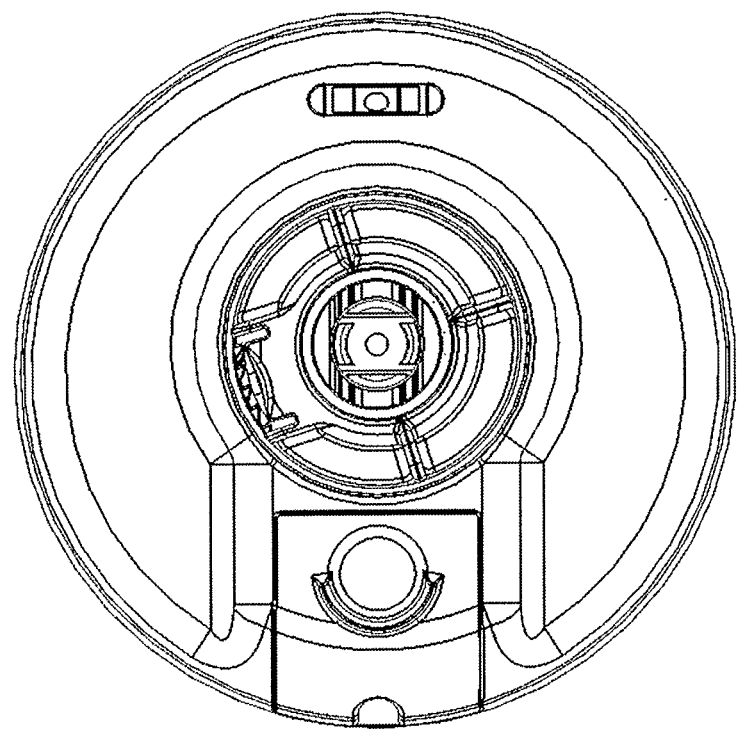
FIG. 42 is a back view of the wireless transmission station of FIG. 41.
Figure 43:
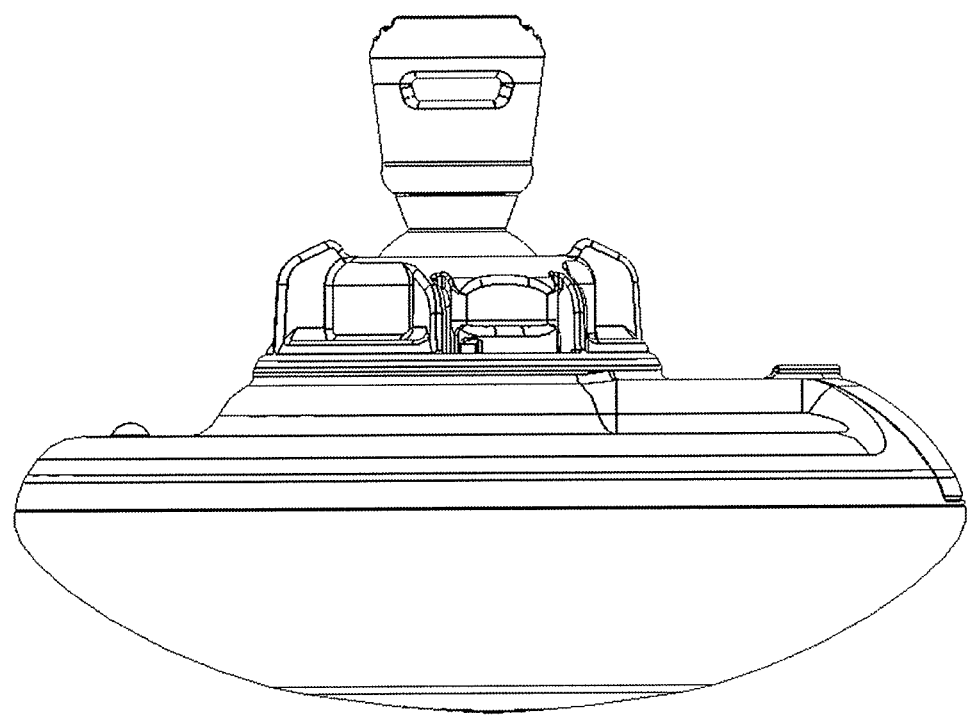
FIG. 43 is a left side view of the wireless transmission station of FIG. 41.
Figure 44:
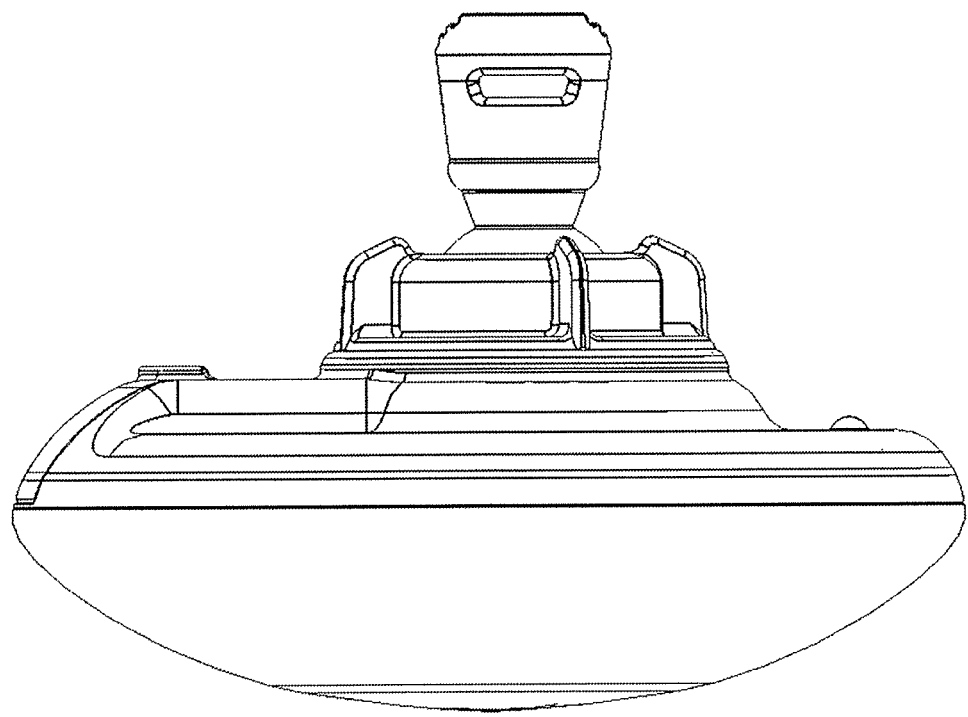
FIG. 44 is a right side view of the wireless transmission station of FIG. 41.
Figure 45:
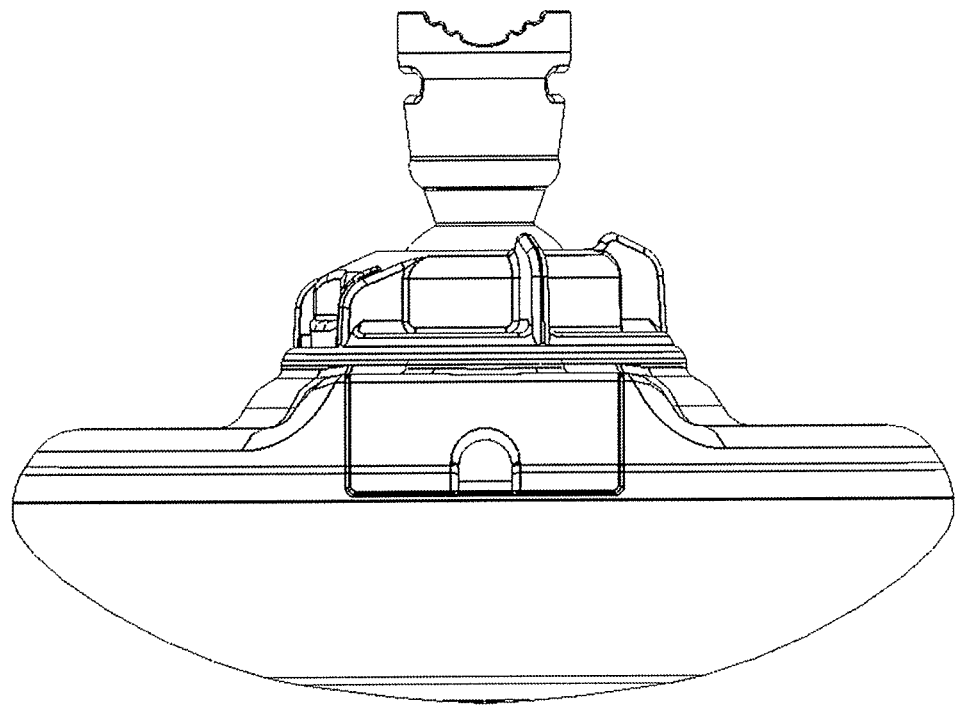
FIG. 45 is a bottom view of the wireless transmission station of FIG. 41.
Figure 46:
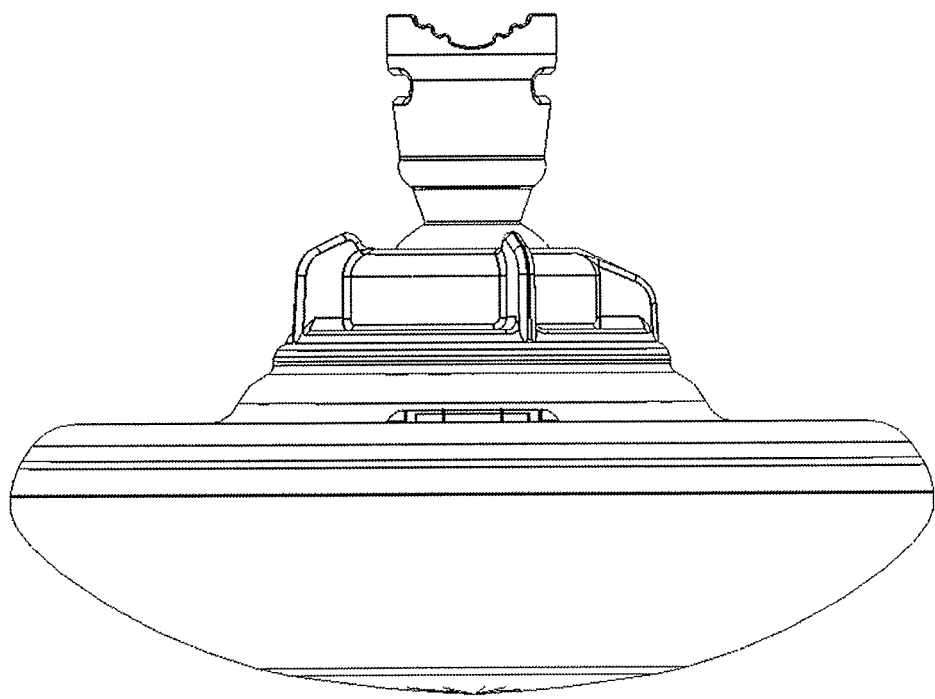
FIG. 46 is a top view of the wireless transmission station of FIG. 41.
Figure 47:
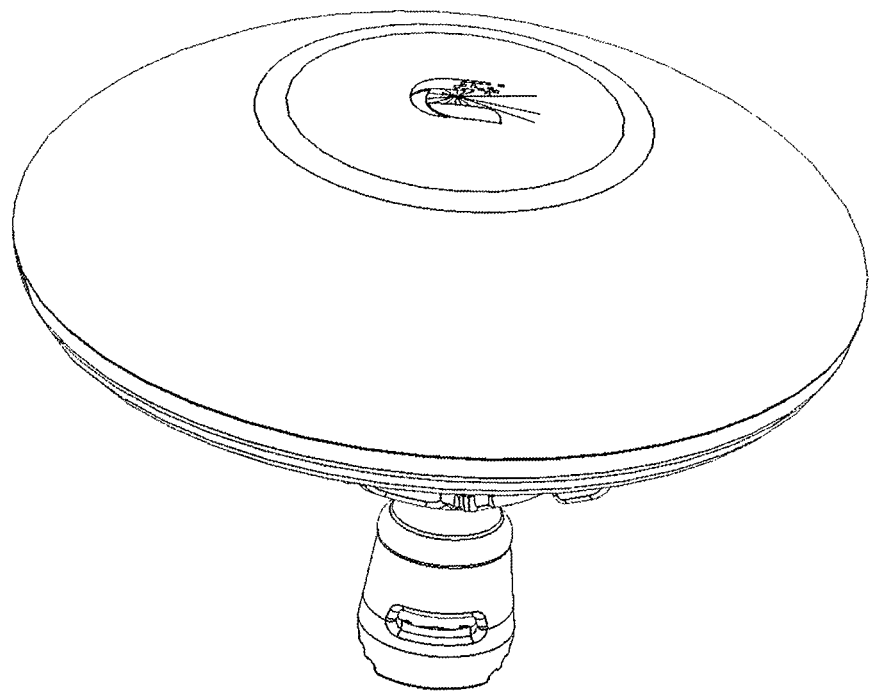
FIG. 47 is a front perspective (elevational) view of the wireless transmission station of FIG. 41.
Figure 48:
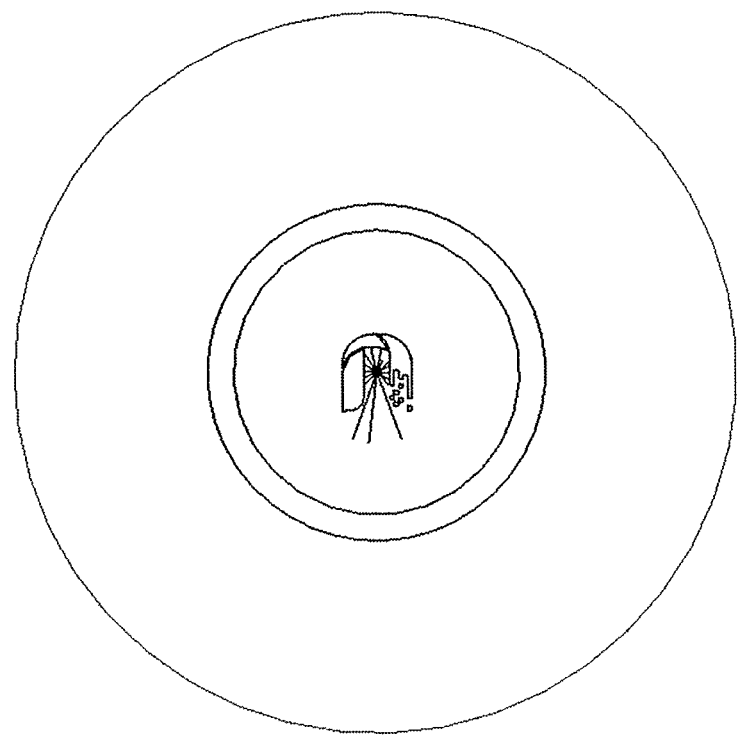
FIG. 48 is a front view of the wireless transmission station of FIG. 41.

As discussed above, these patch antennas are configured so that the phase is maintained by having the patches connected by line that have a phase length of either 180° (half wavelength) or 360° (full wavelength). This design may not include a dielectric (e.g., ground plate) that would slow the wave. Without the slant connection between the patch and the antenna feed, the spacing of the patches should be a half wavelength; however, the slant connection allows the spacing is tighter. This tighter spacing also helps to avoid grating lobes that would reduce gain and raise side lobes. FIGS. 18A and 18B illustrate performance of a patch antenna as shown in FIGS. 16 and 17.

Figure 49:
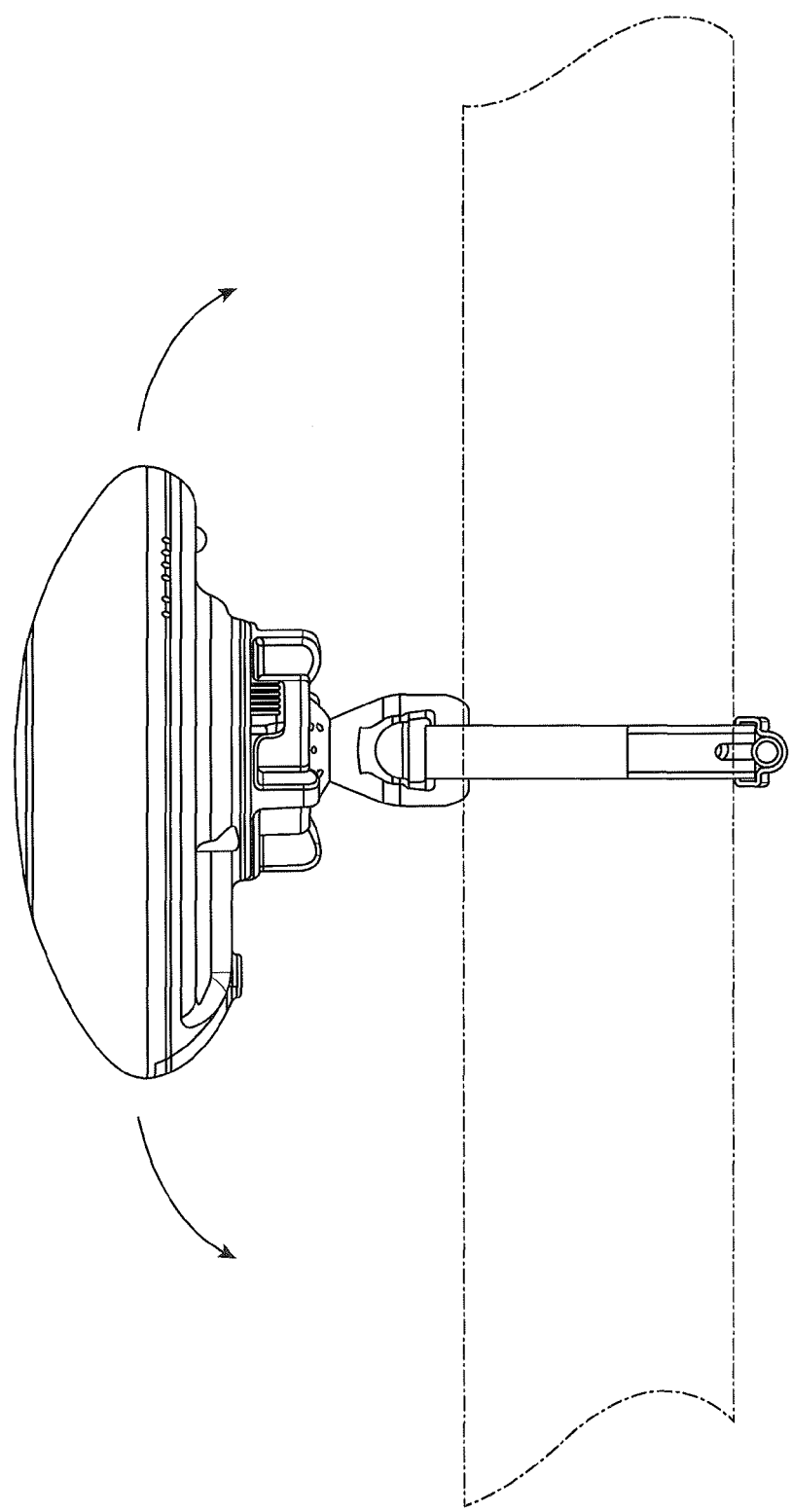
FIG. 49 illustrates one variation of a wireless transmission station such as the one shown in FIG. 41 mounted to a post.

FIGS. 19, 20, 21, 22, 23, 24, 25 and 26 show different views of the outside of one variation of a radio and antenna device for providing wireless broadband access. This variation includes a bracket and bracket mount similar to those described for FIGS. 1-3, above. FIGS. 27, 28, 29, 30, 31, 32, and 33 also show different views of the outside of a variation of a radio and antenna device for providing wireless broadband access, also including a bracket and bracket mount similar to those described for FIGS. 1-3. FIGS. 34, 35, 36, 37, 38, 39 and 40 also show different views of the outside of a variation of a radio and antenna device for providing wireless broadband access, also including a bracket and bracket mount similar to those described for FIGS. 1-3. Finally, FIGS. 4, 42, 43, 44, 45, 46, 47 and 48 show different views of the outside of a variation of a radio and antenna device for providing wireless broadband access, having a ball- and socket type bracket and bracket mount similar to those described for FIGS. 9A-11B. FIG. 49 shows one variation of a radio and antenna device for providing wireless broadband access mounted to a pole; the angle of the device is adjustable, as shown by the arrows in FIG. 49.

Any of the wireless broadband access apparatuses described herein may be adapted to minimize the impedance mismatch between the antenna, such as an array antenna as described and illustrated above, and the circuitry, such as a printed circuit board (PCB), and especially a layered PCB. It is important that the interface between the PCB and the antenna are electrically matched so that impedance mismatch is minimized. In the wireless broadband access devices described herein, this may be achieved by forming clearing regions around the RF input/output pin connecting the antenna to a layer of the PCB. These clearing regions may be regions where there is no a substantial amount of conductor (e.g. copper) or conductive material around the pin(s) where they pass through and/or contact the layers of the PCB other than the layer to which they make electrical contact. Such regions may be referred to as "clearing regions" or conductive voids, or copper voids.

Figure 50A:
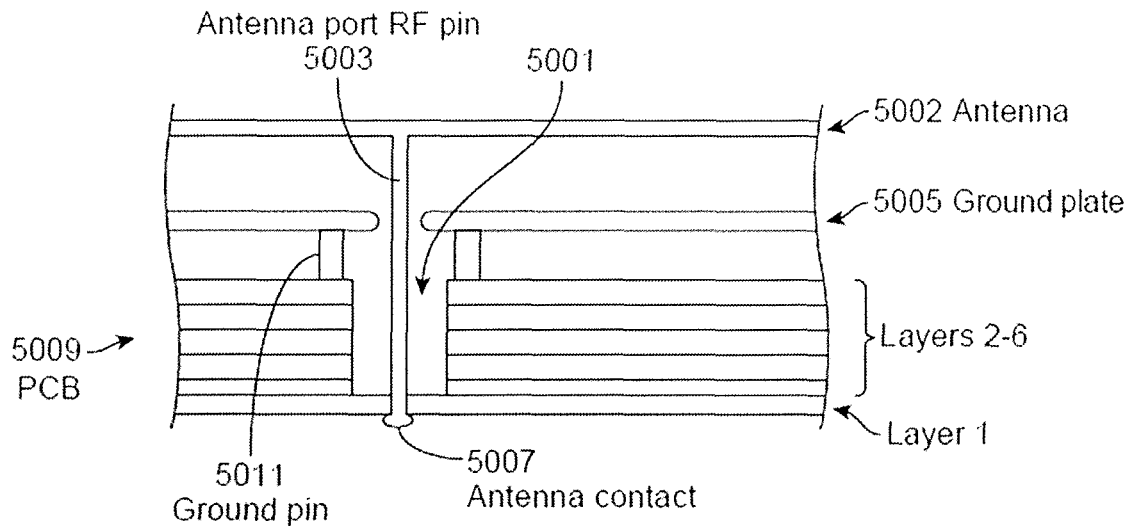
FIG. 50A shows a cross-section through a region of an wireless transmission station (wireless broadband access devices) in which the antenna is adapted to connected to a layered printed circuit board (PCB) in a manner that minimizes impedance mismatch by include a conductive clearing region in layers of the PCB through which the antenna connector pin (antenna port RF pin) passes before making electrical contact.
Figure 50B:
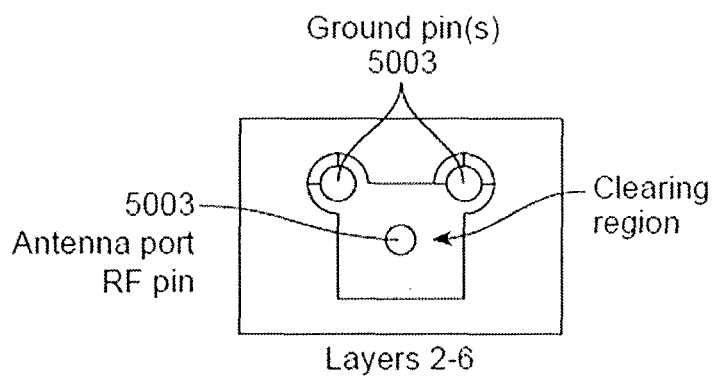
FIG. 50B illustrates a top view of a region of any of the layers through which the antenna port RF pin passes before making contact, showing the conductive clearing.
Figure 50C:
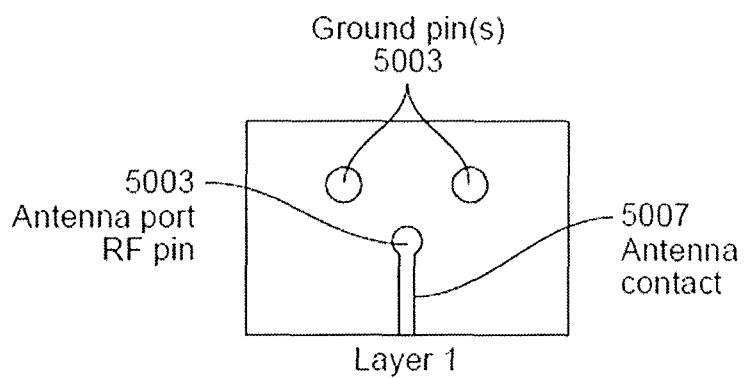
FIG. 50C illustrates a top view of a region of the layer onto which the antenna port RF pin connects with an antenna contact on this layer.

FIGS. 50A-50C illustrate a cross-section through a region of an antenna, ground plate, and layered PCB showing a clearing region around an antenna port RF pin. The antenna port RF pin 5003 provides input/output from the antenna, such as an array antenna. In some variations the antenna port RF 5003 connects to a horizontal polarization feed; in other variations it connects to a vertical polarization feed. In FIG. 50A, the clearing region 5001 is formed as a physical clearing between the layers (layers 2-6) and the ground plate 5005 as the antenna port RF pin extends down to the first layer (layer 1) where it makes an electrical connection with an antenna contact 5007. In this example, the clearing region is an enlarged cut-out region 5001 in which all of the layers of the PCB 5009 except the layer holding the antenna contact 5007 are recessed around the antenna port pin 5003. In some variations these additional (non-contacting layers 2-6) are not cut away from the pin 5003, but no conductive material is present on the layers within the clearing region. For example, the pin 5003 may extend through the different layers (layers 2-6) and may even contact the layer, but there is not conductive material (e.g., copper) within the clearing region (e.g., within 0.5 mm, 1 mm, 1.5 mm, 1.9 mm, etc.) of the pin in each layer.

FIG. 50B shows a top view of any of the intermediate layers (layers 2-6) through which the pin 5003 passes but does not make electrical contact. In FIGS. 50A and 50B, a pair of ground pins 5011 extend adjacent to the antenna port RF pin 5003 from the antenna. The ground pins also pass through the layers, as shown in FIG. 50B, but do not include a substantial clearing region around them, and may make electrical contact with one or more of layer 2-6. FIG. 50C shows a bottom view of layer 1, which does not include the clearing region; in layer 1, the antenna port RF pin 5003 makes electrical contact with a connector (e.g., antenna contact 5007). The connector then extends in layer 1 of the PCB from the antenna port RF pin, but does not pass between the ground pins 5003. In FIG. 50C, the antenna contact extends in the opposite direction from the ground pins.

In operation, the clearing region around each antenna port RF pin is a void (e.g. copper void or electrical conductor void) region which creates an almost coaxial structure in the z-axis of the PCB board around the pin as it transitions through the layers (e.g., from layers 6 to 1). In the example illustrated above, layer 1 is the RF PCBA design contact.

Figure 51A:
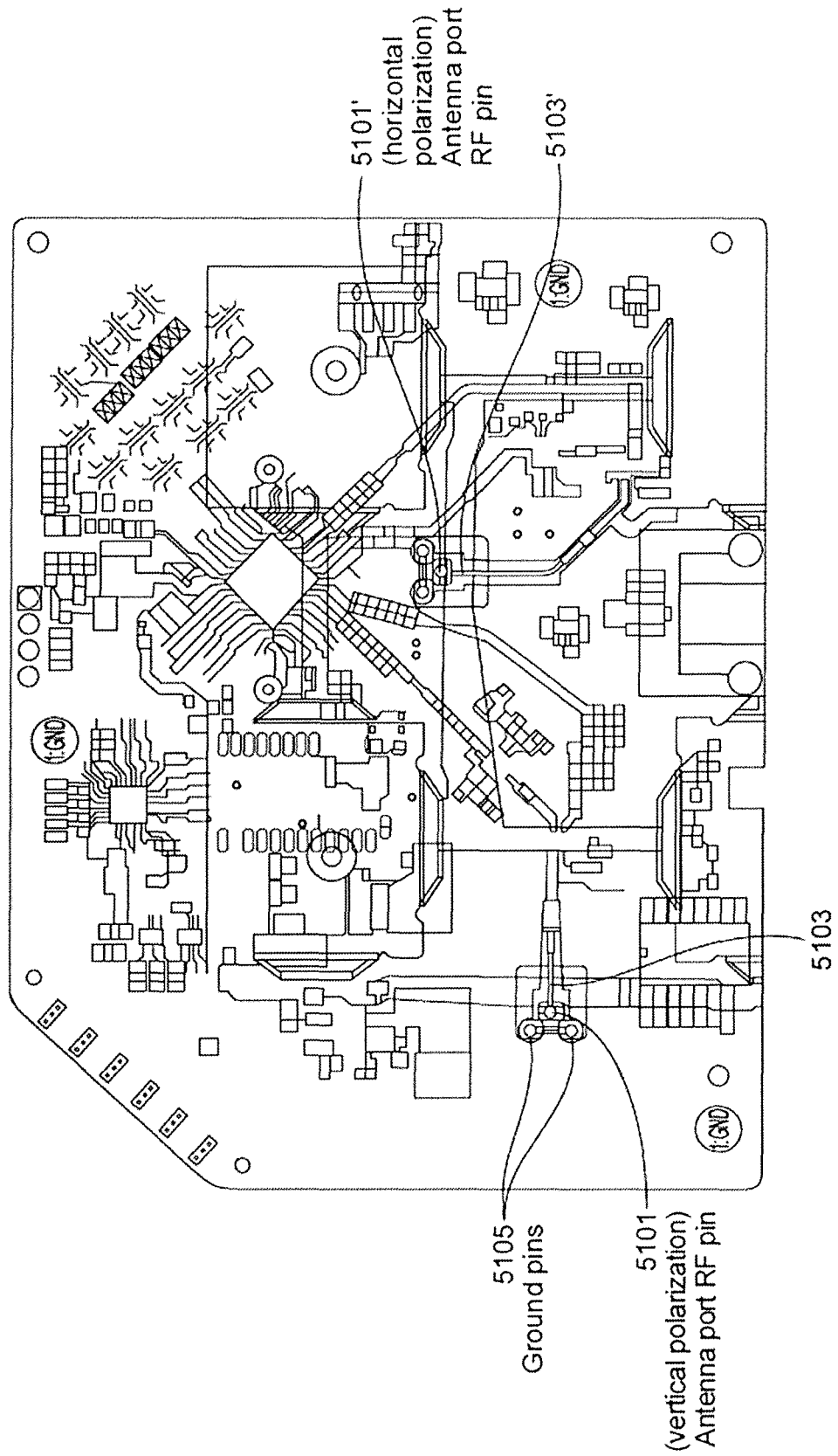
FIG. 51A shows a back view of a layered printed circuit board to which an antenna (e.g., array antenna) is attached.

FIGS. 51A-51D illustrate one variation of a radio and antenna device (wireless broadband access device) for providing wireless broadband access configured for use as a point-to-point or point-to-multipoint station that incorporates a clearing region around each of two antenna port RF pins (one for vertical polarization and one for horizontal polarization). FIG. 51A shows a back side view of a PCBA antenna having a pair of antenna port RF pins 5101, 5101'. Each pin 5101, 5101' makes electrical contact with an antenna connector 5103, 5103' that extends away from (and not through) a pair of ground pins 5105 extending from the ground plate. FIG. 51A may correspond to "layer 1" in the exemplary variations described above.

Figure 51B:
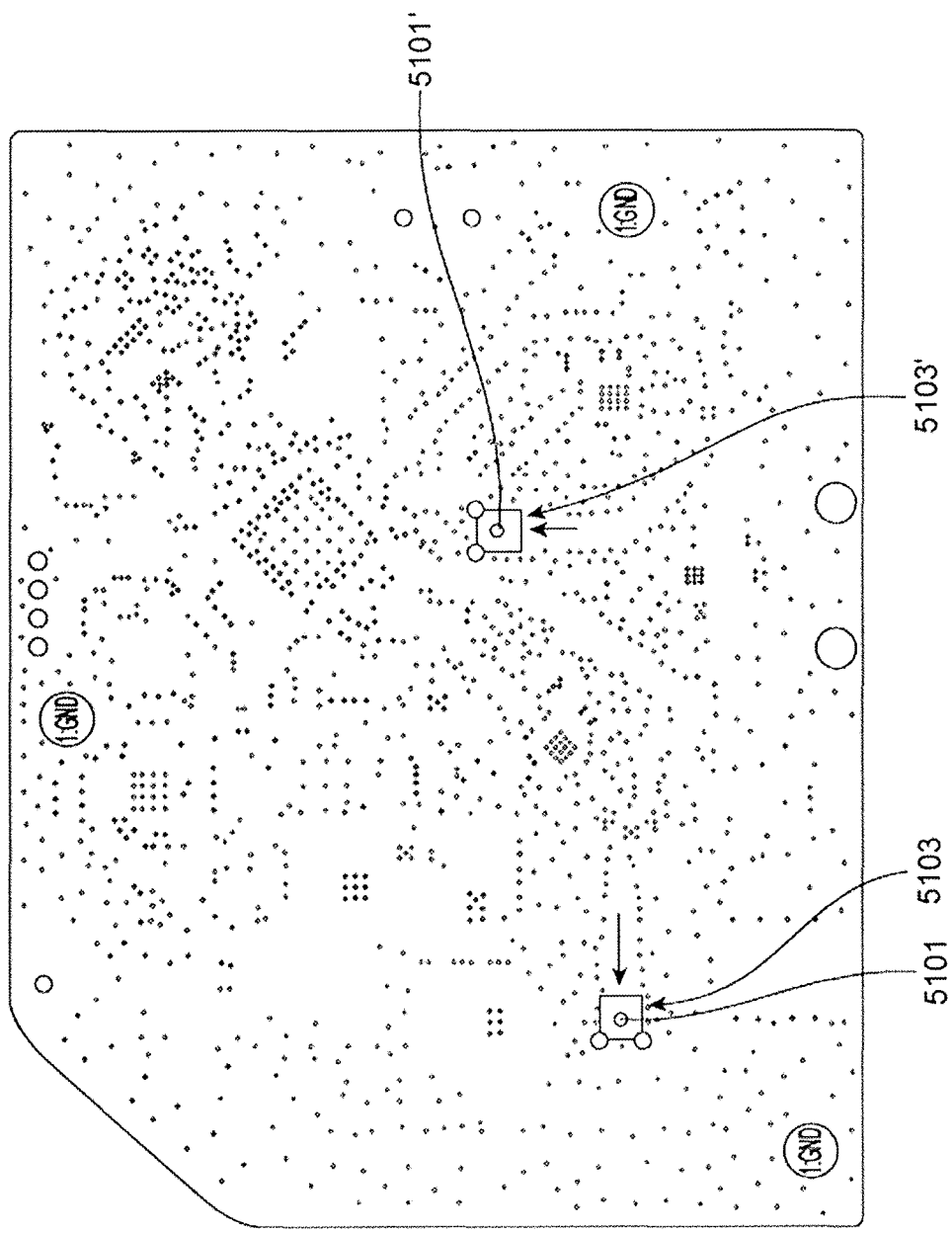
FIGS. 51B and 51C show views of intermediate layers through which the antenna port RF pin passes without making electrical contact. The layers include a clearing region (void) that is rectangular shaped, surrounding the pin.
Figure 51C:
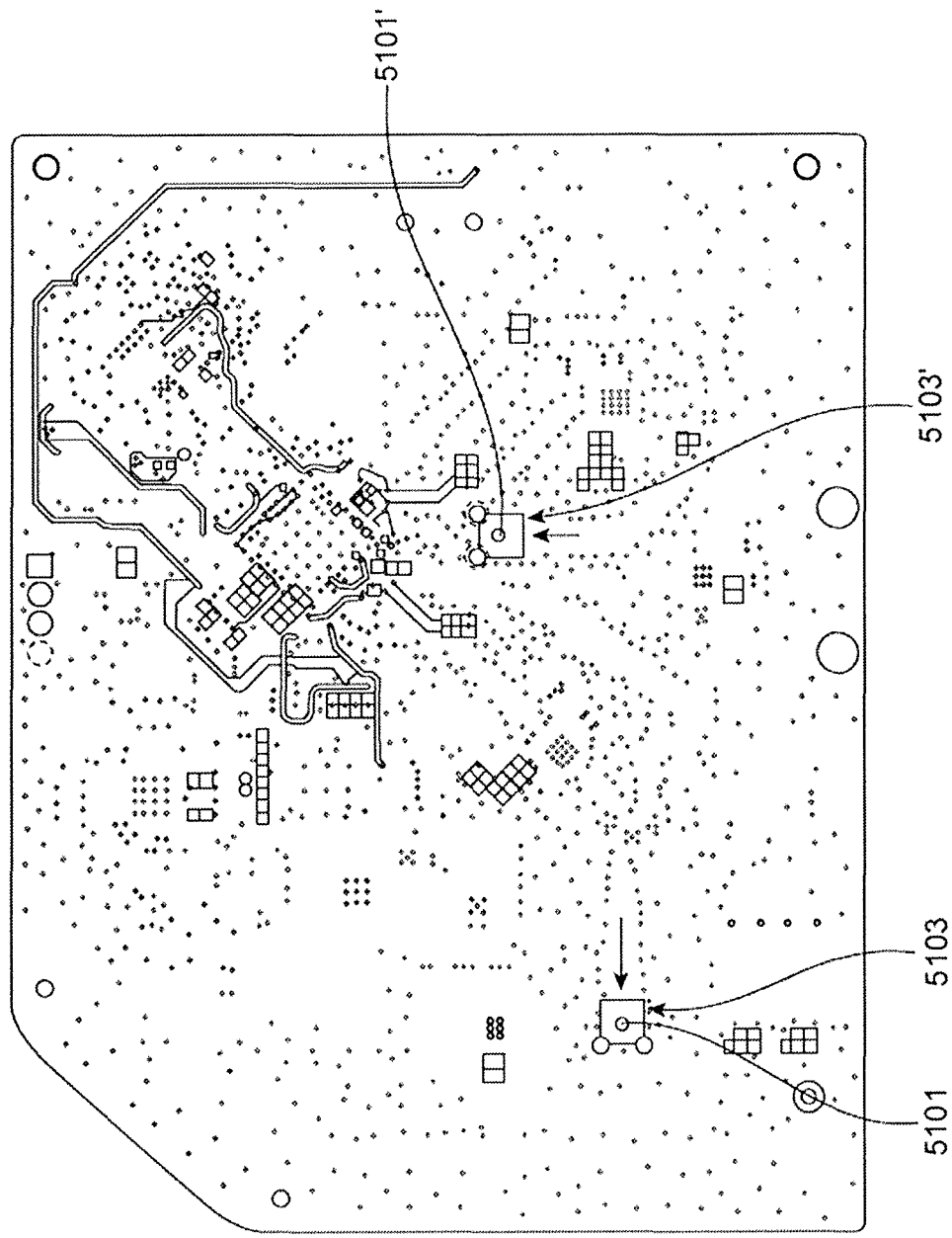

FIG. 51B shows an example of one of the additional layers through which the pin 5101 passes. Much of the surface of the layer includes a conductive material, such as copper, but there is a rectangular clearing region 5109, 5109' around the antenna port RF pins 5101, 5101'. In this example, the space free of conductive material extends approximately 1.91 mm in the y direction (up/down axis relative to FIG. 51B), and approximately 2.14 mm in the x direction (right/left axis relative to FIG. 51B). Thus, the distance from the pin to the copper tracing in this layer is greater than about 1.9 mm on all sides. Similar clearing 5109, 5109' regions are shown in FIG. 51C around the pins 5101, 5101', and these clearing regions are repeated across all of the copper-containing layers to help achieve a coaxial type of structure around the pin.

FIG. 51D shows a combined PCB for a wireless broadband access device that is connected to a ground plate 5111.

Figure 52A:
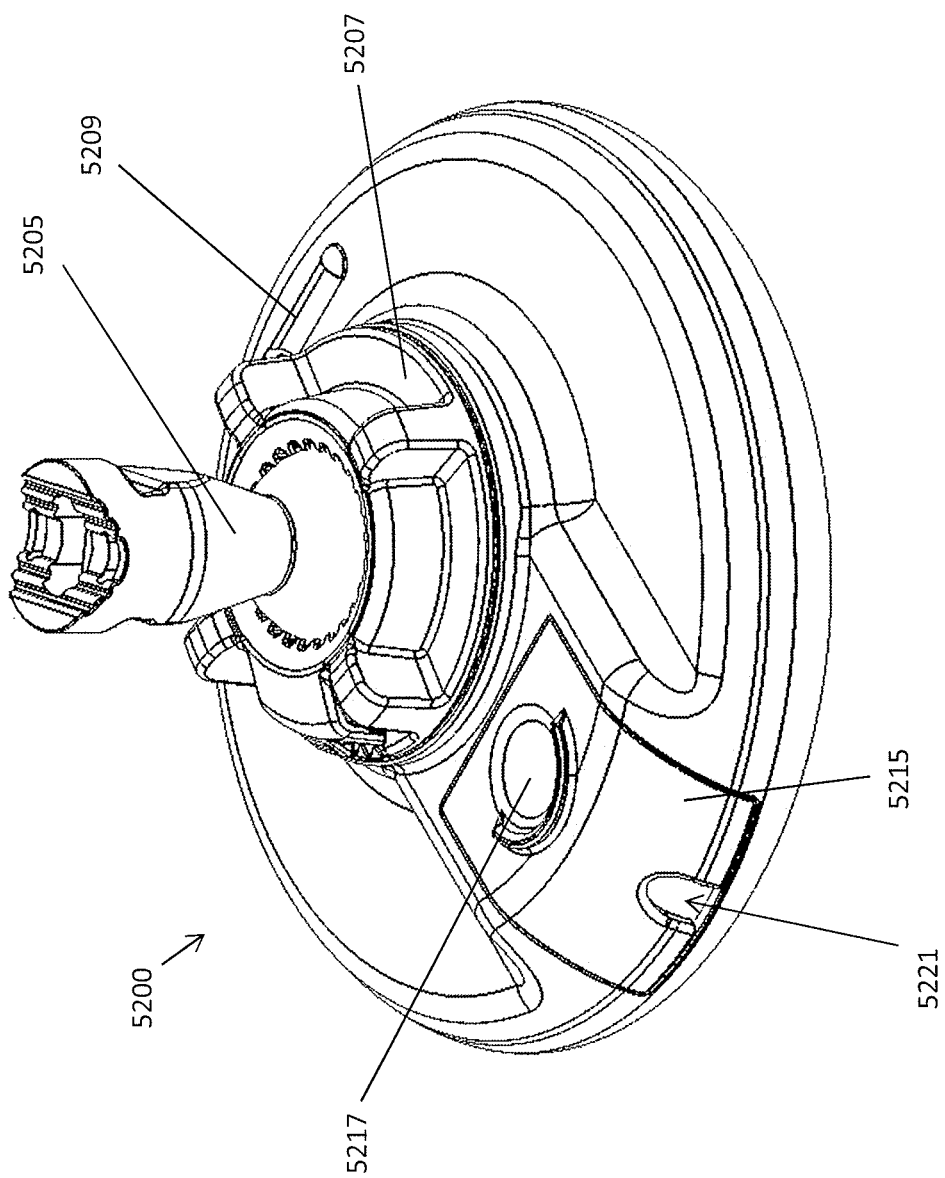
FIG. 52A shows a bottom perspective view of another variation of a wireless transmission station including an integrated bracket mount and bracket having a ball joint.
Figure 52C:
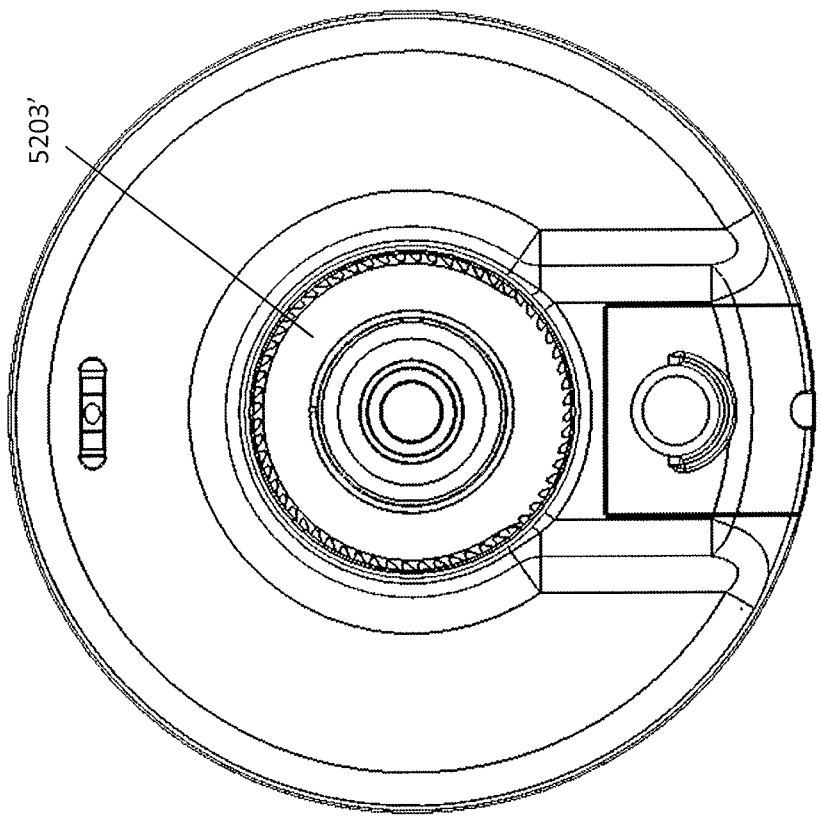
FIGS. 52B and 52C show different variations of wireless transmission stations similar to the variation shown in FIG. 52A.
Figure 52B:
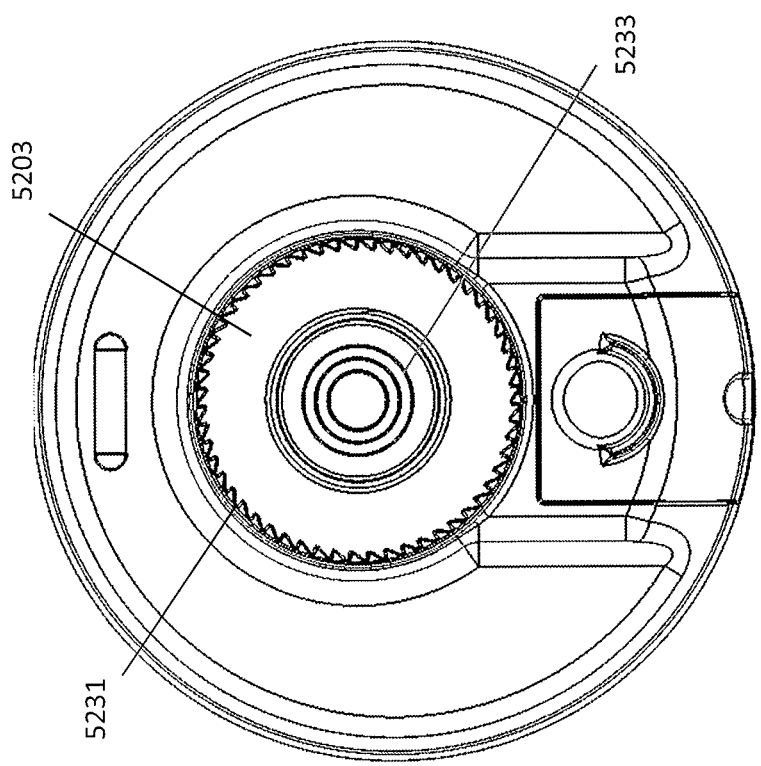

FIGS. 52A-52C illustrate two variations of wireless broadband access devices including a housing that is formed as a flattened disc, and include a bracket mount as part of the back side of the housing. FIG. 52A is a back perspective (elevational) view of a wireless broadband access device 5200 having an integrated bracket mount (not visible in FIG. 52A) configured as a ball socket to receive a ball joint of a bracket 5205. In this example, a ring clamp 5207 is screwed into the bracket mount, and can be finger tightened to hold the mount (the ball joint 5205 of the mount) within the bracket mount with adjustable force. For example, the clamp (ring clamp 5207) can be tightened down relatively loosely to allow the ball joint to be moved by a user manually to adjust the position of the wireless broadband access device, e.g., to align the device with another wireless broadband access device or devices.

As illustrated in the variations described above, the device in FIG. 52A also includes a spirit (bubble) level 5209 on an upper region of the back surface. This bubble level may also be used to help position the device, by indication when the device is level (relative to the bubble). The bubble clamp may be configured to be aligned with a predetermined side of the antenna array within the housing (e.g., in the direction of the horizontal polarization axis or alternatively the vertical polarization axis), which may further help guide positioning. In FIG. 52A, the housing also includes a door 5215 with a finger slider region 5217 that can be used to open the door 5215 exposing an atrial chamber in the housing where a plug-in region (e.g. for a PoE plug and cable) may be connected (not visible in FIG. 52A). An opening 5221 through the door 5215 may allow passage of a cable (power cable and/or PoE cable).

FIG. 52B shows a first variation of a housing for a wireless broadband access device similar to that shown in FIG. 52A. In this variation the integrated bracket mount 5203, which is formed as part of the same process forming the rest of the housing, is visible, as the bracket 5205 shown in FIG. 52A has been removed, as has the clamp 5207, showing the inside of the bracket mount. In FIG. 52B, the bracket mount includes part of a ratcheting mechanism that allows the ring clamp to be selectively tightened down on the back of the housing to secure a ball joint within the ball socket 5203, but prevents loosening (e.g., unscrewing) of the ring clamp and bracket without engaging a release. The release may include a button or other control for disengaging a pawl element (e.g., in the ring clamp) from the teeth of the racketing region 5231 of the housing or the bracket mount portion of the housing.

The inside of the bracket mount, and specifically, the ball socket region of the bracket mount, shown in this example may be specifically adapted for use with a ball socket, to allow the joint to hold the mount stably even under the weight of the wireless broadband access device. For example, the socket-like inner surface(s) of the mount region may be sandblasted or otherwise roughened, to more readily engage with the surface(s) of the ball socket. The ball join surface(s) that engage with the ball socket may also be textured, roughened, or otherwise modified to prevent undesirable slipping.

In FIG. 52B, the inside of the ball socket region 5203 also include a plurality of crush ridges (although on a single crush ridge) may be used. In this example, the crush ridge 5233 is a slight protrusion in the surface of the ball socket region that has a roughly triangular cross-section. A plurality of crush ridges 5233 are shown arranged in concentric circles. In operation he crush ridges help prevent slippage of a bracket within the bracket mount (e.g., the ball joint); once sufficient force is applied by the ring clamp (e.g., by further manually tightening it), the ball joint will permanently crush (deform) the crush ridge, and the deformed surface will mate with any irregularities in the surface of the ball joint, as described below. This interaction may help lock the ball joint and hold the position of the wireless broadband access device. In FIGS. 52A-52B, the position may be held until the control is activated allowing unscrewing of the ring clamp by releasing the pawl from the teeth 5231 of the device.

FIG. 52C illustrates a slightly larger version of the wireless broadband access device such as the ones shown in FIGS. 52A and 52B. The bracket mount region 5203' is virtually identical between the two regions, allowing the same ring clamp (5207, e.g., as shown in FIG. 52A) to be used with these different sized devices. In some variations the smaller device as shown in FIGS. 52A and 52B houses a small variation of the array antenna (e.g., a 2×2 antenna having four emitting elements). The larger size device shown in FIG. 52C may be used to house a larger array antenna, including a 3×3 or 9 emitting element variation described above. In the variation shown in FIG. 52C, the overall housing is larger, but the essential features are nearly identical; in FIG. 52C, the mount region is centered, whereas in FIG. 52B the mount region is off-centered.

Figure 53A:
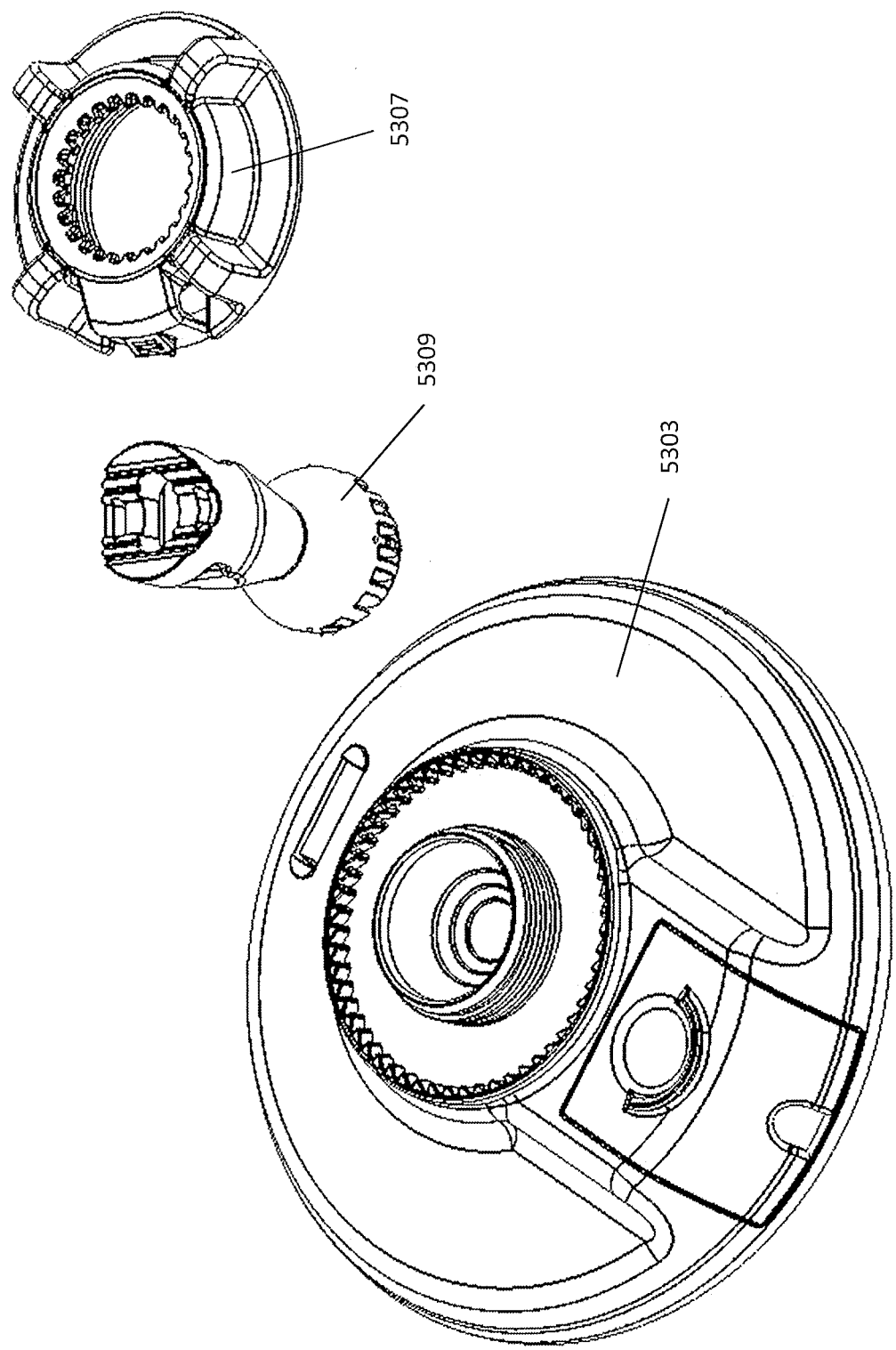
FIGS. 53A and 53B show partially exploded views of the wireless transmission station of FIG. 52B, separately illustrating the housing, bracket (with ball joint) and clamp (ring mount or ring clamp).
Figure 53B:
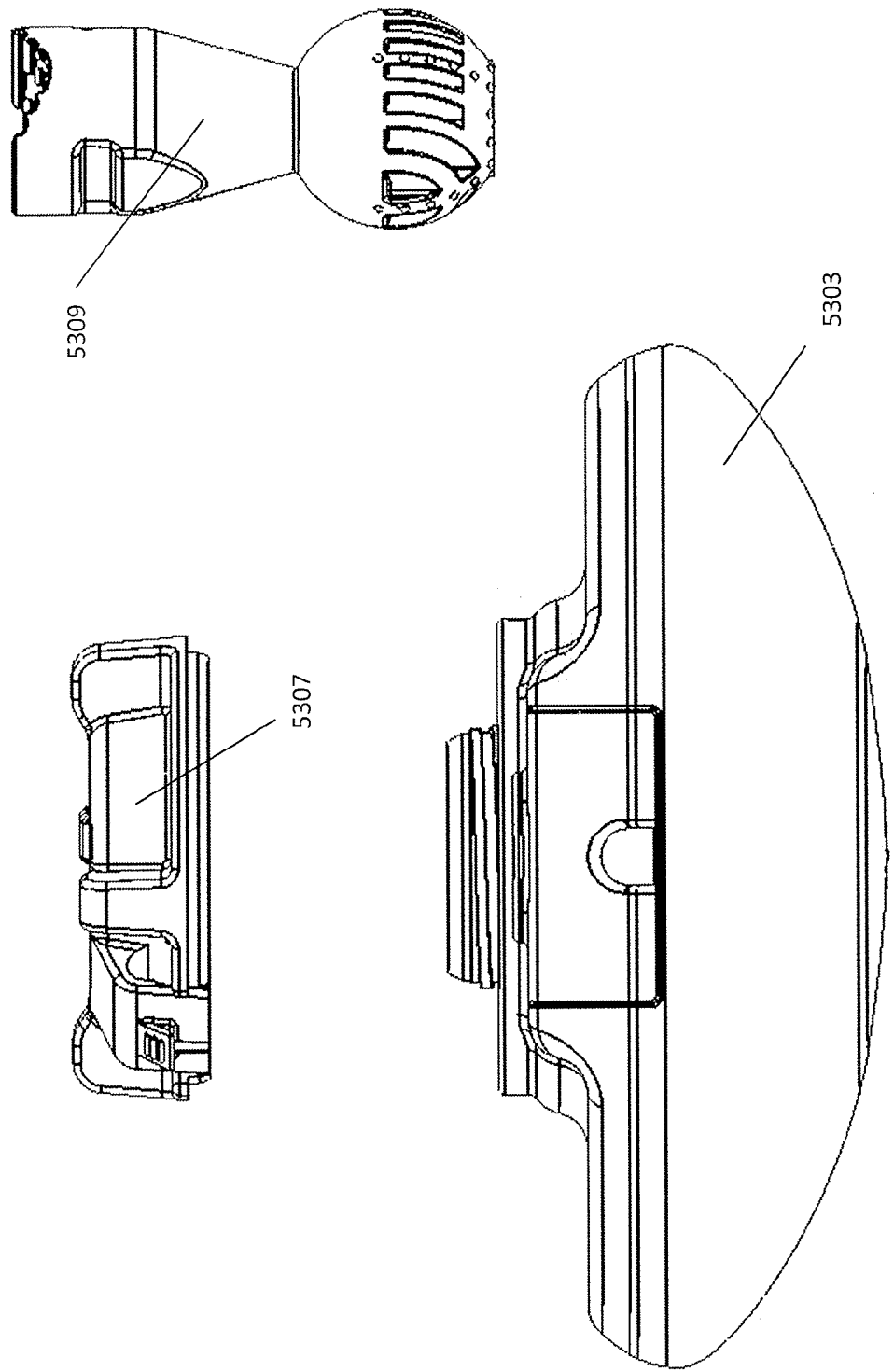

53A-53B show exploded views of a wireless broadband access device such as the one shown in FIGS. 52A and 52B. In this example, the housing 5303 for the apparatus is shown with the ring clamp 5307 and ball joint portion 5309 separated, showing the relationship for these elements. FIG. 53B shows the same piece of FIG. 53A from a side view.

Figure 54C:
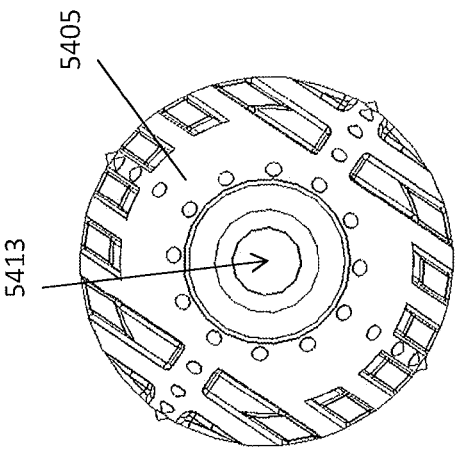
FIGS. 54A-54C illustrate side, top perspective and bottom views, respectively, of one variation of a bracket having a ball joint similar to the bracket shown in FIGS. 53A-53B.
Figure 54B:
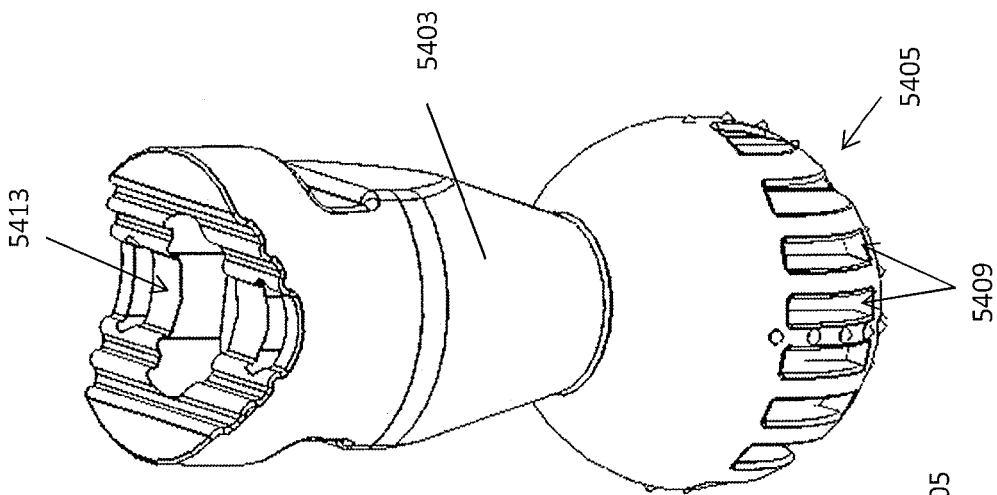
Figure 54A:
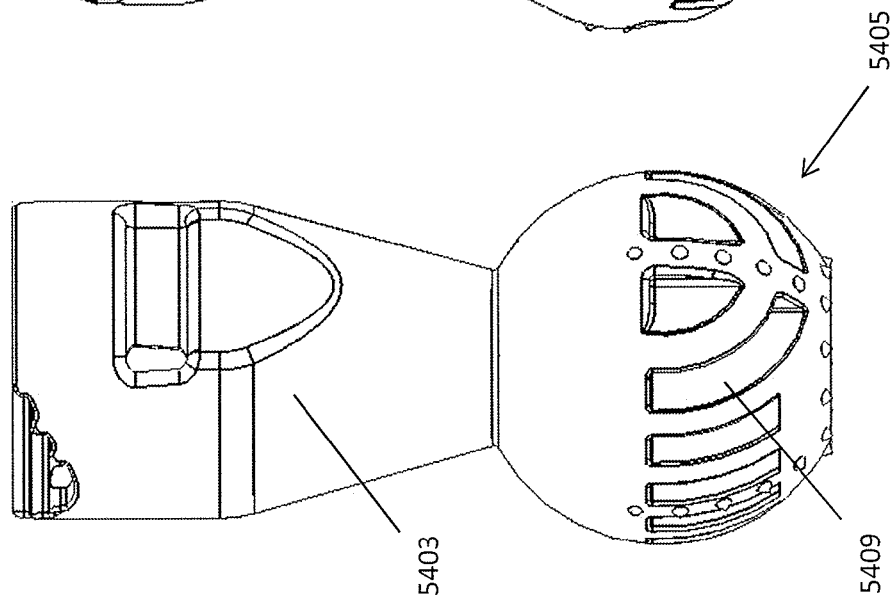

An example of a mount, including the ball joint portion, that may be used to hold the device, and/or to irrevocably crush the crush ring(s), is shown in more detail in FIGS. 54A-54C. In this example, the bracket 5400 includes a ball joint 5405 at the distal end. The ball joint has a generally ball-shaped region and may include one or more features allowing better interaction in the ball socket. For example, the surface of the ball joint maybe relatively high-friction against the surface of the ball socket; the surface of the ball joint may be roughened, or may include cut-out region 5409. In some variations the surface has been at least partially abraded (e.g., sandblasted) in order to remove some or all of the smoothness.

The bracket may also include an elongate body extending to an opposite end from the ball joint; this "proximal" end of the bracket may be adapted to connect to a wall, pole, stand, or the like. For example, in FIG. 54B, the bracket is shown as having a central axis 5413 that is open, allowing a nail, screw, or other fastener to be passed through it and attached to a surface (such as a wall). This central axis may be adapted (e.g., threaded, may include regions of different diameter, etc.) to facilitate attaching to a surface using a single screw or nail. The proximal end may also include a curved and/or radiused region to enhance attachment to pole or post.

Figure 55A:
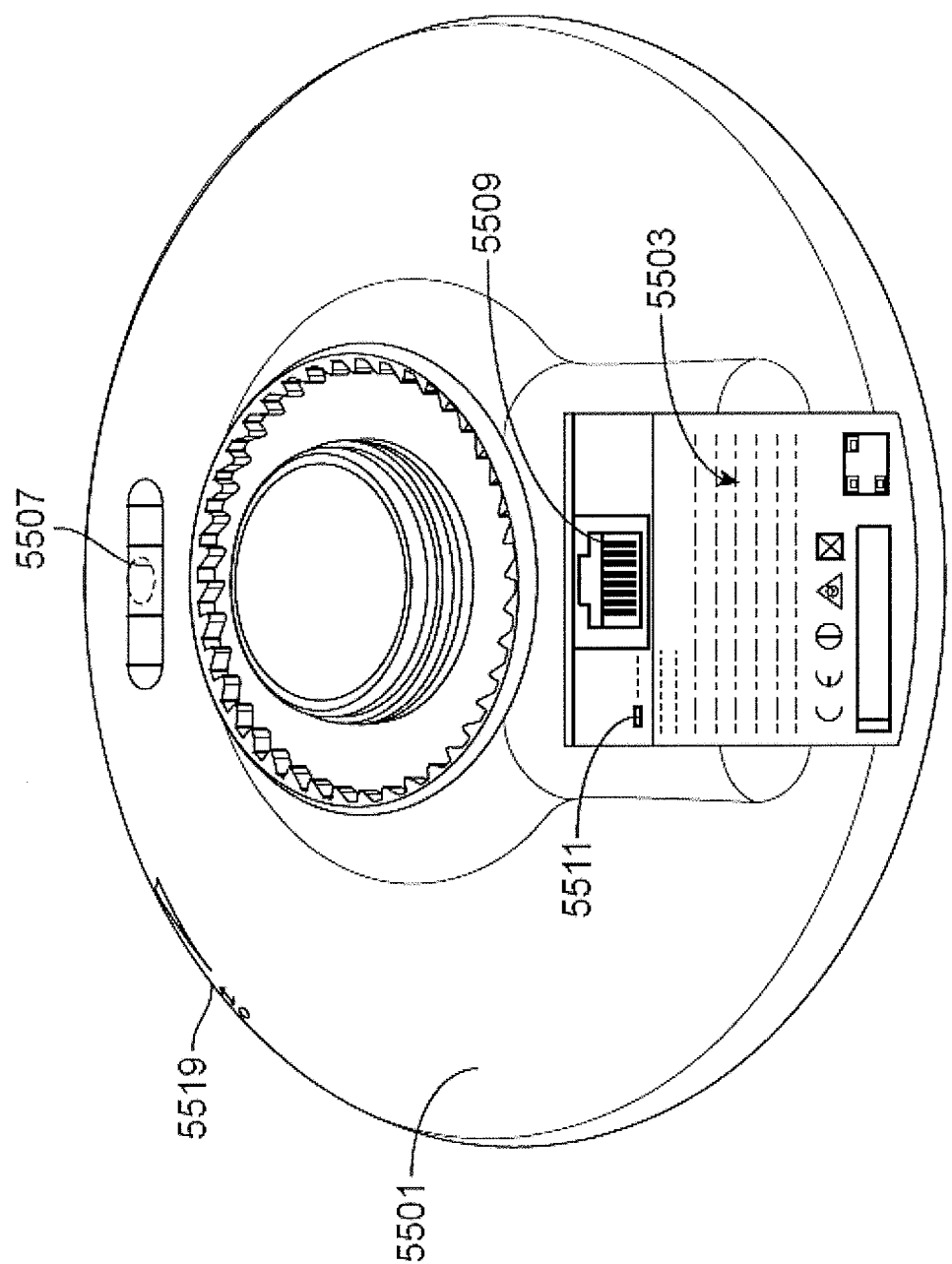
FIG. 55A shows a back perspective view of one variation of a housing of a wireless transmission station in which a door covering an atrium region has been removed.

Another variation of a back of housing is shown in FIG. 55A. In this example, the door covering the atrium region 5503 has been removed, exposing the port or plug-in region (e.g., Ethernet port 5509. One or more additional controls (e.g. reset button 5511) may also be included within this atrium region 5503, as well as markings indicating specific information about the wireless broadband access device. In FIG. 55A, the back surface also includes the bubble level 5507 mentioned above.

Figure 55B:
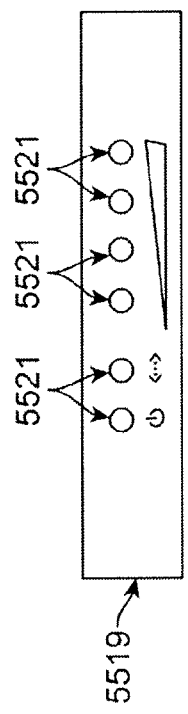
FIG. 55B shows an enlarged view of an indicator region on the side of the housing shown in FIG. 55A, illustrating power, Ethernet connectivity and signal level.

The wireless broadband access devices may also include a set of indicators (e.g., indicator lights or LEDS) 5519 on and/or visible through the housing 5501. In the variation shown in FIG. 55A, the LEDS may be held within the housing 5501 and may shine through the housing 5501; the housing may be thinner in the region of the optical indicator (LEDs 5519) so that they are more specifically and readily visible through the translucent or partly-translucent housing 5501. FIG. 55B shows an enlarged image of the outside of the a housing in which optical indicators are visible through the housing because the housing has been made thinner in the regions where it is desired that they should be visible through the housing 5521. Markings on or near these regions may indicate the meaning of these optical indicators. Example of indicators that may be used include power (e.g., illuminated when the device is connected to a power source), Ethernet connection (e.g., illuminated when an active Ethernet connection is made and/or flash when there is activity), signal indicators (which may indicate signal strengths). For example, a signal indicator may be a plurality of lights that indicate increasing strength of the signal based on strength threshold values for each indicator (e.g., LED); e.g., a first indicator may be illuminated when the wireless signal strength is above −94 dBm, a second indicator may be illuminated when the wireless signal strength is above −80 dBm, a third indicator may be illuminated when the wireless signal strength is above −73 dBm, and a fourth indicator may be illuminated when the wireless signal strength is above −65 dBm.

Figure 56B:
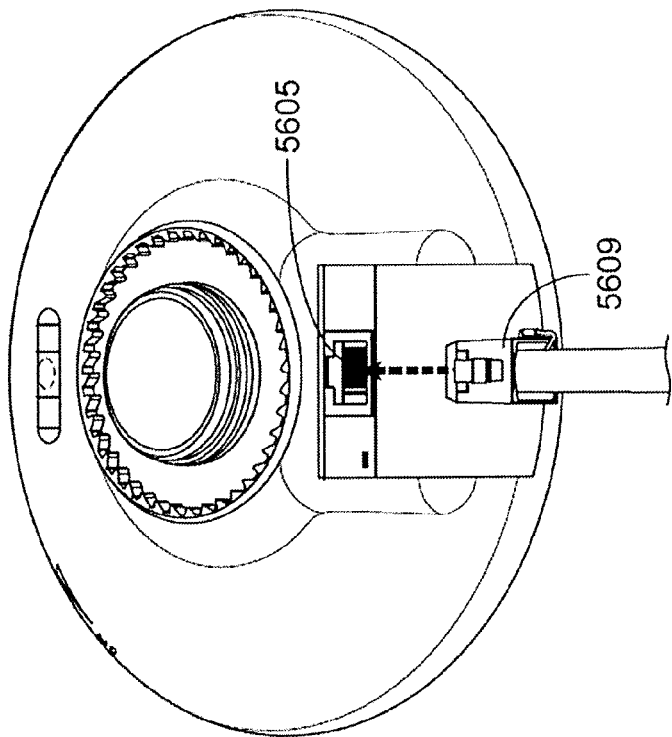
FIGS. 56A-56F illustrate one method of attaching and/or positioning one variation of a wireless transmission station.
Figure 56A:
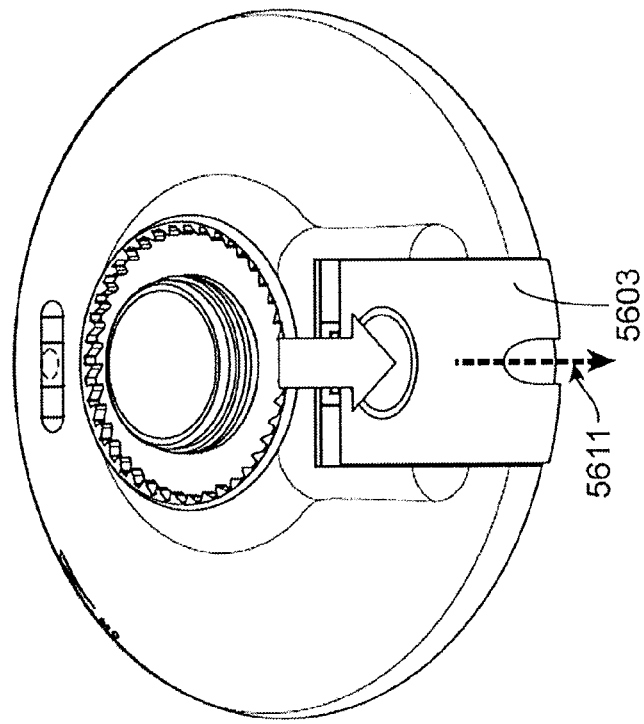
Figure 56D:
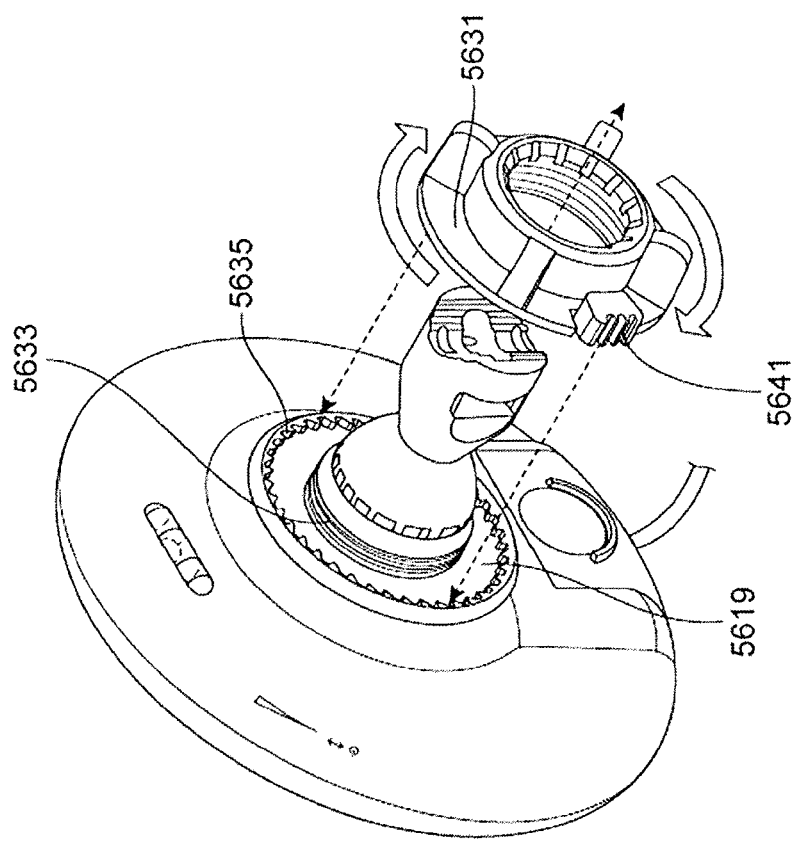
Figure 56C:
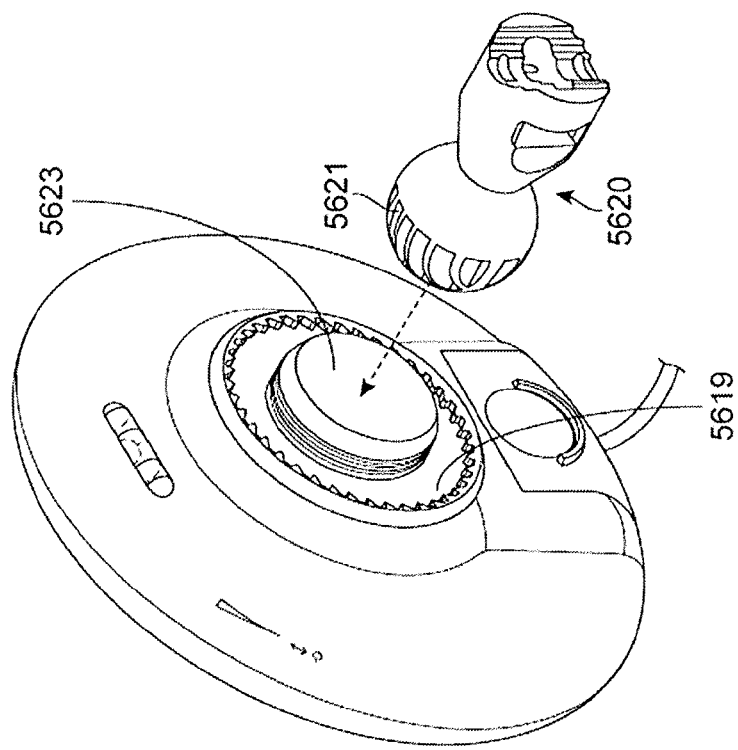
Figure 56F:
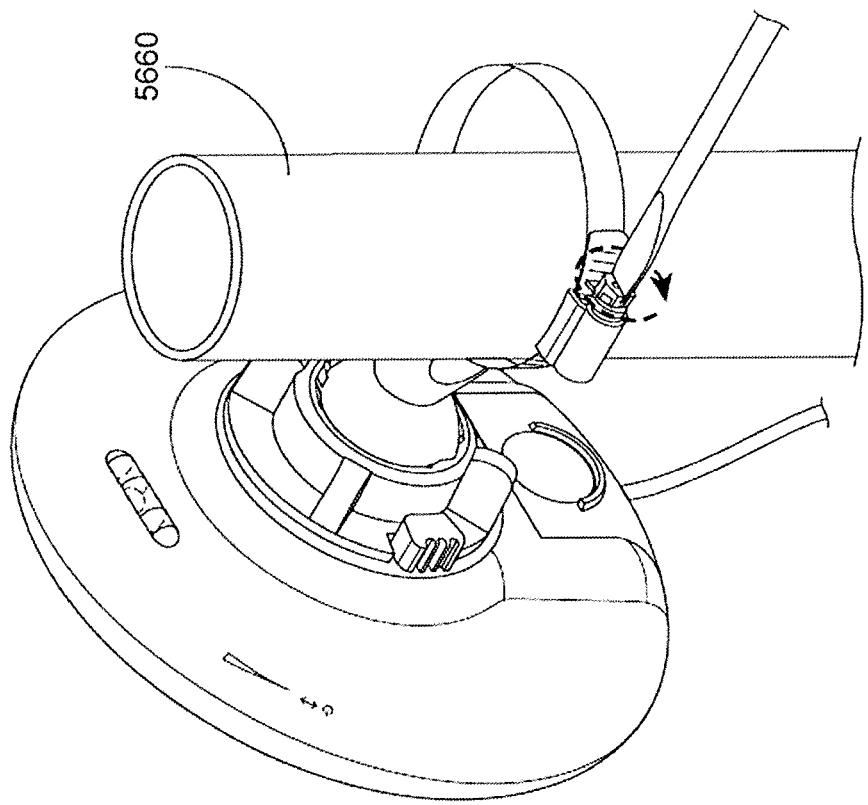
Figure 56E:
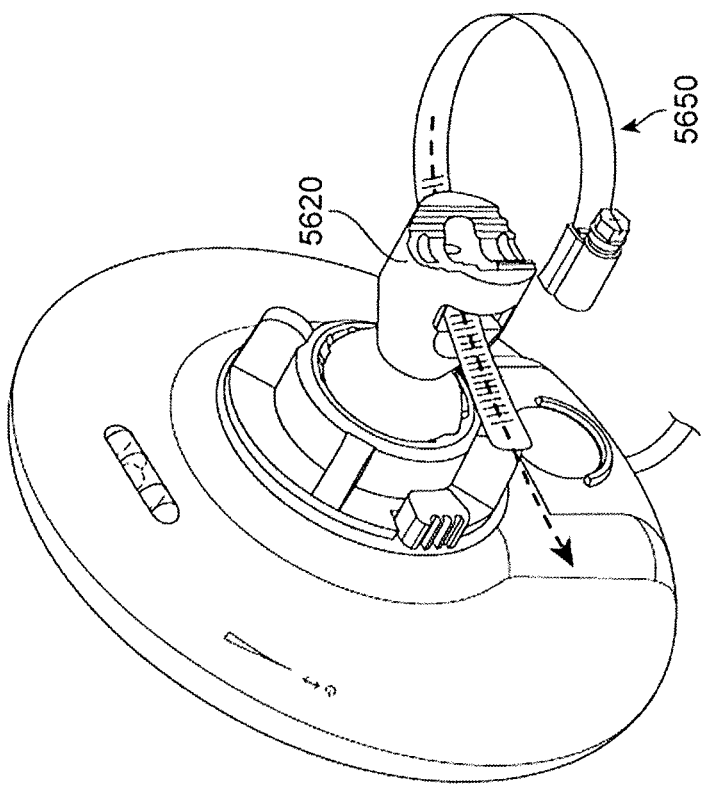
Figures 57A, 57B:
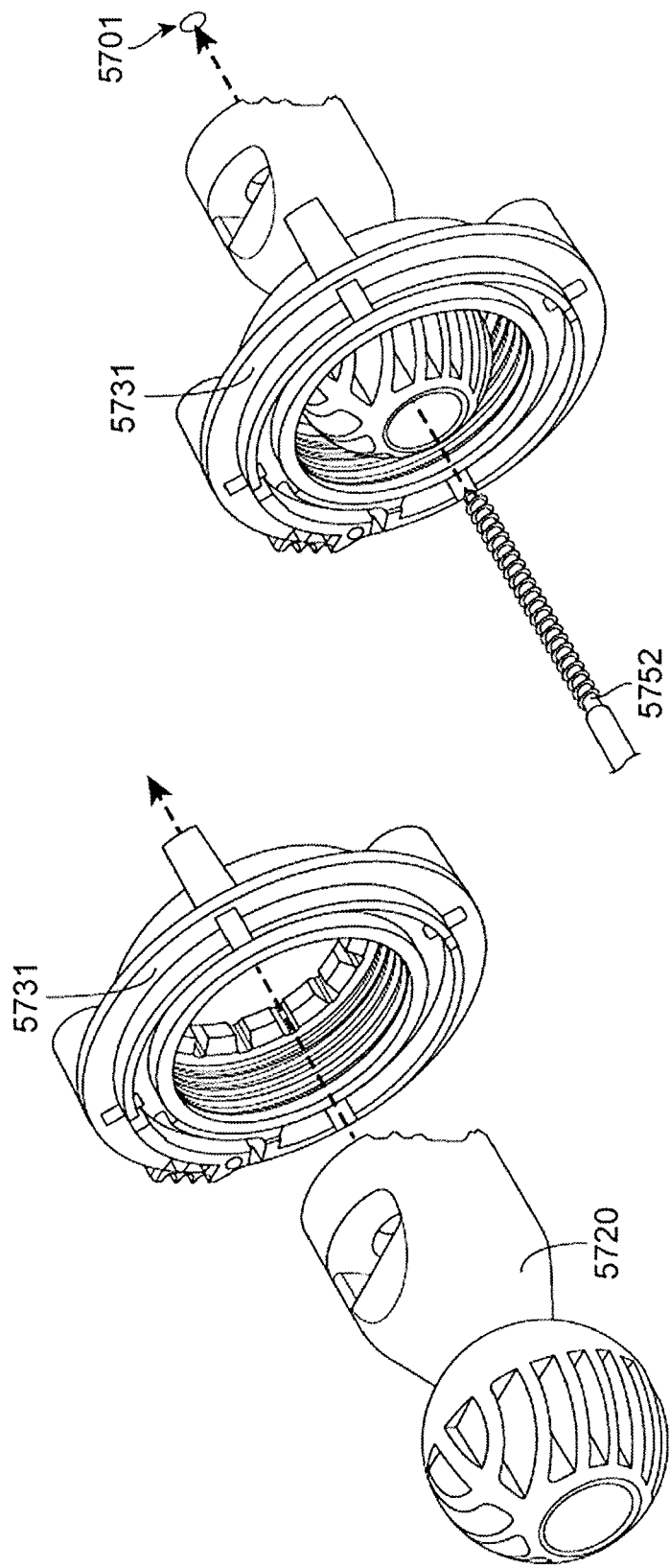
FIGS. 57A-57C illustrate another variation of a method of attaching and/or positioning one variation of a wireless transmission station.
Figure 57C:
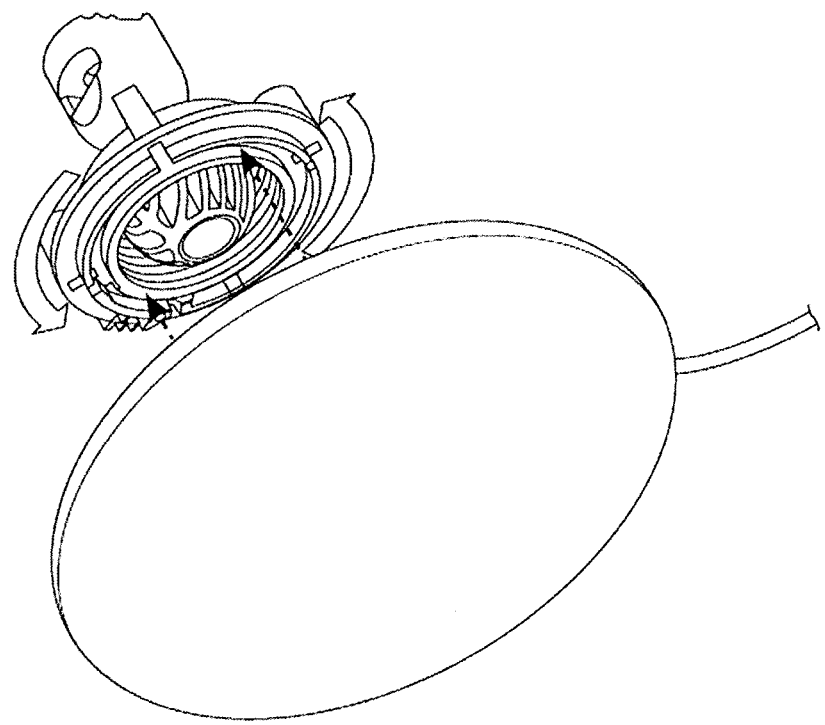

FIGS. 56A-56F and 57A-57C illustrate methods of connecting and/or positioning a wireless broadband access device. For example, a wireless broadband access device can be mounted on a pole or to a wall. In some variations additional attachment elements, such as screws, straps, etc., may be used. For example, a metal Strap may be used for pole-mounting with the variation illustrated in FIGS. 56A-56F; for wall-mounting, a suitable fastener such as a screw or bolt may be used, as illustrated in FIGS. 57A-57C. In any of these variations, a shielded category 5 (or above) cabling should may be used for wired Ethernet connections and can be grounded through an AC ground, for example of a PoE connection.

In FIGS. 56A-56F, an Ethernet connection (cable) may be attached to a port in the device. In. FIG. 56A, a door 5603 is slid downward (arrows) to open the atrium region enclosing an Ethernet port 5605. In FIG. 56A, the door is adapted so that it may be slid open and removed using a finger contact region 5613; it may be reattached by reversing these steps. The connection/cabling may be attached to the device performed before connecting the device to a bracket, as shown in FIGS. 56A-56B, or it may be done after attaching to a bracket and/or mounting. In FIG. 56B, the cable with a connector 5609 is connected to the port 5605. Once the cable is connected, the door may be reattached (e.g., by sliding back into position), and the cable/cord may exit an opening 5611 from the atrial region in the door and/or housing.

The wireless broadband access device may be connected, via an integrated bracket mount 5619, to a mount. In FIGS. 56C and 56D a bracket as described above may be coupled to the bracket mount by placing the ball joint 5621 of the bracket into the ball socket 5623 of the bracket mount 5619. In general, a ball joint 5621 may refer to the ball-shaped distal end of the bracket 5620. In FIGS. 56C and 56D, the ball joint 5621 of the bracket is held in the ball socket 5623 of the mount 5619 by a ring clamp 5631 that may be screwed into the housing (e.g., into the mount portion of the housing) and may form a ratcheting connection with the ring clamp. As shown in FIG. 56D, the ring clamp 5631 screws onto screw threads 5633 on the bracket mount 5619. The bracket mount also includes gearing teeth 5635 that engage a pawl structure on the ring mount (not visible in FIG. 56D), which prevents the ring mount from unscrewing (counterclockwise) to loosen the ring mount, and thereby loosen the ball joint/bracket relative to the device housing. The ring mount includes a control (button 5641) that can displace the pawl and allow the ring mount to be loosened or removed. The ring mount may be attached over the proximal end of the bracket so that the ball joint is held between the ring mount and the ball socket of the bracket mount.

In FIGS. 56C and 56D the ball socket may also include one or more crushable, deformable, ridges (not visible in FIGS. 56C and 56D) that can be deformed when the force applied by the ring mount, due to hand twisting the ring mount exceeds some threshold. This deformation may help lock the relative positions of the bracket and mount.

Once the lock ring (clamp ring 5641 is placed over the bracket and rotated (e.g., clockwise) as shown in FIG. 56D, it may be tightened but left loose enough to allow pivoting of the device so that it can be aimed. As shown in FIGS. 56E and 56F, the device may then be mounted, e.g. to a pole. In FIG. 56E a strap (e.g., metal strap) 5650 is fed through the base, or proximal end, of the bracket 5620. The strap may then be tightened around a post or pole 5660, as shown in FIG. 56F. In FIG. 56F a tool (e.g., screwdriver) is used to tighten the strap to the pole 5660.

FIGS. 57A-57C illustrate another method of securing the apparatus, including mounting the apparatus to a wall. The bracket 5720 is mounted directly to a surface such as a wall (e.g., stud or other structurally stable region). In this variation, a hole or pilot hole 5702, may be first formed into the surface. In FIG. 57A the clamp (lock ring 5731) is then placed over the bracket 5720, with threads of the clamp to engage the bracket mount facing the ball joint. A screw 5752 can then be passed through a passage in the center of the long axis of the bracket, though the ball joint, as shown in FIG. 57B. The screw 5752 can then be fastened into the wall (using a pilot hole 5701) as shown, to securely attach the bracket to the surface of the wall.

Thereafter, as illustrated in FIG. 57C, the housing of the wireless broadband access device may be coupled to the bracket by screwing the clamp into the housing (e.g., the bracket mount) and tightening it sufficiently (e.g. by turning it clockwise when facing the back of the device) far so that the position of the housing and antenna can be adjusted, e.g., by pivoting around the ball joint, but sufficiently tight to hold it to the surface.

Figure 58:
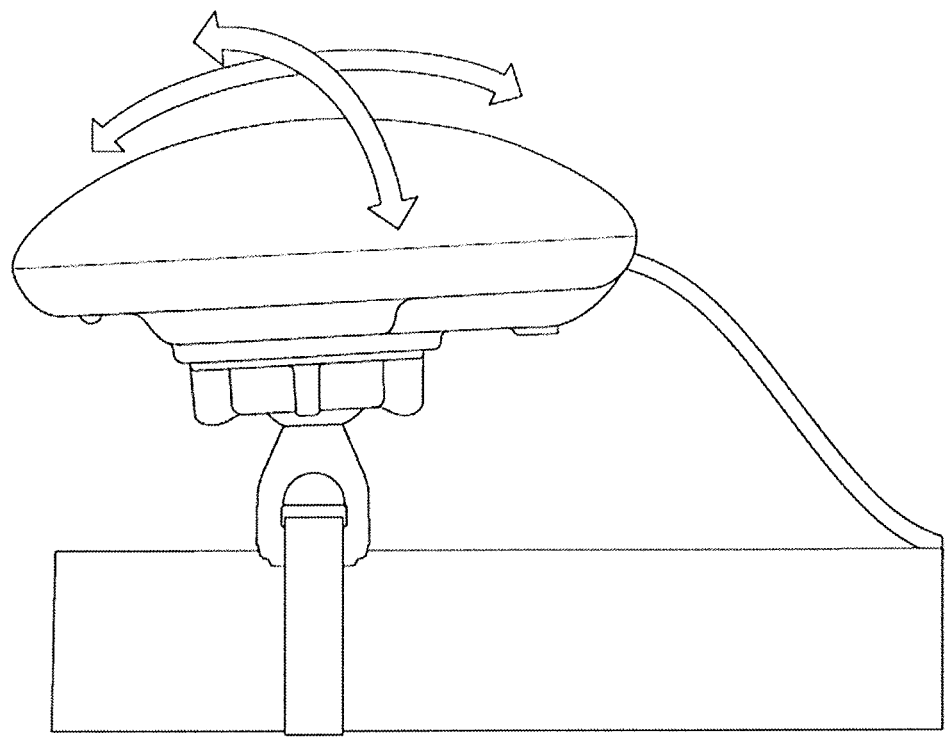
FIG. 58 illustrates adjusting and/or aiming a wireless transmission station mounted to pole or post.

FIG. 58 shows the device mounted to a pole, illustrating adjustment of the position of the housing and antenna relative to the pole. The antenna and housing may be positioned by aiming towards the other end of the wireless link, e.g., at another wireless broadband access device, or at another broadband target (sending/receiver, etc.). The cable may be left extending toward the ground. Because of the ball joint, the antenna and housing may be rotated, tilted, or moved side-to-side, as illustrated in FIG. 58 (arrows). A spirit level (bubble level) on the top of the back of the housing may indicate "level" relative to the top of the antenna within the housing, e.g., an array antenna as described above, and this level may be helpful in positioning and aiming the device. Once the position has been determined, the housing maybe locked into position by further hand tightening the clamp (lock ring). As discussed above, hand tightening the clamp may permanently deform (crush) one or more crush ridges within the ball socket (and/or on the ball joint in some variations). The crush ridge material may engage the surface of the ball joint (or in variations having the ball joint with a crush ridge, the surface of the ball socket) to further lock the device in position. Although the clamp on the apparatus may be loosened (e.g., by releasing the pawl and unscrewing the clamp), the crush rib may be permanently deformed, and may also help guide re-aiming the device to the same basic position if it is later moved.

Any of the devices described herein may be connected directly to a power source (to power the antenna and/or radio) or they may be connected via a power over Ethernet (PoE) connection. For example, the opposite end of an Ethernet cable connected to the apparatus as illustrated above may be connected to a PoE adapter, and the PoE adapter connected to the adapter along with power to provide access to a network such as a LAN (local area network).

The wireless broadband access apparatuses described herein direct RF energy in a relatively tight beam width, which may be particularly helpful in areas crowded with other RF signals. The radio is integrated with the antenna, eliminating the need for a separate cable connection between the two, reducing or eliminating cable losses and improving performance. Thus, the apparatuses illustrated above are all-in-one combined radio and antenna devices, in which both the radio and antenna are housed within a compact housing having an efficient footprint, and provides a relatively small footprint for a relatively large gain.

In operation, the wireless broadband access apparatuses described herein may be small (e.g., around 140×140×54 mm or 180×180×54 mm, including the mount), and lightweight (e.g., around 320 g). The device may be configured to operate in any frequency range desired, as described above. For example, between about 5170-5875 MHz, e.g., between about 5725-5850 MHz, 5250-5850 MHz, etc. The gain may be between about 20 and about 15 dBi (e.g., 16 dBi, 19 dBi, etc.). In some variations, the device is adapted for use with a network interface having a 10/100/1000 Ethernet port. The maximum power consumption may be limited, e.g., to 7 W (6.5 W, 6 W, 5.5 W, 5 W, etc.).

Figure 59:
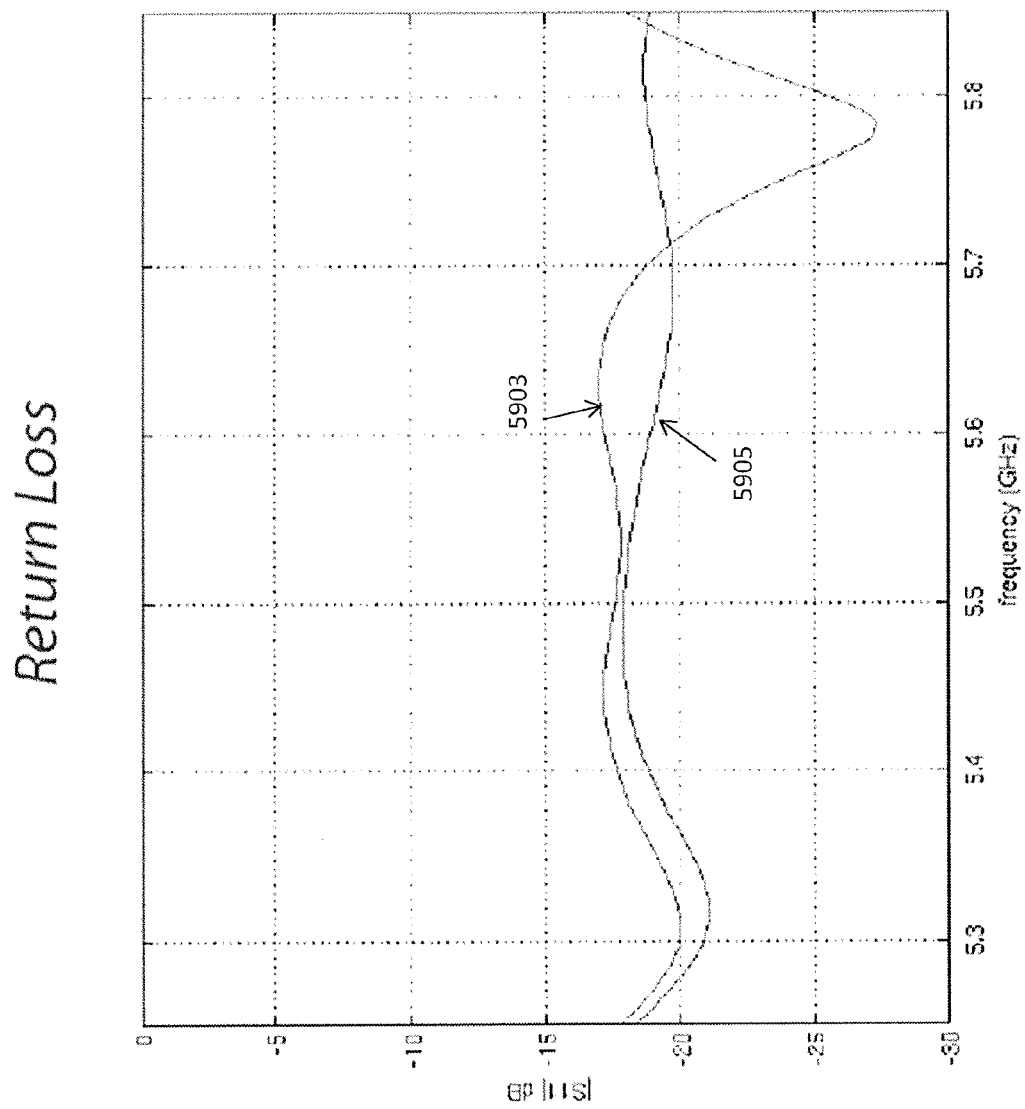
FIG. 59 shows a return loss plot for one variation of a wireless transmission station.
Figure 60B:
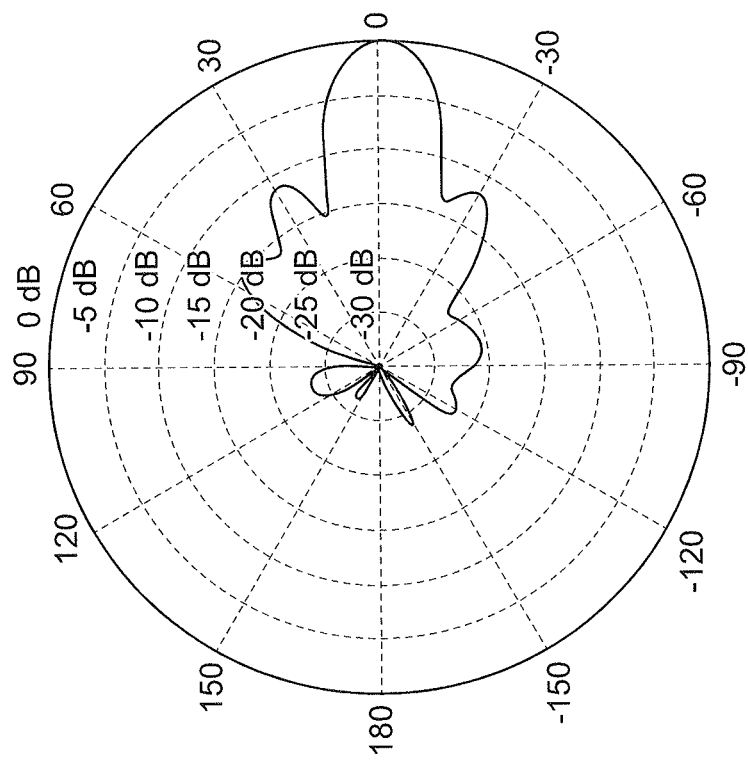
FIGS. 60A-60D illustrate antenna patterns (radiation patterns) for the wireless transmission station of FIG. 59 which includes both vertical and horizontal polarization components.
Figure 60A:
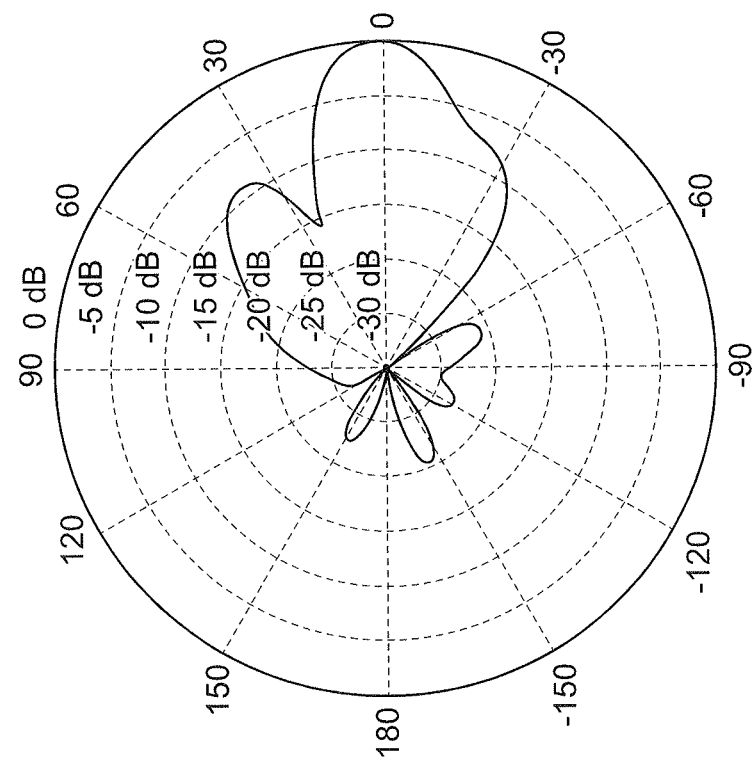
Figure 60D:
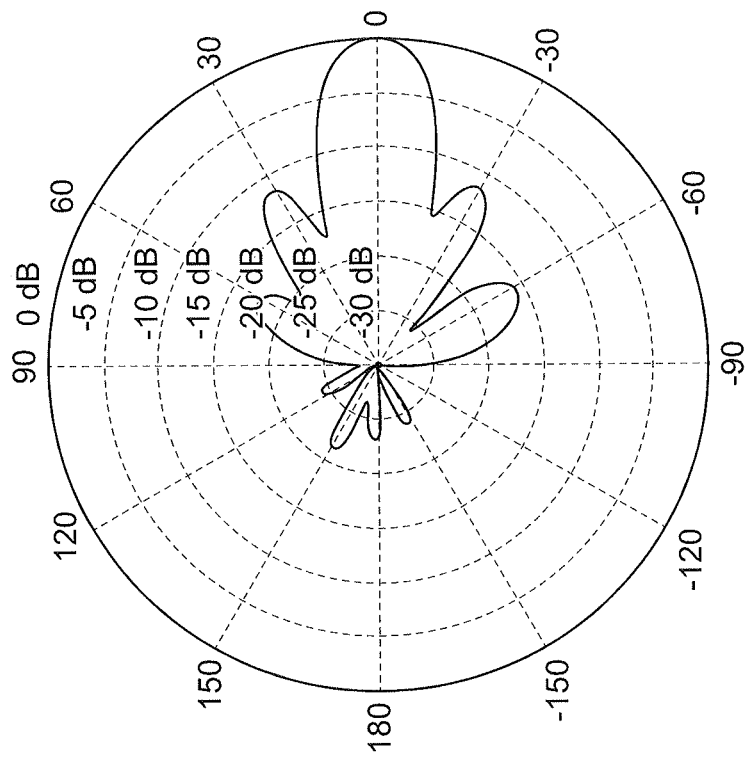
Figure 60C:
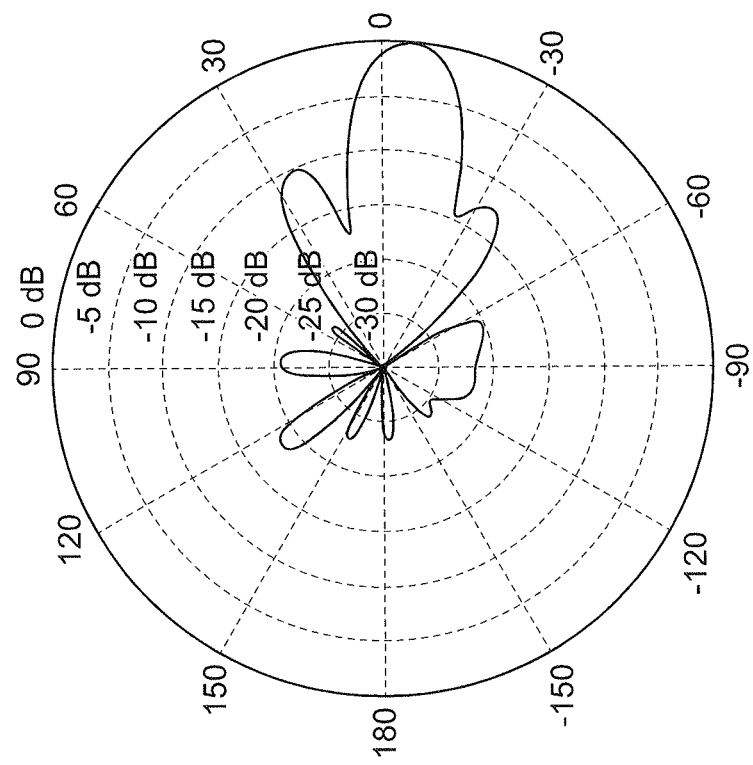

FIGS. 59-62D illustrate exemplary antenna characteristics for several of the devices described above. FIG. 59 shows a return loss curve for one exemplary variation of a wireless broadband access device (combined radio and antenna) having an array of nine closely packed antenna emitting elements arranged in a plane above the feeds, e.g., antenna feeds, connecting the emitting antenna emitters. The return loss generally refers to the loss of signal power resulting from the reflection (e.g., caused by a discontinuity), expressed as a ratio in decibels (dB). In FIG. 59, the return loss across different frequencies (between 5.25 and 5.85) is shown for both the vertical 5903 and horizontal 5905 polarization. FIGS. 60A and 60B illustrate the vertical azimuth and elevation in polar plots of the antenna pattern (radiation patterns) for the vertical polarization while FIGS. 60C and 60D show similar plots for the horizontal polarization of the same apparatus described in FIG. 59.

Figure 61:
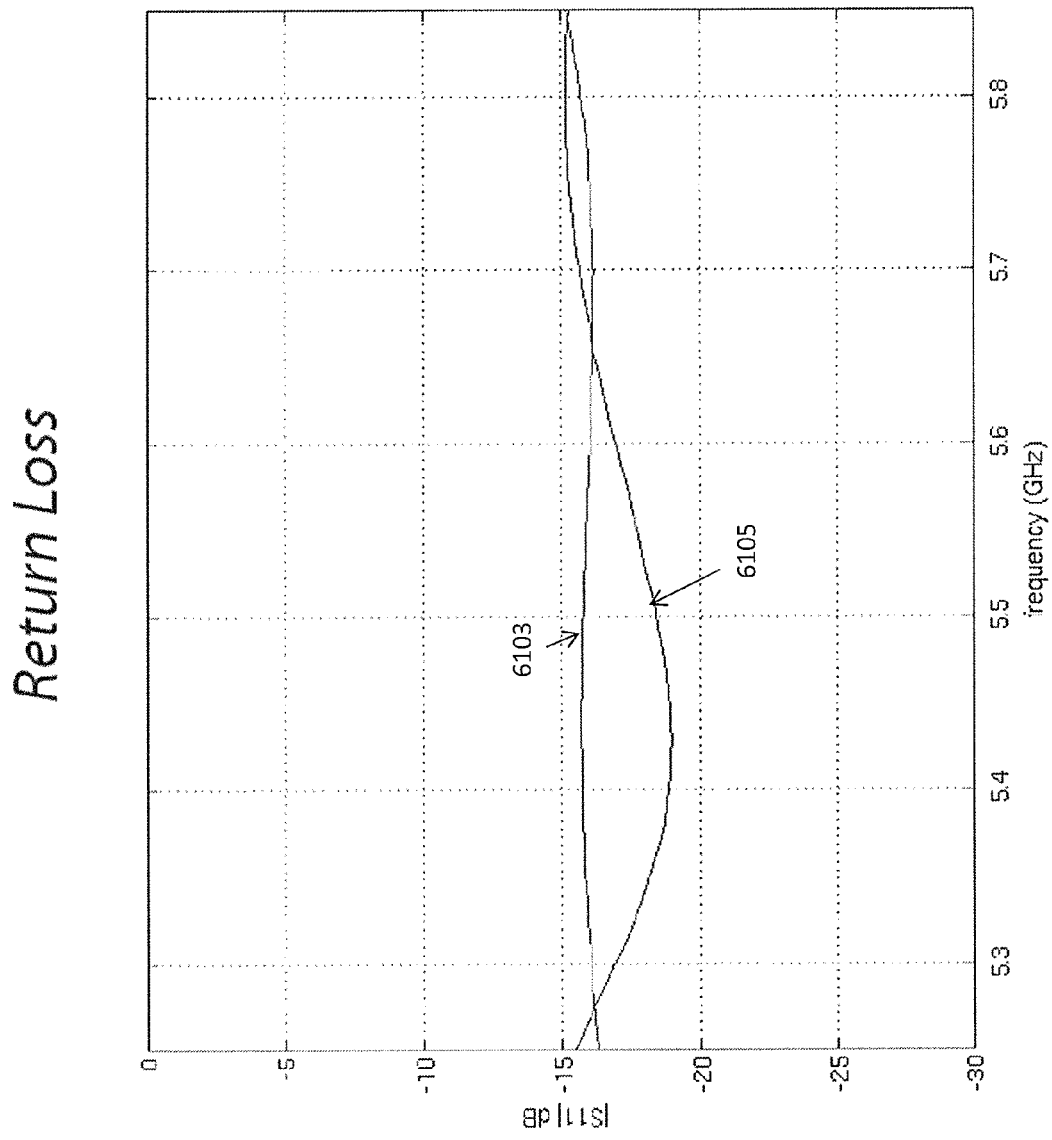
FIG. 61 is a return loss plot for another variation of a wireless transmission station.
Figure 62B:
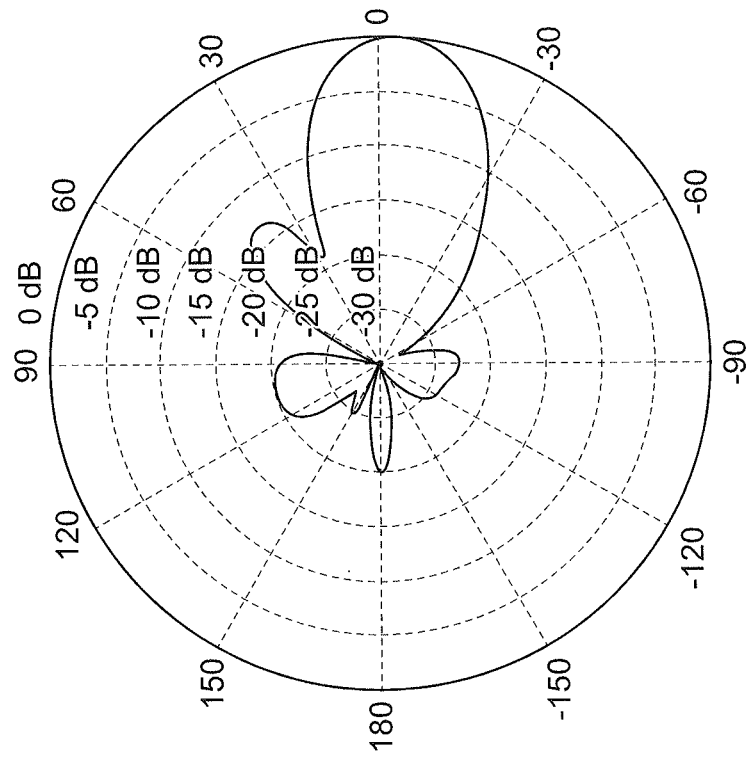
FIGS. 62A-62D are antenna patterns (radiation patterns) for the wireless transmission station of FIG. 61 which includes both vertical and horizontal polarization components.
Figure 62A:
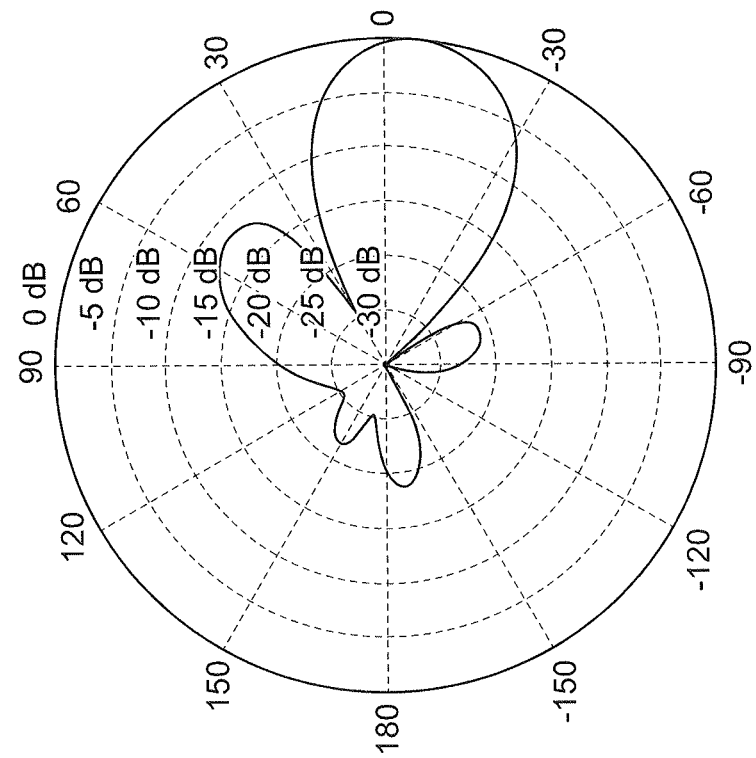
Figure 62D:
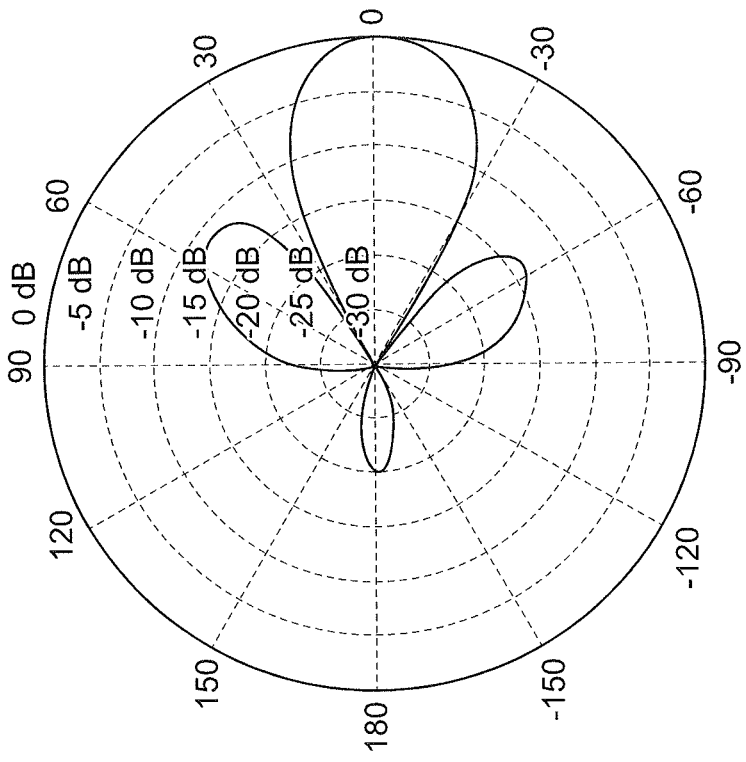
Figure 62C:
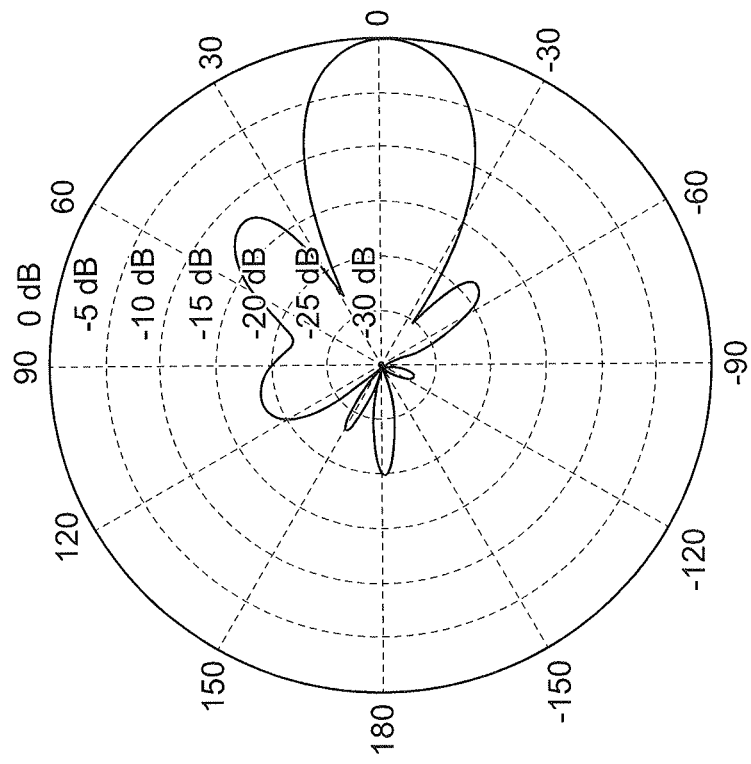

FIG. 61 shows an example of a return loss curve for another example of a variation of a wireless broadband access device (combined radio and antenna); this example has an array of four closely packed antenna emitting elements arranged in a plane above the feeds, e.g., antenna feeds, connecting the emitting antenna emitters. FIG. 61 shows both vertical 6103 and horizontal 6105 polarizations. FIGS. 62A and 62B show polar graphs of the antenna patterns for the vertical azimuth (FIG. 62A), vertical elevation (FIG. 62B), horizontal azimuth (FIG. 62C) and horizontal elevation (FIG. 62D), of the same apparatus described in FIG. 61.

As discussed above for the patch array antennas shown in FIGS. 4, 5, 8A-8D, 12, 13A-13B and 14A-14D, 16, and 17, any of the patch array antennas may include a ground plate in a first plane, a plurality of antenna radiating elements each antenna radiating element has a radiating surface extending in one or more planes above the first plane, an antenna feed in a third plane between the first plane and the radiating surfaces; and a plurality of feed lines extending from the third plane to connect each antenna radiating element to the antenna feed(s). The antenna feeds shown in FIGS. 4, 5, 8A-8D, 12, 13A-13B and 14A-14D, 16, and 17 was located in a third plane, but was divided up into different antenna feed regions, and may be referred to as a plurality of antenna feeds, although they are connected to the same antenna radio sources (e.g., horizontal and vertical polarization sources). FIGS. 63A-63C and 64A-64B, 65 and 66A-66B illustrate another variation an apparatus having a patch array antenna, in which a single antenna feed (antenna feed plate) is used.

For example, FIGS. 63A-63C illustrate a radio device (housing) that can enclose any of the patch array antennas described herein. This variation is similar to those shown and described in above in FIGS. 9A-11B, 41-49, and 55A-58.

Figure 64A:
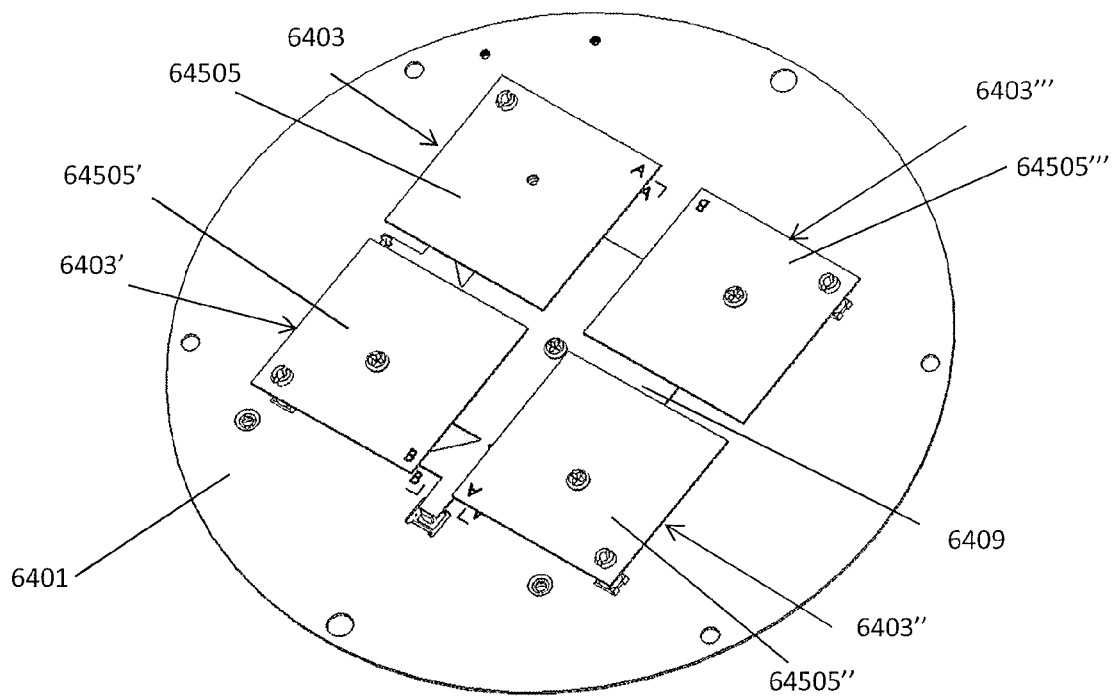
FIG. 64A illustrates one variation of a patch array antenna having a single feed plate including both a vertical and horizontal polarization feed connection.
Figure 64B:
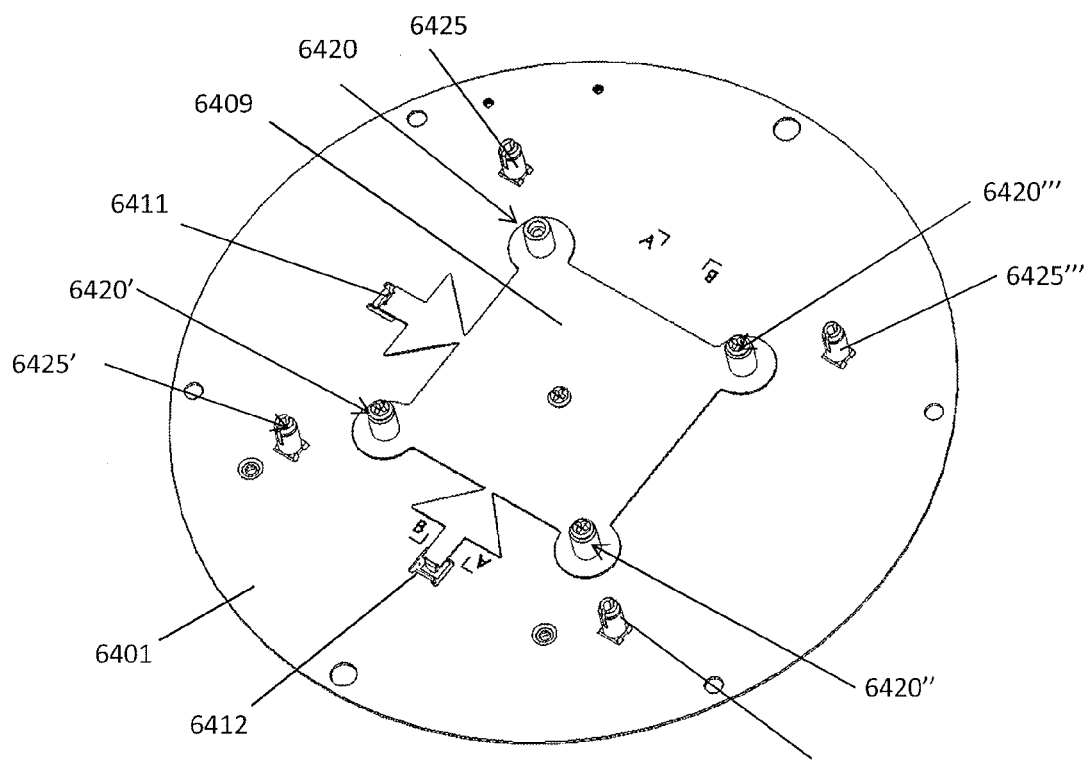
FIG. 64B shows the patch array antenna of FIG. 64A with the antenna emitting elements (patches) removed to show the single antenna feed configured as a feed plate having both a vertical and horizontal polarization feed connection.

FIG. 64A illustrates a patch array antenna that may be used within the housing of the apparatus shown in FIG. 63A-63C (or any of the other housing, including the other housing variations described herein). For example, the patch array antenna shown in FIG. 64A includes a ground plate 6401; on one side of the ground plate are four (2×2) antenna radiating elements 6403, 6403', 6403", 6403''' each antenna radiating element has a radiating surface 6405, 6405', 6405", 6405''' extending in one or more planes above. The four antenna radiating elements are each held in a plane about both the ground plate 6401 and an antenna feed 6409. In this example, the antenna feed 6409 is a single region or plate that is connected to each of the antenna radiating elements 6403-6403'''. The antenna feed is more easily seen in FIG. 46B, which shows the patch array antenna of FIG. 64A in which the antenna radiating elements have been removed, revealing the underlying feed plate 6409. The feed plate is shown connected to both a vertical polarization radio connection point 6412 and a horizontal polarization radio connection point 6411. Electrical connection is made between the antenna radiating elements and the antenna feed by feed lines 6520. In FIG. 64B, the feed lines 6420, 6420', 6420", 6420''' are visible as cylindrical extensions from the antenna feed. Each feed line will contact an antenna radiating element (a single contact per radiating element in this example). The contact point is positioned off-center relative to the antenna radiating element (e.g., the radiating surface of the antenna radiating element). Spacers 6425, 6425', 6425", 6425''' are also shown in FIG. 64B; these spacers may connect (though are electrically isolated between) the each antenna radiating element and the ground plate. Radio circuitry (not visible in FIGS. 64A-64B) may be connected through the ground plate on the opposite side of the ground plate.

Figure 65:
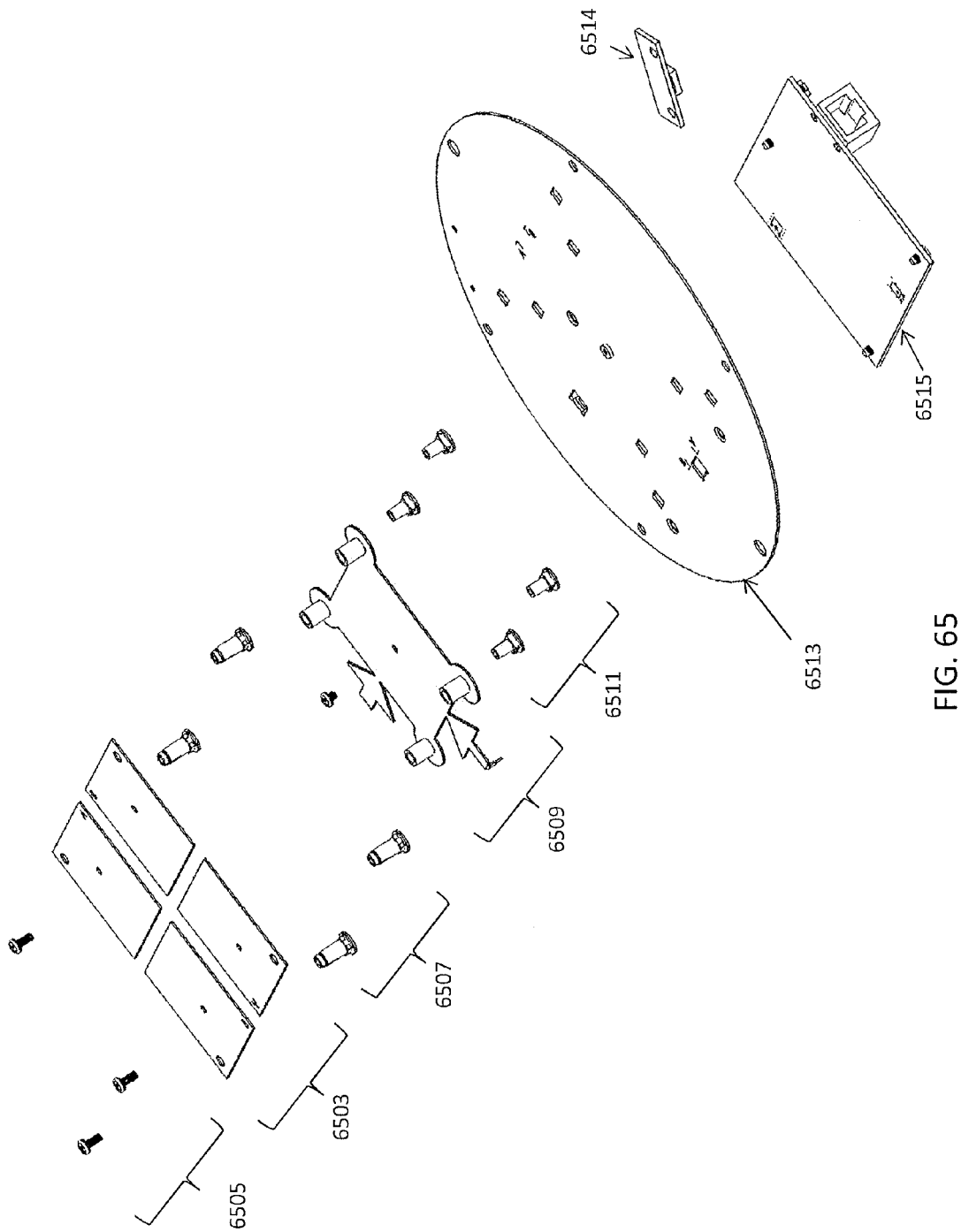
FIG. 65 is an exploded view of the patch array (2×2) antenna of FIG. 64A, which may be held within a housing such as the one shown in FIGS. 63A-63B.

FIG. 65 shows an exploded view of one variation of a patch array antenna such as the one shown in FIGS. 64A-64B for use in a radio device. In this example, four (2×2 array) antenna emitting elements form a second plane above the antenna feed and the ground plate 6513. Screws 6505 are used to connect each emitting element 6503 to the antenna feed via cylindrical feed lines extending from the antenna feed plate 6509. The antenna feed is connected by washers 6511 to the ground plate; the feed is also connected to both a vertical and horizontal polarization connection of the radio circuitry 6515 through the ground plate 6512. In addition, spacers 6507 may be used to connect the antenna emitting elements to the ground plate (though without grounding the emitting elements). The radio circuitry may also be connected to an output 6514 including LEDs or other indicators that can be seen through the housing (not shown) and may indicate the status and/or operation of the device.

Figure 66A:
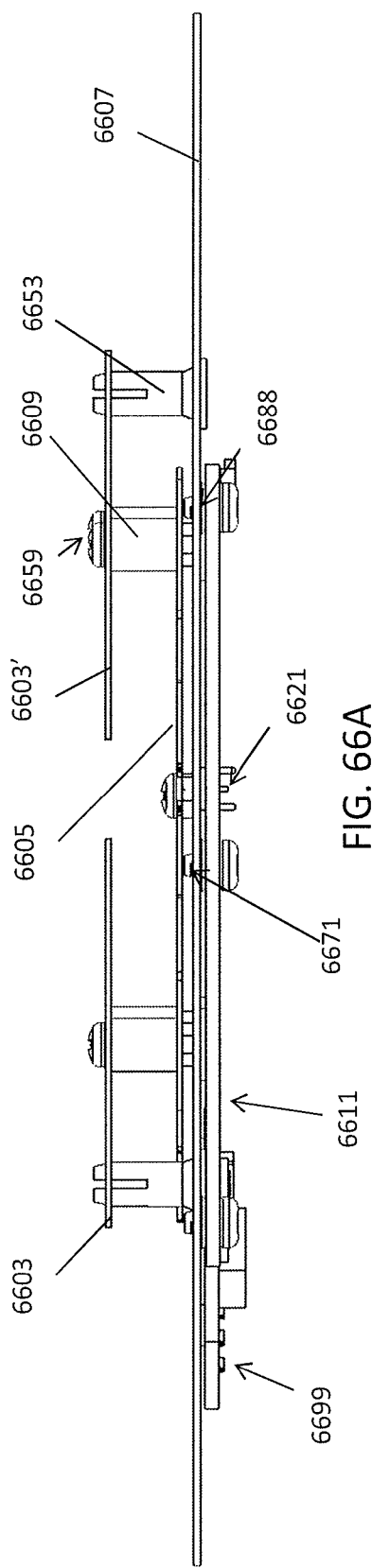
FIG. 66A is a side view of the patch array antenna of FIG. 64A.
Figure 66B:
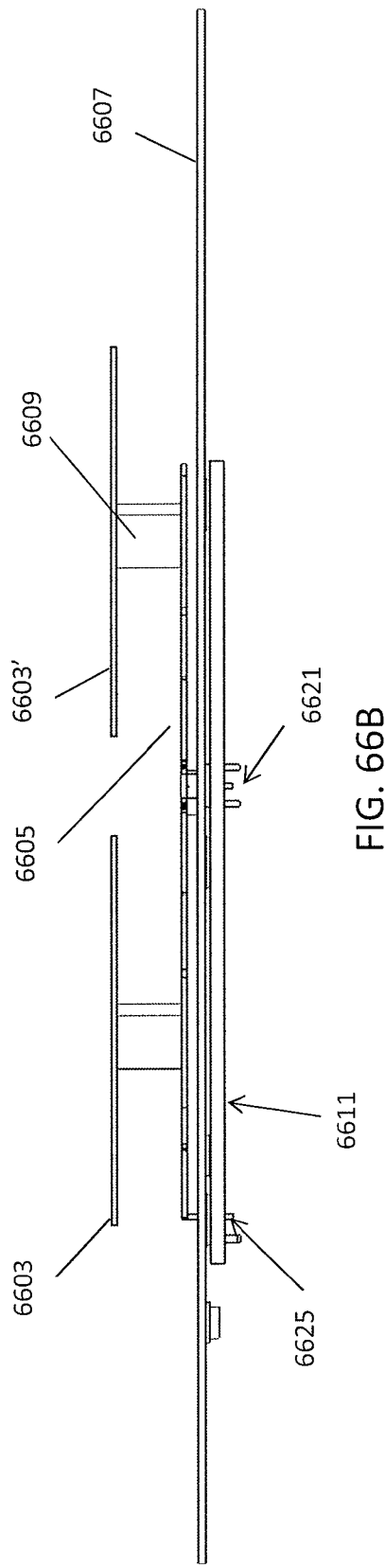
FIG. 66B is a side view of the patch array antenna shown in FIG. 66A with elements removed to illustrate the various levels (planes) forming the emitting elements, antenna feed, ground plate, and radio circuitry.

The patch array antenna may generally be a stratified construction, having an outer layer that is formed by the closely-spaced antenna emitting elements (patches), an inner layer forming the antenna feed that is positioned between the emitting elements and a ground plate. The circuitry (e.g., PCB) for the radio, which may include hardware, software and/or firmware forming the radio portion of the apparatus, may be located on the opposite side of the ground plate from the antenna emitting elements, as shown in FIGS. 66A and 66B. FIG. 66A shows a side view of the patch array antenna shown in FIG. 64A, including the emitting elements 6603, 6603', antenna feed 6605 and ground plate 6607, as well as the cylindrical feed lines 6609 extending from the feed plate and the PCB including the radio elements 6611 on the opposite side of the ground plate, which is connected to the feed plate to provide both vertical 6621 and horizontal 6625 polarization feeds. FIG. 66A also shows the spacers 6653 supporting the antenna emitting elements against the ground plate, the screws 6659 holding the antenna emitting elements against the feed lines, the screw and (insulated) washer 6671 holding the feed plate to the ground plate, screws and washers 6688 holding the PCB of the radio circuitry to the ground plate, as well as some portions of the radio circuitry on the PCB (including indicator LEDs 6699). FIG. 66B shows a simplified version of FIG. 66B with only the antenna emitting elements 6603, 6603', antenna feed 6605, ground plate 6607, cylindrical feed lines 6609, and the radio PCB 6611 shown (including the horizontal 6625 and vertical 6621 polarization connections to the feed plate). These elements show the stratified structure of the antenna, including the first (ground plate) plane, the third (feed) plane, and the second (antenna emitting element) plane. The radio PCT is shown in a fourth plane below the ground plate. Finally, connections between the four planes is also shown. This arrangement may provide a robust antenna that is compact and powerful.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all subranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A radio and antenna device for providing wireless broadband access, the device comprising:
    a housing comprising a rear region having an integrated bracket mount, wherein the bracket mount comprises a ball socket;
    wherein the housing encloses an array antenna having:
    a ground plate in a first plane,
    a plurality of antenna radiating elements above the first plane wherein each antenna radiating element has a radiating surface extending in a plane above the first plane, wherein the antenna radiating elements may extend in the same plane or in different planes,
    an antenna feed in a third plane between the first plane and the radiating surfaces, and
    a plurality of feed lines extending from the third plane, wherein each feed line connects an antenna radiating element to the antenna feed, wherein the plurality of antenna feed lines comprises a vertical polarization feed connected to a first radio connection point, and a horizontal polarization feed connected to a second radio connection point;
    further wherein the plurality of antenna radiating elements, antenna feed, and plurality of feed lines are all formed of a stamped single sheet of metal having a continuous top surface; and
    a bracket comprising a ball joint, the bracket configured support the housing, wherein the bracket and bracket mount cooperate to provide a plurality of selectable tilt positions of the housing relative to the bracket.

2. The device of claim 1, further comprising optical indicators within the housing that are visible through a wall of the housing.

3. The device of claim 1, wherein the housing is water resistant.

4. The device of claim 1, further comprising a bubble level integrated onto the housing.

5. The device of claim 1, wherein the bracket mount comprises a deformable locking projection.

6. The array antenna of claim 1, wherein the antenna feed comprises a plurality of antenna feed regions in the third plane.

7. The array antenna of claim 1, wherein the plurality of feed lines comprises a plurality of slant feed lines, wherein each slant feed line connects one side of an antenna radiating element to the antenna feed.

8. The array antenna of claim 1, wherein the radiating surfaces of each antenna radiating element of the plurality of antenna radiating elements extend in a second plane above the first plane.

9. The array antenna of claim 1, wherein the first plane and the second plane are separated by between about 2 and about 20 mm.

10. The array antenna of claim 1, wherein the first plane is separated from the third plane by between about 1 and about 10 mm, and wherein the second plane is separate from the third plane by between about 1 and about 10 mm.

11. The array antenna of claim 1, wherein the plurality of feed line are selected from the group consisting of: a plurality of slant feed lines wherein each slant feed line connects to the edge of one antenna radiating element from the plurality of antenna radiating elements to the antenna feed, and a plurality of cylindrical feed lines wherein each cylindrical feed line connects one antenna radiating element from the plurality of antenna radiating elements to the antenna feed at a position that is off-center relative to the radiating surface of the antenna radiating element.

12. The array antenna of claim 1, wherein the plurality of antenna radiating elements, antenna feed, and plurality of feed lines are all formed of a single sheet of metal tin plated steel, brass, or copper.

13. The array antenna of claim 1, wherein the plurality of antenna radiating elements consists of four antenna radiating elements.

14. The array antenna of claim 1, wherein the plurality of antenna radiating elements consists of nine antenna radiating elements.

15. The array antenna of claim 1, wherein the antenna gain is between about 15 and about 20 dB.

16. The array antenna of claim 1, wherein the bandwidth of the antenna is between about 5.15 to 5.85 GHz.

17. The array antenna of claim 1, wherein the bandwidth of the antenna is between about 2.40 to 2.48 GHz.

18. The array antenna of claim 1, wherein the planes in which the ground plate, plurality of antenna radiating elements and antenna feed extend are separated from each other by air.

* * * * *